(12) United States Patent
Joseph et al.

(10) Patent No.: US 10,576,394 B2
(45) Date of Patent: *Mar. 3, 2020

(54) DUAL PHASE EXTRACTION APPARATUS

(71) Applicant: APEKS LLC, Johnstown, OH (US)

(72) Inventors: Andrew Paul Joseph, Johnstown, OH (US); Samuel Shomper, Johnstown, OH (US); Jeremy Sexton, Johnstown, OH (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/832,746

(22) Filed: Dec. 5, 2017

(65) Prior Publication Data

US 2018/0099235 A1   Apr. 12, 2018

Related U.S. Application Data

(63) Continuation-in-part of application No. 14/827,415, filed on Aug. 17, 2015, now Pat. No. 9,908,062.
(Continued)

(51) Int. Cl.
*B01D 11/02* (2006.01)
*B01D 11/04* (2006.01)
(Continued)

(52) U.S. Cl.
CPC ...... *B01D 11/0203* (2013.01); *B01D 11/0284* (2013.01); *B01D 11/0403* (2013.01); *B01D 11/0484* (2013.01); *B01D 29/682* (2013.01); *C11B 1/104* (2013.01); *B01D 2253/102* (2013.01); *B08B 7/0021* (2013.01); *C11B 7/005* (2013.01)

(58) Field of Classification Search
CPC ............ B01D 11/0203; B01D 11/0284; B01D 11/0403; B01D 11/0484; B01D 11/02; B01D 11/04; B01D 29/682; B01D 29/68; B01D 2253/102; B08B 7/0021; C11B 1/104; C11B 7/005
USPC .......................................... 210/149
See application file for complete search history.

(56) References Cited

U.S. PATENT DOCUMENTS 2,148,460 A * 2/1939 Haney .................. B01D 11/043
                                                      422/256
2,505,139 A * 4/1950 Pascal ..................... C11B 1/102
                                                      422/281
(Continued)

*Primary Examiner* — Heidi R Kelley
*Assistant Examiner* — Akash K Varma

(57) ABSTRACT

A dual phase re-circulating extraction apparatus comprises at least one extraction vessel, at least one separation chamber, and a circulation conduit configured to direct a process fluid into the extraction vessel, where it may come into contact with a source material to form a mixture, and is then passed to the separation chamber, where the process fluid separates from the extracted material, and the process fluid is recirculated back to the extraction vessel. The apparatus includes a gas pump, at least one heat exchanger, and a liquid pump, each connected to the conduit, to efficiently convert a relatively low pressure gas after separation to a relatively high pressure liquid or supercritical fluid for extraction. The apparatus can be configured to enable a batch mode process allowing continuous flow to the separators while the extractors are cycled online and offline in a sequence to enable servicing and reloading.

27 Claims, 21 Drawing Sheets

Related U.S. Application Data which is a continuation-in-part of application No. 14/085,682, filed on Nov. 20, 2013, now Pat. No. 9,132,363.

(60) Provisional application No. 61/799,665, filed on Mar. 15, 2013, provisional application No. 61/728,656, filed on Nov. 20, 2012, provisional application No. 62/430,678, filed on Dec. 6, 2016.

(51) Int. Cl.
*B01D 29/68* (2006.01)
*C11B 1/10* (2006.01)
*C11B 7/00* (2006.01)
*B08B 7/00* (2006.01)

(56) References Cited

U.S. PATENT DOCUMENTS

| | | | | |
|---|---|---|---|---|
| 3,367,034 A | * | 2/1968 | Good | C11B 1/108 34/245 |
| 3,410,705 A | * | 11/1968 | Honma | C04B 35/4684 501/137 |
| 5,614,089 A | * | 3/1997 | Allington | B01D 11/0203 210/198.2 |
| 2012/0125444 A1 | * | 5/2012 | Tipler | G01N 30/40 137/14 |

* cited by examiner

DUAL PHASE EXTRACTION APPARATUS

CROSS-REFERENCE TO RELATED APPLICATION

This continuation-in-part application claims priority to and claims the benefit of U.S. Non-Provisional application Ser. No. 14/827,415 filed Aug. 17, 2015, entitled "Extraction Apparatus and Method," U.S. Provisional patent application Ser. No. 14/827,713 filed Aug. 17, 2015, entitled "Extraction Apparatus", and U.S. Provisional Patent Application Ser. No. 62/430,678 filed Dec. 6, 2016, entitled "Dual Phase Pumping," each of which is incorporated by reference in its entirety as if fully set forth herein. This continuation-in-part application claims priority to and claims the benefit of U.S. Non-Provisional application Ser. No. 14/085,682 (U.S. Pat. No. 9,132,363) filed Nov. 20, 2013, entitled "Extraction System", U.S. Provisional Patent Application Ser. No. 61/799,665 filed Mar. 15, 2013, entitled "Fluid extraction system and method", and U.S. Provisional Patent Application Ser. No. 61/728,656 filed Nov. 20, 2012, entitled "Fluid extraction system and method," each of which is incorporated by reference in its entirety as if fully set forth herein.

FIELD

The disclosed apparatuses and methods relate generally to the field of fluid extraction.

BACKGROUND

Figure 1:
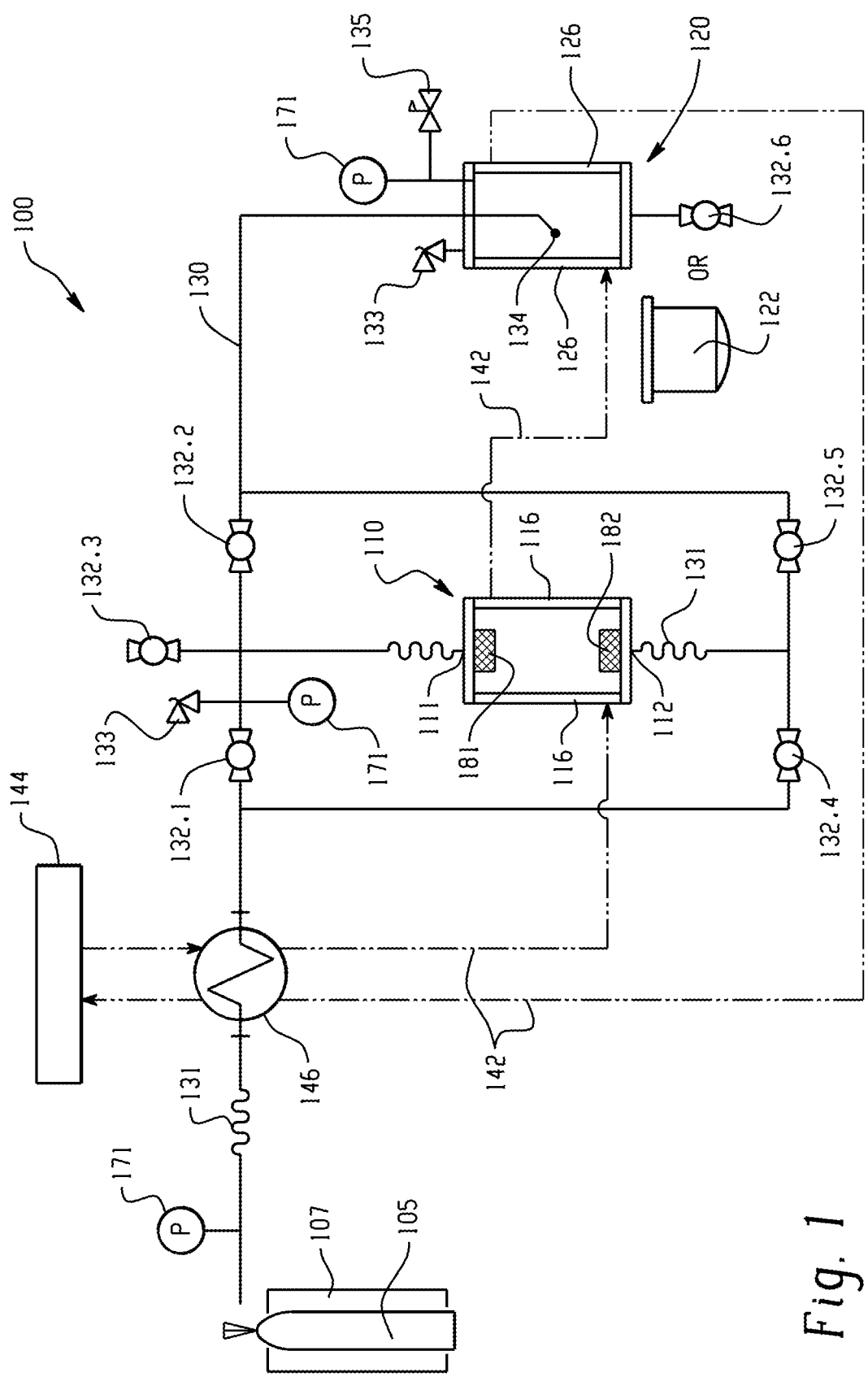
FIG. 1 is a schematic diagram of an extraction system.

Fluid extraction systems use a process fluid under controlled temperature and pressure conditions to extract an extracted material from a source material. For example, carbon dioxide ($CO_2$) in a supercritical or liquid state can be used as one such process fluid to extract botanical oils and resins from a botanical source material. Other process fluids, including $CO_2$ mixed with certain additives, can optionally be used. Fluid extraction systems can also be used to operate on a variety of source material to extract a variety of extracted materials known in the art.

For example, U.S. Pat. No. 9,132,363 (Joseph) describes an extraction apparatus comprising an extraction vessel configured to remove an extracted material from a source material in contact with a process fluid to form a mixture. The apparatus further comprises a separation chamber and a process fluid circulation conduit, the conduit comprising a separation portion configured to receive the mixture and permit a portion of the extracted material to separate from the mixture within the separation chamber. The apparatus further comprises a temperature regulator configured to permit re-circulation of a temperature regulation fluid and regulate the temperature of the process fluid.

The properties of the process fluid in such an extraction system will dictate its phase at a given combination of temperature and pressure, as may be shown on a conventional phase diagram. Taking $CO_2$ process fluid as an example, for $CO_2$ to be maintained in a supercritical state, a temperature of at least 87.98 degrees Fahrenheit and a pressure of at least 1,071 PSI (conventionally known as $CO_2$'s supercritical point) is necessary. Following the $CO_2$ phase diagram, gaseous $CO_2$ can be condensed to liquid or vaporized back to a gas along a continuum. Generally, $CO_2$ requires greater pressure to be maintained as a liquid at higher temperatures. Conversely, to maintain $CO_2$ as a gas at relatively low temperatures, the pressure also must be relatively low. Also, when $CO_2$ decompresses, a phenomena known as Joule-Thompson cooling occurs. Conversely, when $CO_2$ is compressed, its temperature increases.

$CO_2$ has solvency power when in liquid and supercritical states, allowing it to form a mixture with an extracted material when placed in contact with a source material. One method of separating the extracted material from the mixture is to pass the mixture from the extraction vessel to a separation chamber and decompress the mixture such that the $CO_2$ changes to a gas and loses its solvency power. Low pressure within the separation chamber for effective separation implies low temperature as well.

The problem then becomes how to efficiently recirculate the $CO_2$ back to the extraction vessels at an optimal pressure and temperature for a desired extraction, which will be at a relatively higher temperature and relatively higher pressure than the $CO_2$ has when exiting the separation chamber.

SUMMARY

In some examples of the apparatus and systems and methods disclosed herein, this problem is solved by intermediately changing the pressure and temperature of process fluid in a multi-step recirculation process following each extraction/separation. In general terms, first a gas pump increases the pressure of the process fluid part way toward the desired extraction pressure. The compression of the process fluid in the gas pump will cause it to heat up. Then the process fluid is cooled by passing it through one or more heat exchangers connected to a cooling source, which may optimally include at least one regenerative heat exchanger capable of capturing some of the heat imparted by the process fluid to warm the inner wall of the separation chambers, thereby further increasing the energy efficiency of the system by offsetting the decompression cooling (Joule-Thomson cooling effect) that occurs within the separation vessel and helping to avoid negative outcomes, such as the formation of ice within the separation chamber. The cooling of the process fluid in the heat exchangers causes it to change phase to a liquid. The liquid process fluid is directed to a liquid pump, which compresses the gas to the desired extraction pressure. A final heat exchanger connected to a heating cooling source sets the final extraction temperature of the process fluid to a predetermined temperature optimal for extraction of a predetermined extracted material from a source material within the extraction vessel.

Disclosed are examples of apparatuses and methods for removing an extracted material from a source material using a process fluid.

The invention is described more fully hereinafter with references to the accompanying drawings, in which exemplary embodiments of the invention are shown. Throughout the drawings and the detailed description, unless otherwise described, the same drawing reference numerals are understood to refer to the same elements, features, and structures. The relative size and depiction of these elements may be exaggerated for clarity, illustration, and convenience.

This invention may, however, be embodied in many different forms and should not be construed as limited to the embodiments set forth herein. Rather, these exemplary embodiments are provided so that this disclosure is thorough, and will fully convey the scope of the invention to those skilled in the art.

In some examples, the process fluid can be CO2. In some examples, the process fluid can be supercritical CO2. In others, the process fluid may be liquid CO2. The process fluid can be any other fluid suitable for forming a mixture when placed in contact with the source material. Optionally, certain additives can be included in the process fluid, for example, ethanol.

In some examples, the source material can be a botanical substance. In some examples, the extracted material can include at least one of a botanical oil and a wax. In other examples, the source material can be any material in which extraction is desired. For example, the source material could be any physical article such as an instrument, tool, medical device, or implant. By operation of the disclosed systems, manufacturing fluids or other forms of residue can be removed from the surface of the physical article.

Labels such as extraction apparatus, recirculating extraction apparatus, fractional extraction apparatus, dual phase extraction apparatus, and valveless separation are used to describe various examples and attributes of the example apparatuses disclosed herein. While particular features, materials, dimensions, arrangements, and methods of use may be disclosed in connection with one example, these features, materials, dimensions, arrangements, and methods of use can also be used with other examples, regardless of whether they are labeled extraction apparatus, recirculating extraction apparatus, fractional extraction apparatus, and dual phase extraction apparatus. Apparatus labels are not meant to be limited to only the particular features, materials, dimensions, arrangements, and methods of use disclosed in connection with apparatuses of the same label.

For example, a particular type of extraction vessel, separation chamber, overflow chamber, storage tank, process fluid canister, conduit, separation portion, orifice, temperature regulator, temperature regulation line, heat exchanger, pump, pump fluid line, filter, filter plug, valve, instruments, gauges, and other features and aspects, and their orientation, location, and methods of use disclosed herein in connection with one example of an apparatus can be used in or combined with other examples of apparatuses whether or not specifically disclosed in the discussion of the other example apparatus. Also, features such as recirculation, fractional extraction, dual phase pumping, valveless separation, and batch mode extraction processing that may be disclosed in connection with a particular example of an apparatus can be used in or combined with other examples of apparatuses whether or not specifically disclosed in the discussion of the other example apparatus.

Likewise, while some examples disclose the use of one or more extraction vessel, separation chamber, overflow chamber, storage tank, process fluid canister, conduit, separation portion, orifice, temperature regulator, temperature regulation line, heat exchanger, pump, pump fluid line, filter, filter plug, valve, instruments, gauges, and other features and aspects, these features and aspects can also be combined in any number for use in connection with examples of other apparatuses in which they are not expressly discussed.

In one example, a dual phase recirculating extraction apparatus, includes an extraction vessel having first and second extraction vessel openings, wherein each extraction vessel opening can function either as an ingress or an egress. The extraction vessel can be configured to receive a process fluid through the ingress, allow the process fluid to come into contact with a source material within the extraction vessel to form a mixture, and permit the mixture to exit the extraction vessel through the egress.

The exemplary dual phase recirculating extraction apparatus also includes a first filter adapted to retain the source material while also allowing the process fluid or the mixture to pass through the first extraction vessel opening.

The exemplary dual phase recirculating extraction apparatus also includes a second filter adapted to retain the source material while also allowing the process fluid or the mixture to pass through the second extraction vessel opening.

The exemplary dual phase recirculating extraction apparatus also includes a separation chamber.

The exemplary dual phase recirculating extraction apparatus also includes a circulation conduit configured to direct the process fluid into the extraction vessel through a predetermined ingress selected from the first and second extraction vessel openings, direct flow of the mixture from the extraction vessel to the separation chamber, allow a portion of the extracted material to separate from the mixture within the separation chamber, and thereafter allow recirculation of the process fluid to the extraction vessel through a next predetermined ingress selected from the first and second extraction vessel openings.

The exemplary dual phase recirculating extraction apparatus also includes a gas pump connected to the circulation conduit and configured to receive the process fluid in a gaseous state and compress the process fluid.

The exemplary dual phase recirculating extraction apparatus also includes a liquid pump connected to the circulation conduit and configured to receive the process fluid in a liquid state and compress the process fluid.

The exemplary dual phase recirculating extraction apparatus also includes an extraction temperature regulator including an extraction heating/cooling source, an extraction temperature regulation fluid, an extraction temperature regulation line, an extraction temperature set heat exchanger configured to selectively adjust the temperature of the process fluid prior to entering the extraction vessel, and wherein the extraction temperature regulator is configured to allow recirculation of the temperature regulation fluid.

The exemplary dual phase recirculating extraction apparatus also includes a recirculation thermal manager including a recirculation cooling source, a recirculation thermal management fluid, a recirculation thermal management line, and first and second recirculation heat exchangers, the recirculation thermal manager configured to allow recirculation of the recirculation thermal management fluid and to regulate the temperature of the process fluid.

In some examples of the dual phase recirculating extraction apparatus, the circulation conduit is configured to direct the process fluid to the gas pump, thereafter to the first recirculation heat exchanger, thereafter to the second recirculation heat exchanger, thereafter to the liquid pump, thereafter to the extraction temperature set heat exchanger, thereafter to the extraction vessel, thereafter to the separation vessel, and thereafter back to the gas pump.

In some examples of the dual phase recirculating extraction apparatus, the recirculation thermal manager is configured to circulate the recirculation thermal management fluid from the cooling source to the second recirculation heat exchanger, thereafter to the gas pump, thereafter to the first recirculation heat exchanger, thereafter to the separation chamber, and thereafter back to the cooling source.

In some examples of the dual phase recirculating extraction apparatus, the circulation conduit is configured to direct the process fluid in a gaseous state to the gas pump, the gas pump is configured to compress the process fluid, the circulation conduit is configured to direct the process fluid to the first recirculation heat exchanger, the first recirculation heat exchanger is configured to cool the process fluid, the circulation conduit is configured to direct the process fluid to the second recirculation heat exchanger, the second recirculation heat exchanger is configured to further cool the process fluid, the circulation conduit is configured to direct the process fluid to the liquid pump, the liquid pump is configured to receive the process fluid in a liquid state and compress the process fluid, and the circulation conduit is configured to direct the process fluid to the extraction temperature set heat exchanger.

In some examples, the dual phase recirculating extraction apparatus further includes at least one additional extraction vessel.

In some examples, the dual phase recirculating extraction apparatus further includes at least one additional separation chamber.

In some examples, the dual phase recirculating extraction apparatus further includes at least one overflow chamber connected to the circulation conduit and configured to receive the process fluid from the at least two separation chambers and allow recirculation of the process fluid.

In some examples of the dual phase recirculating extraction apparatus, the circulation conduit is configured to selectively direct the process fluid through the predetermined ingress of a predetermined extraction vessel among the at least two extraction vessels, direct flow of the mixture from the predetermined extraction vessel to a predetermined separation chamber among the at least two separation chambers, allow the process fluid to flow from the predetermined separation chamber to the overflow chamber, allow recirculation of the process fluid from the overflow chamber to the gas pump, allow flow of the process fluid from the gas pump, through the first and second recirculation heat exchangers, through the liquid pump, through the extraction temperature set heat exchanger, and thereafter to a next predetermined extraction vessel among the at least two extraction vessels.

In some examples, the dual phase recirculating extraction apparatus further includes at least one storage tank connected to the circulation conduit and configured to selectively release additional process fluid through the circulation conduit to the gas pump.

In some examples of the dual phase recirculating extraction apparatus, each of the extraction vessels includes a heat exchange portion connected to the extraction temperature regulation line and is configured to allow flow of the extraction temperature regulation fluid from and to the extraction temperature regulation line and each of the separation chambers, overflow chamber, storage tank, and gas pump includes a heat exchange portion connected to the recirculation thermal management line and is configured to allow flow of the recirculation thermal management fluid from and to the recirculation thermal management line.

In some examples of the dual phase recirculating extraction apparatus, the circulation conduit is configured to selectively direct the process fluid into the first extraction vessel, allow flow of the mixture to the second extraction vessel, allow flow of the mixture to a predetermined separation chamber among the at least two separation chambers.

In some examples of the dual phase recirculating extraction apparatus, the circulation conduit is configured to selectively reverse direction of the process fluid through the first or second extraction vessels such that the egress of a predetermined extraction vessel becomes the ingress and the ingress becomes the egress.

In some examples of the dual phase recirculating extraction apparatus, the circulation conduit near the extraction vessels is capable of being set in multiple configurations to operate in a batch mode extraction process, wherein the first and second extraction vessels are intermittently operated alone or together in a sequence that permits servicing or reloading in an offline extraction vessel while permitting continuous flow of process fluid through an online extraction vessel.

In some examples of the dual phase recirculating extraction apparatus, the circulation conduit near the extraction vessels is capable of being configured pursuant to the following sequence. In a first configuration, the process fluid is directed to the first extraction vessel and the mixture is directed from the first extraction vessel to the first or second separation chamber, bypassing the second extraction vessel. In a second configuration, the process fluid is directed to the first extraction vessel and the mixture is directed from the first extraction vessel through the second extraction vessel and then to the first or second separation chamber. In a third configuration, the process fluid is directed to the second extraction vessel and the mixture is directed from the second extraction vessel to the first or second separation chamber, bypassing the first extraction vessel. In a fourth configuration, the process fluid is directed to the second extraction vessel and the mixture is directed from the second extraction vessel through the first extraction vessel and then to the first or second separation chamber. In a fifth configuration, the process fluid is directed to the first extraction vessel and the mixture is directed from the first extraction vessel to the first or second separation chamber, bypassing the second extraction vessel.

In some examples of the dual phase recirculating extraction apparatus, the apparatus is configured to cause the process fluid to exit the temperature set heat exchanger at a predetermined temperature and a predetermined pressure.

In some examples of the dual phase recirculating extraction apparatus, the apparatus is configured to cause the process fluid to exit the temperature set heat exchanger during a first circulation cycle at a first predetermined temperature and a first predetermined pressure to extract a first predetermined extracted material from the source material and cause the process fluid to exit the temperature set heat exchanger during a next circulation cycle at a next predetermined temperature and a next predetermined pressure to extract a next predetermined extracted material from the source material.

In some examples of the dual phase recirculating extraction apparatus, the process fluid enters the gas pump at a pressure in the range of 300 to 400 psi, the process fluid exits the gas pump at a pressure in the range of 1,000 to 1,500 psi and a temperature in the range of 200 to 250 degrees Fahrenheit, the process fluid is cooled to a temperature in the range of 70 to 85 degrees Fahrenheit by passing through the first and second recirculation heat exchangers in proximity to relatively cooler recirculation thermal management fluid, the process fluid exits the liquid pump at a pressure in the range of 4,000 to 5,000 psi, and the process fluid exits the extraction temperature set heat exchanger at a temperature of about 110 degrees Fahrenheit.

DETAILED DESCRIPTION

Several examples of apparatuses configured to perform extraction and methods of use will now be disclosed in greater detail. The features, materials, dimensions, arrangements, and methods of use disclosed in connection with one particular example can be used with other examples of disclosed apparatuses and/or can be combined with additional aspects and with varied materials, dimensions, arrangements, and methods of use as are known in the art or hereafter discovered.

Turning now the exemplary apparatus shown in FIG. 1, an extraction apparatus 100 can include an extraction vessel 110 configured to receive a process fluid, permit the process fluid to come into contact with a source material within the extraction vessel 110, permit an extracted material to be removed from the source material, and permit the extracted material and the process fluid to form a mixture.

In some examples, the extraction vessel 110 can be about 1 liter and can be rated to a maximum pressure of about 1500 pounds per square inch (psi) at about 200 degrees Freiheit (° F.). In some examples, the extraction vessel 110 can have an opening for receiving the process fluid. In some examples, the extraction vessel can have multiple openings for receiving the process fluid. In the example shown in FIG. 1, the extraction vessel 110 includes a first extraction vessel opening 111 and a second extraction vessel opening 112. In some examples, the openings of the extraction vessel can be sealed using an elastomeric O-ring. One example of a suitable elastomeric O-ring is a Buna-90 O-ring.

The extraction vessel 110 can include an extraction vessel filter adapted to retain portions of the source material while also allowing the mixture to pass. In some examples, the extraction vessel 110 can have multiple filters. As shown in FIG. 1, the extraction vessel 110 can include a first extraction vessel filter 181 located near the first extraction vessel opening 111 and a second extraction vessel filter 182 located near the second extraction vessel opening 112.

The extraction apparatus 100 can include a separation chamber 120. In some examples, the separation chamber can be rated for about 500 psi at 200° F.

The extraction apparatus 100 can include a circulation conduit 130 configured to selectively restrict, allow, and reversibly direct flow of the process fluid into and out of the extraction vessel 110 and permit the mixture to flow from the extraction vessel 110 to the separation chamber 120. The circulation conduit 130 can be stainless steel in some examples. In other examples, the circulation conduit 130 can be made from one of a family of austenitic nickel-chromium based alloys, such as those supplied commercially under the brand name Inconel® by Special Metals Corporation. In other examples, the circulation conduit 130 can be made from other suitable material for high corrosion resistance. In other examples, the circulation conduit 130 can be steel or another suitable material for applications with low sanitary requirements. In some examples, the circulation conduit 130 can be sized about 304 stainless steel (SS) with about ⅜ inches diameter, and a wall thickness of about 0.035 inches. The circulation conduit 130 can include flexible portions 131.

The circulation conduit 130 can include one or more valves configured to selectively restrict, allow, and reverse a direction of flow of the process fluid through the circulation conduit 130 and other portions of the extraction apparatus 100. In some examples, the valves can be rated from about −22° F. to about 356° F.

In some examples, the circulation conduit 130 can be configured with a system of valves to selectively direct an amount of the process fluid to remain within the extraction vessel 110 for a desired time, for example, to allow the extraction process to be completed to a desired extent. In some examples, the extraction apparatus 100 can be configured with a system of valves to permit reversal of a direction of flow of the process fluid through the extraction vessel 110. In some examples, the reversal of the direction of flow of the process fluid through the extraction vessel 110 can facilitate cleaning or clearing of the first and second extraction vessel filters 181 and 182 without interrupting ongoing extraction processing.

In some examples, the system of valves can include one or more pairs of opposing valves for directing the flow of process fluid. In the example of FIG. 1, the first, second, third, fourth, and fifth valves, labeled 132.1, 132.2, 132.3, 132.4, and 132.5 respectively, can be positioned along the circulation conduit 130 as shown. To direct process fluid into the extraction vessel 110 at a first extraction vessel opening 111, the first valve 132.1 can be opened while the second valve 132.2 can be closed. To direct the process fluid out of the extraction vessel 110 and further downstream in the system, the second valve 132.2 can be opened while the first vale 131.1 can be closed. The third valve, 132.3, can be used to decompress the system and vent process fluid out of the system.

In the example of FIG. 1, the fourth and fifth valves, 132.4 and 132.5, can be configured to direct the process fluid into or out of a second extraction vessel opening 113. Optionally, the valves could be used to direct the process fluid into or out of multiple openings of the extraction vessel 110. For example, by opening the first valve 132.1 and fifth valve 132.5 while closing the downstream second valve 132.2 and fourth valve 132.4, the process fluid can be directed into the first extraction vessel opening 111 and out of the second extraction vessel opening 112. By closing the first valve 132.1 and fifth valve 132.5 while opening the second valve 132.2 and fourth valve 132.4, the process fluid can be directed into the second extraction vessel opening 112 and out of the first extraction vessel opening 111.

In the example apparatus depicted in FIG. 1, the process fluid can be directed in a first direction of flow such that the process fluid enters the extraction vessel 110 through extraction vessel opening 111, passing through the extraction vessel filter 181. According to this direction of flow, the process fluid can pass through an interior portion of the extraction vessel 110 where it can come into contact with the source material, extract the extracted material, and form the mixture. The mixture can then be directed to pass through filter 182 and exit the extraction vessel 110 at opening 112. Optionally, the valves can be re-configured such that the direction of flow of the process fluid and/or mixture can be reversed, allowing the process fluid and/or mixture to enter the extraction vessel 110 at extraction vessel opening 112, pass through the extraction vessel filter 182, pass through filter 181, and exit at extraction vessel opening 111.

The circulation conduit 130 can include a separation portion 134 configured to receive the mixture and permit a portion of the extracted material to separate from the mixture within the separation chamber 120. In some examples, the separation portion 134 can allow the process fluid to decompress in the separation chamber 120 and separate the extracted material from the process fluid without the use of a valve or regulator for separation.

In some examples, the separation portion 134 can include an orifice. The orifice can be sized to match a flow rate of the process fluid. In some examples, the orifice can be about 0.010 inches in diameter. In some examples, the orifice can restrict the flow of process fluid, allowing a significant pressure drop in the mixture after passing through the orifice and allowing the process fluid to change from a subcritical or supercritical state to a gaseous state, thereby allowing the extracted material to fall out, or separate, from the process fluid.

In some examples, the separation portion 134 can be positioned near an inner wall of the separation chamber 120. In some examples, the separation portion 134 can be orientated to direct the process fluid along the inner wall of the separation chamber 120 in a generally rotational manner. In some examples, a portion of circulation conduit 130 leading to the separation portion 134 can be angled at an appropriate angle, which can be about 45°. In some examples, the inner wall of the separation chamber 120 can be relatively warmer than an interior portion of the separation chamber 120. In some examples, directing the process fluid along the inner wall of the separation chamber 120 in a generally rotational manner can help to keep the process fluid in a gaseous state after the process fluid is depressurized in the separation chamber 120. In such examples, the relatively warmer inner wall can help to counteract the Joule-Thompson cooling effect that can occur when the process fluid decompresses.

In some examples, the extraction apparatus 100 can be configured to receive the process fluid from a process fluid canister 105, which can be a cylinder or any other storage device capable of holding the process fluid.

An initial state of the process fluid in the process fluid canister 105 can be solid, liquid, gaseous, or supercritical. Where the process fluid is in an initial liquid state, a siphon can be optionally used to remove the process fluid from a top opening of the process fluid canister while maintaining consistent pressure. Alternatively, the liquid process fluid can be removed by inverting the process fluid canister 105 such that the opening is on the bottom.

In some examples, the extraction apparatus 110 can include a heating source 107 configured to heat the process fluid prior to ingress of the process fluid into the extraction vessel 110. In some examples, heating source 107 can heat the process fluid within the process fluid canister 105. The heating source 107 can be a heating blanket, electric band heater, induction heater, coiled tubing with heating fluid in intimate contact, or an open flame.

In some examples, as the process fluid is heated by the heating source 107, a temperature and the internal pressure of the process fluid rises. In this way, a desired pressure for the process fluid in the system can be achieved without the need for a pump. If necessary, the heating source 107 can deliver continuous or recurring heat to the process fluid so as to maintain the pressure within the system.

Optionally, the temperature and internal pressure of the process fluid can be increased to the point of allowing a phase transformation of the process fluid. Optionally, this phase transformation can occur within the process fluid canister 105. When the initial state of the process fluid is liquid or gas, increasing the temperature and pressure above the fluid's critical point can allow a phase change to a supercritical state. For example, heating carbon dioxide above about 87° F. at a pressure above about 1083 psi will result in a phase change to a supercritical state.

The extraction apparatus 100 can include a temperature regulator. The temperature regulator can include a temperature regulation fluid and a temperature regulation fluid circulation line 142. In the example shown in FIG. 1, the temperature regulator can include a chiller/heater 144 with temperature regulation fluid circulation line 142 running through the extraction apparatus 100 to regulate temperature of the process fluid.

The temperature regulator can be configured to permit recirculation of the temperature regulation fluid. The temperature regulation fluid circulation line 142 can run in close proximity to the circulation conduit 142. In some examples, the circulation line can form a coil around the temperature regulation fluid circulation line 142.

In some examples, the temperature regulation fluid can be liquid water, steam or another heating/cooling fluid. In some examples, the temperature regulation fluid can include distilled water. In some examples, the temperature regulation fluid can be a mixture, for example, a mixture of about 50% water and about 50% glycol.

The temperature regulator can be configured to raise, lower, or maintain the temperature of the process fluid prior to introduction into the extraction vessel 110 to achieve a desired temperature. In some examples, the temperature regulator can be configured to optionally cause a phase change in the process fluid prior to entering the extraction vessel 110.

In some examples, temperature regulator can include a heat exchanger 146 configured to regulate temperature of the process fluid prior to ingress of the process fluid into the extraction vessel 110. In some examples, the heat exchanger 146 can be a tube-in-tube configuration, allowing the process fluid to be in close physical proximity to the temperature regulation fluid, thereby allowing for the exchange of heat between the two fluids while maintaining their separation from one another. Alternative configurations of the heat exchanger 146 could include a shell & tube design, a coil design, or any other method of heat exchange.

In some examples, the temperature regulator can be configured to regulate the temperature of the process fluid within the extraction vessel 110. In some examples, temperature regulator can be configured to regulate the temperature of the process fluid within the separation chamber 120. As shown in the example of FIG. 1, the extraction apparatus 100 can include an extraction vessel temperature regulator 116 and a separation chamber temperature regulator 126. As shown in this example, the temperature regulation fluid circulation line 142 can extend to the extraction vessel temperature regulator 116 and the separation chamber temperature regulator 126. In the example shown in FIG. 1, the system can be configured to permit the temperature regulation fluid to flow through the temperature regulation fluid circulation line 142, through the extraction vessel temperature regulator 116, through the temperature regulation fluid circulation line 142, through the separation chamber temperature regulator 126, and through the temperature regulation fluid circulation line 142. In some examples, the extraction vessel temperature regulator 116 can be a heating/cooling jacket surrounding an exterior portion of extraction vessel 110. In some examples, the separation chamber temperature regulator 126 can be a heating/cooling jacket surrounding an exterior portion of separation chamber 120.

In some examples, the temperature regulator can regulate the temperature of the process fluid in other portions of the circulation conduit 130. In one example, a portion of the circulation conduit 130 connecting the extraction vessel 110 with the separation chamber 120 could run in close proximity to the temperature regulation fluid circulation line 142. Alternative configurations could include a shell & tube design, a coil design, or any other method of heat exchange. Any other portion of the circulation conduit 130 could be regulated in the same ways.

In some examples, the extraction apparatus 100 can include a back pressure regulator 135 configured to maintain pressure within the separation chamber 120 and vent the process fluid. In some examples, the backpressure regulator 135 can be located at a discharge opening of the separation chamber 120.

In some examples, a collection cup 122 can be used to capture the extracted material after separation from the process fluid in the separation chamber 120.

In other examples, a valve, such as the sixth valve 132.6 shown in FIG. 1, can be used to direct the extracted material out of the separation chamber 120 after separation from the process fluid. Optionally, the extracted material can be directed out of the separation chamber 120 while the separation chamber 120 remains under pressure.

As shown in FIG. 1, the extraction apparatus 100 can include one or more pressure gauges 171. As shown in FIG. 1, the extraction apparatus 100 can include one or more relief valves 133. As shown in FIG. 1, the extraction apparatus 100 can include one or more relief valves 133.

Figure 2:
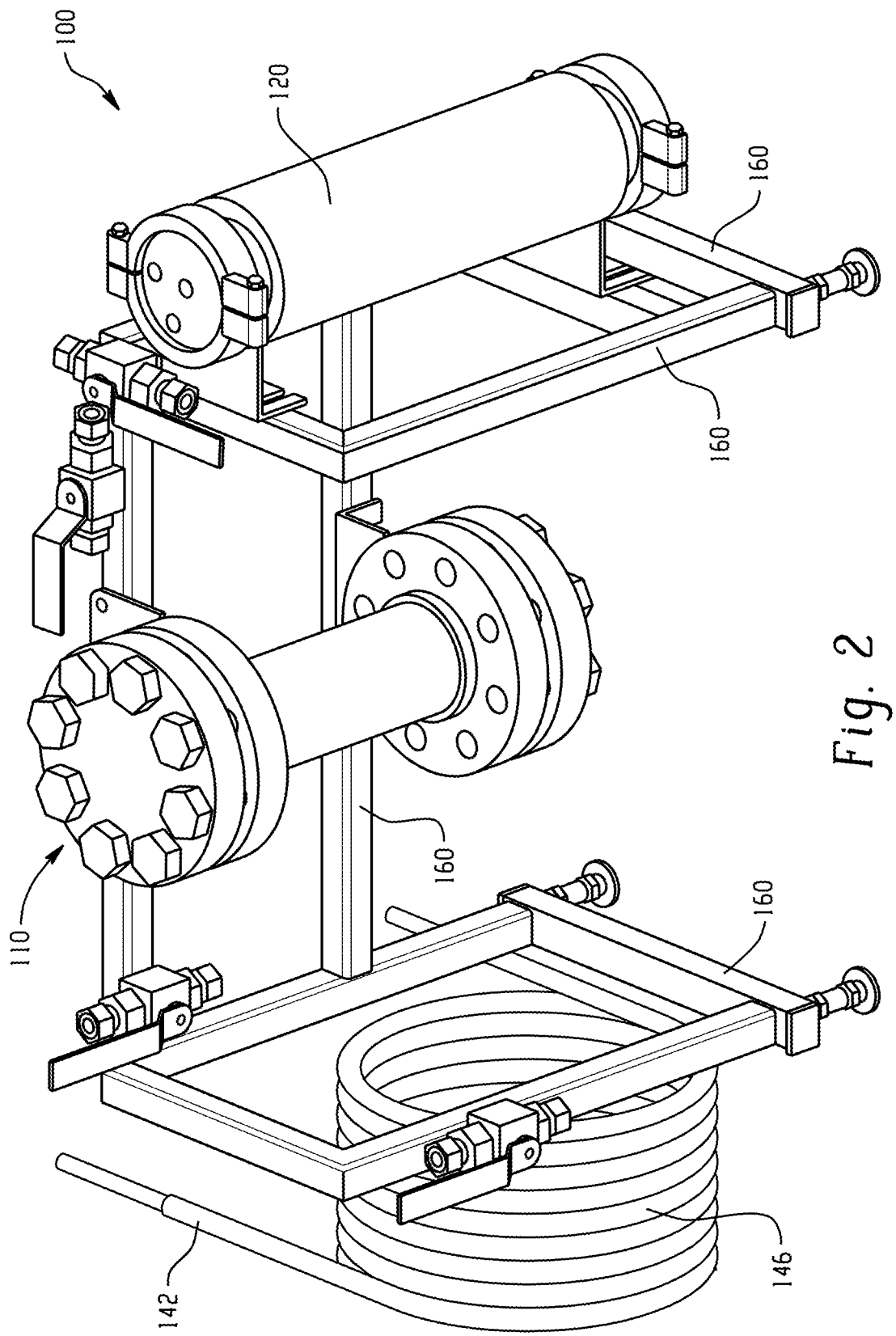
FIG. 2 is a perspective view of an extraction system.

In the example shown in FIG. 2, some of the described aspects of the extraction apparatus 100 are shown mounted on a frame 160 in an exemplary arrangement.

Figure 3:
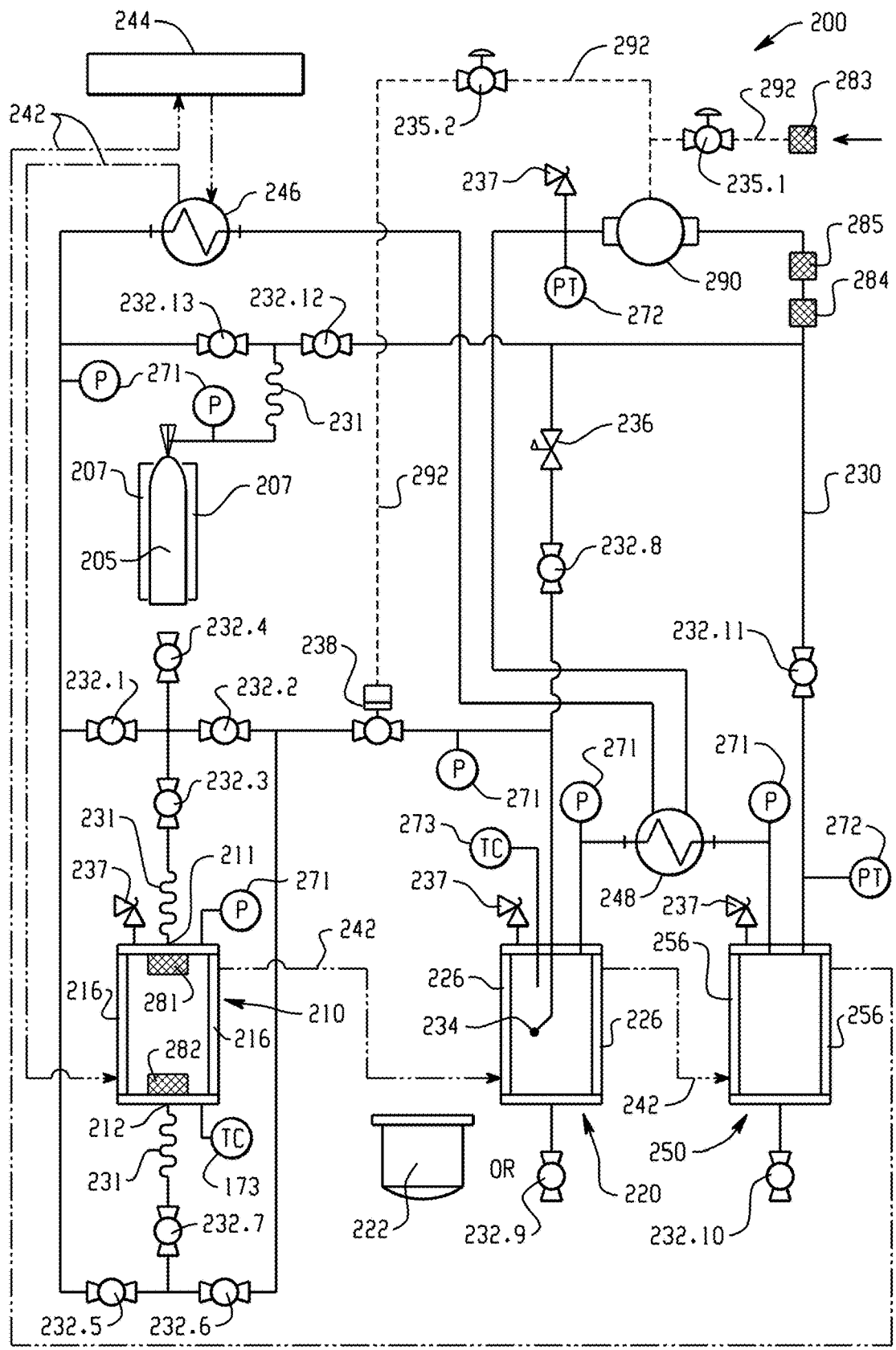
FIG. 3 is a schematic diagram of an extraction system.

As shown in FIG. 3, a recirculating extraction apparatus 200 can include an extraction vessel 210 configured to receive a process fluid, permit the process fluid to come into contact with a source material within the extraction vessel 210, permit an extracted material to be removed from the source material, and permit the extracted material and the process fluid to form a mixture.

In some examples, the extraction vessel 210 can have an opening for receiving the process fluid. In some examples, the extraction vessel can have multiple openings for receiving the process fluid. In the example shown in FIG. 3, the extraction vessel 210 includes a first extraction vessel opening 211 and a second extraction vessel opening 212. In some examples, the openings of the extraction vessel can be sealed using an appropriate O-ring, such as an elastomeric O-ring. One example of a suitable elastomeric O-ring can be a Buna-90 O-ring.

The extraction vessel 210 can include an extraction vessel filter adapted to retain portions of the source material while also allowing the mixture to pass. In some examples, the extraction vessel 210 can have multiple filters. As shown in FIG. 3, the extraction vessel 210 can include a first extraction vessel filter 281 located near the first extraction vessel opening 211 and a second extraction vessel filter 282 located near the second extraction vessel opening 212.

Figure 4B:
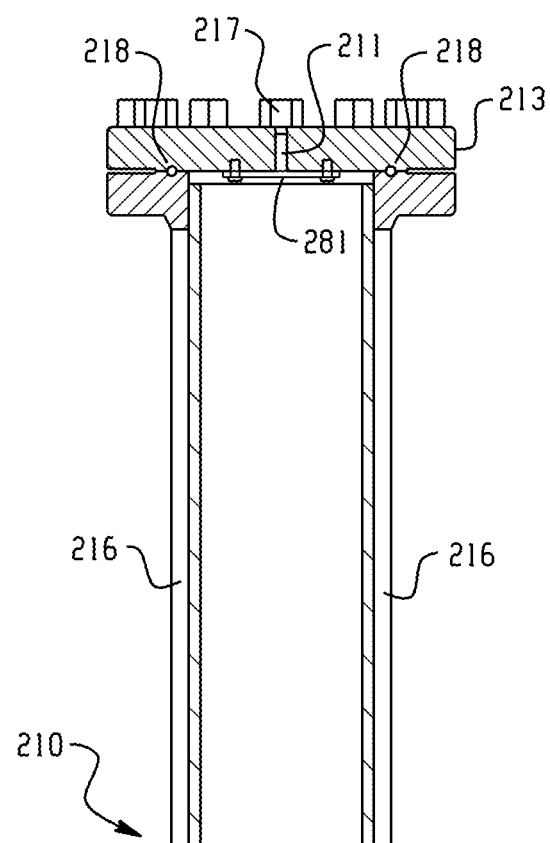
FIG. 4(B) is a top view of an extraction vessel.
Figure 4B:
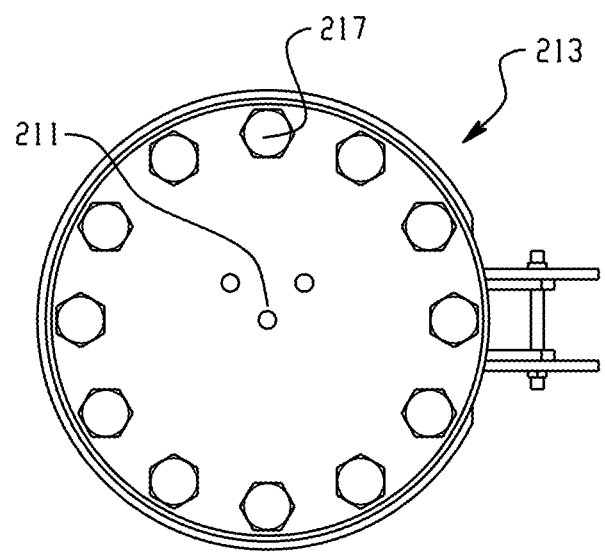
Figure 4A:
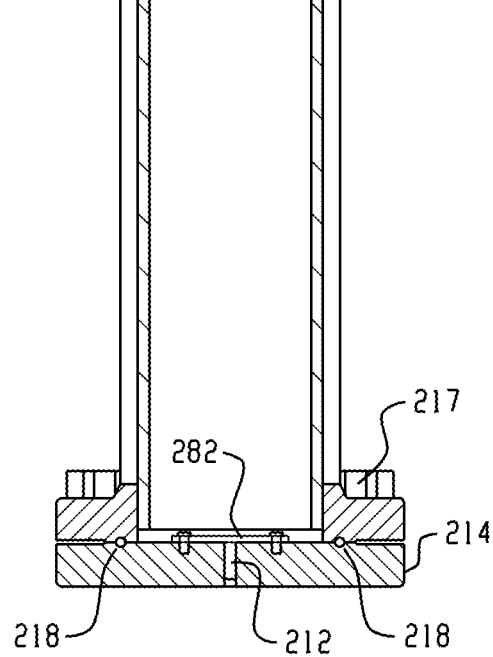
FIG. 4(A) is a cross-section of an extraction vessel.
Figure 4C:
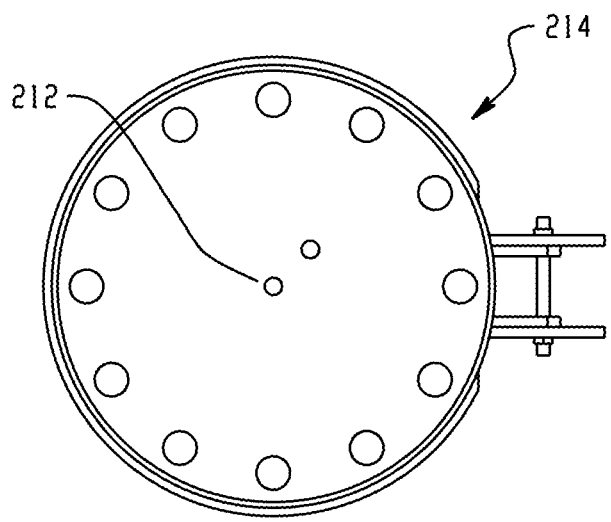
FIG. 4(C) is a bottom view of an extraction vessel.

In the example shown in FIGS. 4A, 4B, and 4C, the extraction vessel 210 can include an interior portion surrounded by an extraction vessel temperature regulator 216, with a first flange 213 and a second flange 214. As also shown in FIG. 4A, O-rings 218 can be used to seal the first and second flanges 213 and 214 of the extraction vessel 210. As also shown in FIG. 4A, the first and second extraction vessel filters 281 and 282 can be located near the first and second extraction vessel openings 211 and 212 respectively.

Figure 5A:
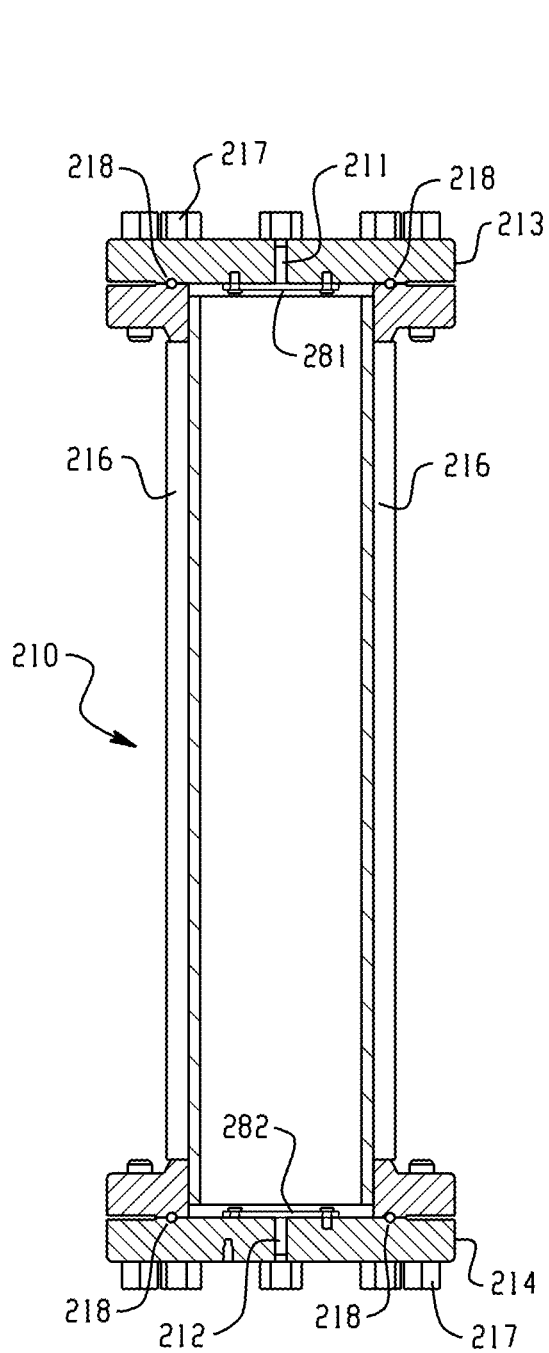
FIG. 5(A) is a cross-section of an extraction vessel.
Figure 5B:
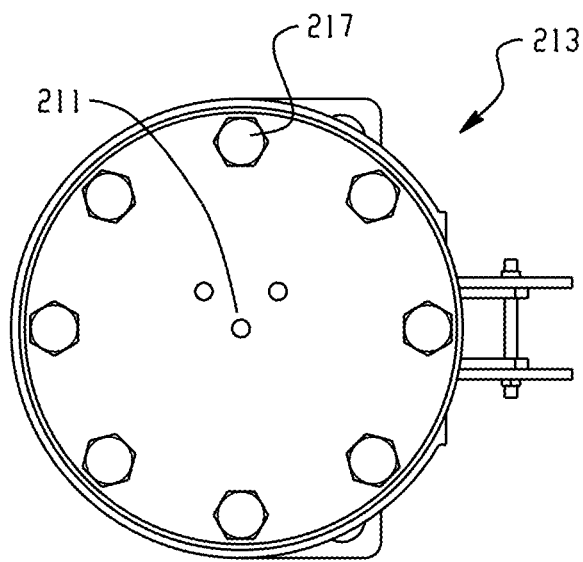
FIG. 5(B) is a top view of an extraction vessel.
Figure 5C:
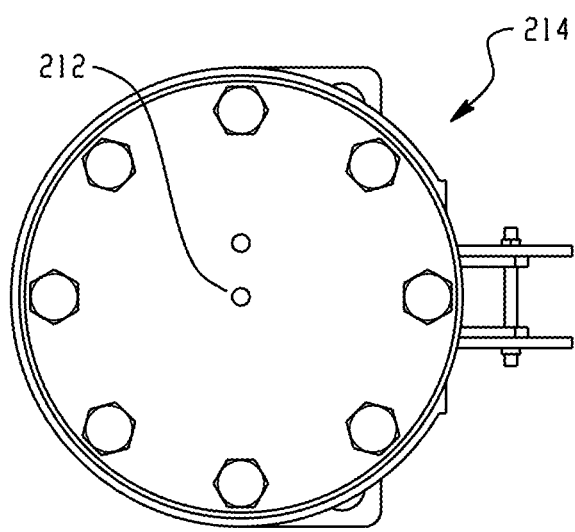
FIG. 5(C) is a bottom view of a extraction vessel.

As shown in FIG. 4B, the first flange 213 can have one or more openings, which may include the first extraction vessel opening 211. As shown in FIG. 4C, the second flange 214 can have one or more openings, which may include the second extraction vessel opening 212. In some examples, the top and bottom flanges can be secured with bolts 217. In some examples, the extraction vessel can be about 20 liters and can be rated to a maximum pressure of about 1500 psi at about 200° F. In other examples, the extraction vessel 210 can be about 5 liters and can be rated to a maximum pressure of about 1500 psi at about 200° F. FIGS. 5A, 5B, and 5C show another example configuration of extraction vessel 210, top flange 213, and bottom flange 214.

Figure 6A:
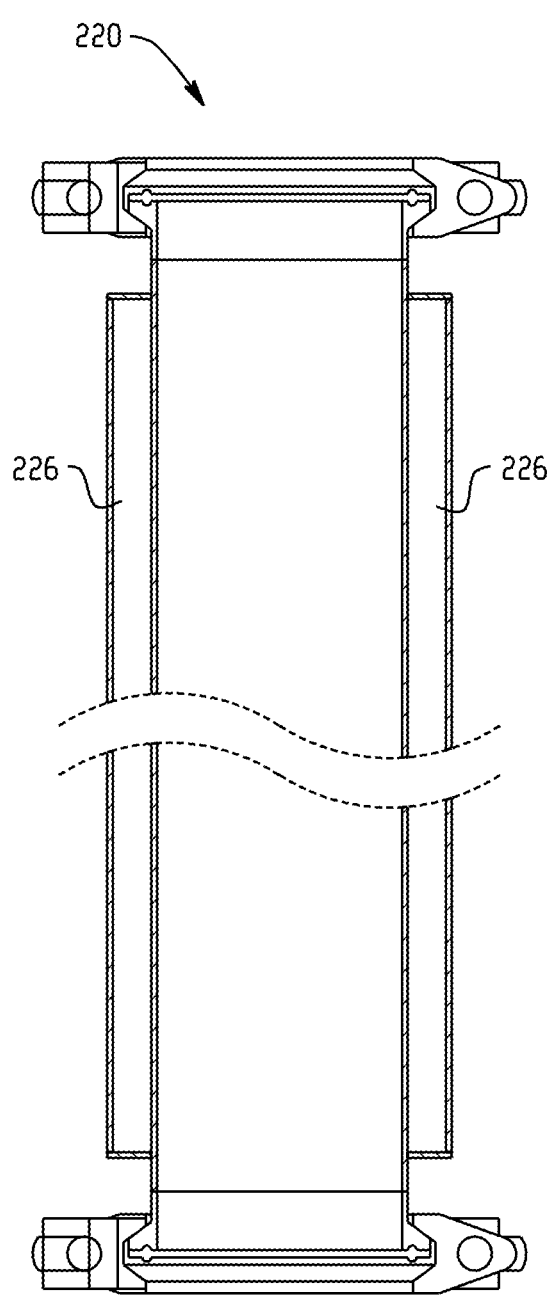
FIG. 6(A) is a cross-section of a separation chamber.
Figure 6B:
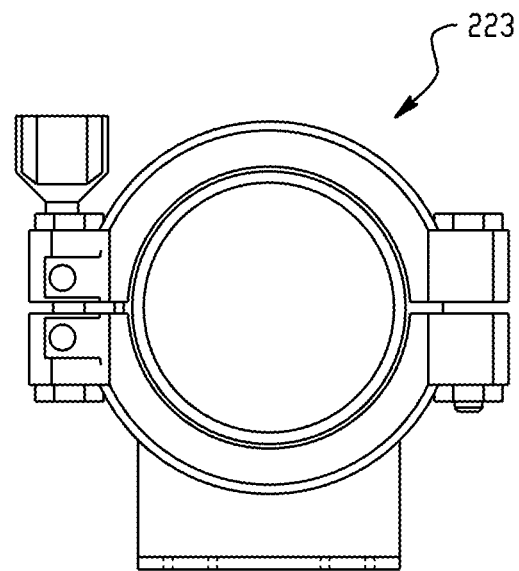
FIG. 6(B) is a top view of a separation chamber.
Figure 6C:
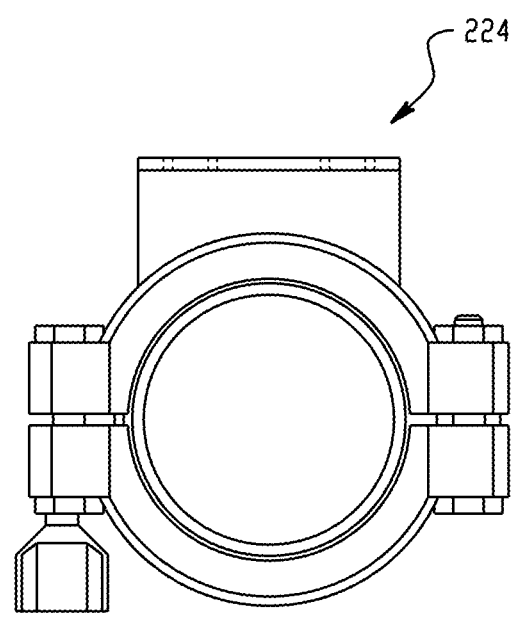
FIG. 6(C) is a bottom view of a separation chamber.

The recirculating extraction apparatus 200 can include a separation chamber 220. As shown in FIG. 6A, the separation chamber 220 can have an interior portion, surrounded by a separation chamber temperature regulator 226. As shown in FIGS. 6B and 6C, the separation chamber 220 can have a first cap 223 and a second cap 224. In some examples, the separation chamber 220 can be rated for about 500 psi at about 200° F.

Figure 7A:
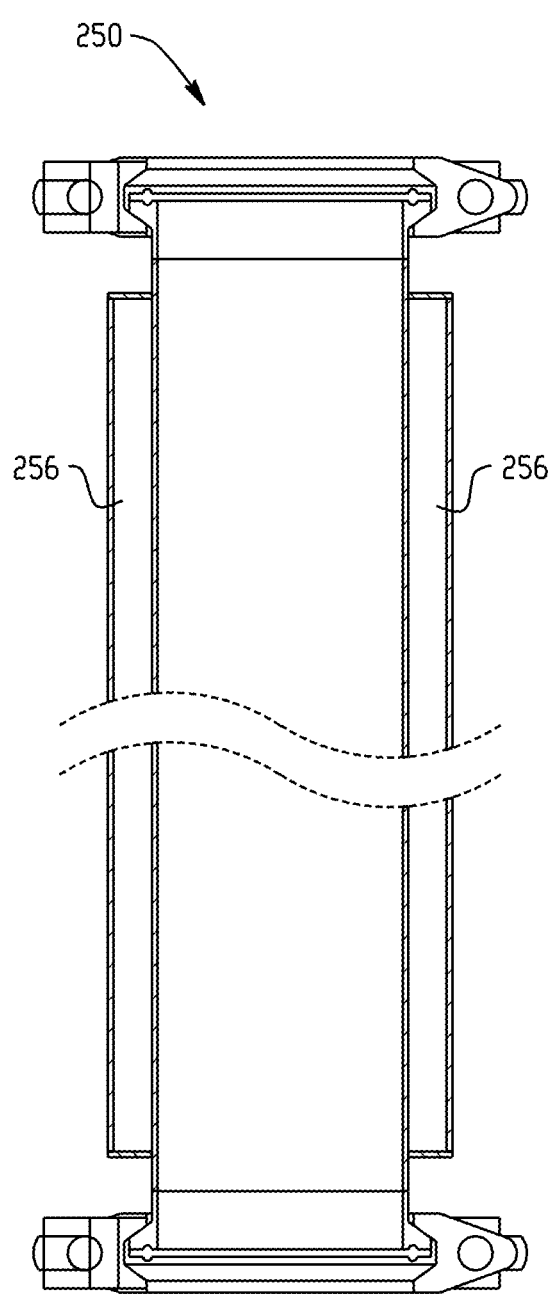
FIG. 7(A) is a cross-section of an overflow chamber.
Figure 7B:
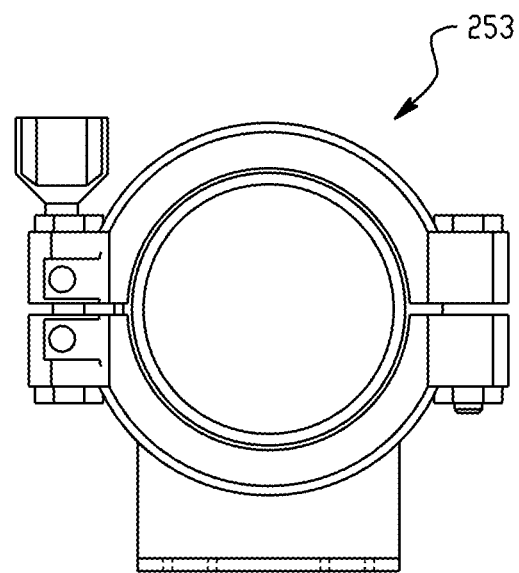
FIG. 7(B) is a top view of an overflow chamber.
Figure 7C:
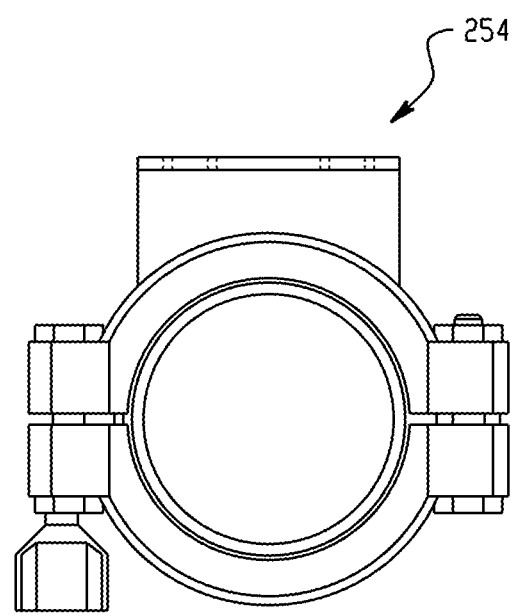
FIG. 7(C) is a bottom view of an overflow chamber.

The recirculating extraction apparatus 200 can include an overflow chamber 250. As shown in FIG. 7A, the overflow chamber 250 can have an interior portion, surrounded by an overflow temperature regulator 256. As shown in FIGS. 7B and 7C, the overflow chamber 250 can have a first cap 253 and a second cap 254. In some examples, the overflow chamber 250 can be rated for about 500 psi at 200° F.

The recirculating extraction apparatus 200 can include a circulation conduit 230 configured to selectively restrict, allow, and reversibly direct flow of the process fluid into and out of the extraction vessel 210. The circulation conduit 230 can also be configured to permit the mixture to flow from the extraction vessel 210 to the separation chamber 220. The circulation conduit 230 can also be configured to permit the process fluid to be recirculated through the extraction vessel 210, separation chamber 220, and overflow chamber 250.

The circulation conduit 230 can be stainless steel in some examples. In other examples, the circulation conduit 230 can be made from one of a family of austenitic nickel-chromium based alloys, such as those supplied commercially under the brand name Inconel® by Special Metals Corporation. In other examples, the circulation conduit 230 can be made from and other suitable material for high corrosion resistance. In other examples, the circulation conduit 230 can be steel or another suitable material for applications with low sanitary requirements. In some examples, the circulation conduit 230 can be sized about 304 stainless steel (SS) with about ⅜ inches diameter, and a wall thickness of about 0.035 inches. The circulation conduit 230 can include flexible portions 231.

In some examples, a pump 290 can be configured to create a desired pressure and to help circulate the process fluid through the system and to recover the process fluid for recirculation. Any type of pump suitable for use with the chosen process fluid 210 could be used, including pumps of varying configurations and which can use particular liquids or gases and be air driven or electrically driven. In some examples, the pump 290 can be an air driven gas booster. In some examples, the pump 290 may operate with a pump fluid, which may be air or any other suitable fluid. In some examples, the pump may be a diaphragm pump.

In some examples, the pump 290 may circulate the pump fluid through a pump fluid circulation line 292. As shown in the example of FIG. 3, the pump fluid circulation line 292 can be configured with one or more valves, such as solenoid valves 235.1, 235.2, 235.3, and safety valve 238. As also shown in FIG. 3, the pump fluid circulation line 292 can be configured with one or more filters, such as pump fluid intake filter 283.

The circulation conduit 230 can include one or more valves configured to selectively restrict, allow, and reverse a direction of flow of the process fluid through the circulation conduit 230 and other portions of the recirculating extraction apparatus 200. In one example arrangement shown in FIG. 3, the system of valves can include thirteen valves, labeled 232.1, 232.2, 232.3, 232.4, 232.5, 232.6, 232.7, 232.8, 232.9, 232.10, 232.11, 232.12, 232.13, configured to selectively restrict, allow, and reverse a direction of flow of the process fluid through the circulation conduit 230 and other portions of the recirculating extraction apparatus 200. In some examples, the valves can be rated from about −22° F. to about 356° F.

In some examples, the circulation conduit 230 can be configured with a system of valves to selectively direct the process fluid to flow within the extraction vessel 210 for a desired time, for example, to allow the extraction process to be completed to a desired extent. In some examples, the recirculating extraction apparatus 200 can be configured with a system of valves to permit reversal of a direction of flow of the process fluid through the extraction vessel 210. In some examples, the reversal of the direction of flow of the process fluid through the extraction vessel 210 can facilitate cleaning or clearing of first and second extraction vessel filters 281 and 282 without interrupting ongoing extraction processing. In some examples, the system of valves can include one or more pairs of opposing valves for directing the flow of process fluid.

In the example apparatus depicted in FIG. 3, the process fluid can be directed in a first direction of flow such that the process fluid enters the extraction vessel 210 through extraction vessel opening 211, passing through extraction vessel filter 212. According to this direct direction of flow, the process fluid can pass through an interior portion of the extraction vessel 210 where it can come into contact with the source material, extract the extracted material, and form the mixture. The mixture can then be directed to exit the extraction vessel 210 at opening 213 and passing through filter 214. Optionally, the valves can be re-configured such that the direction of flow of the process fluid and/or mixture to be reversed, causing the process fluid and/or mixture to enter the extraction vessel 210 at extraction vessel opening 213, pass through extraction vessel filter 214, exit opening 211 and pass through filter 212.

As shown in FIG. 3, the recirculating extraction apparatus 200 can include one or more relief valves 237 to selectively allow the depressurization of fluid at one or more locations within the recirculating extraction apparatus 200. As shown in FIG. 3, the recirculating extraction apparatus 200 can include one or more regulating valves 236. As shown in FIG. 3, the recirculating extraction apparatus 200 can include one or more solenoid valves 235.

The circulation conduit 230 can include a separation portion 234 configured to receive the mixture and permit a portion of the extracted material to separate from the mixture within the separation chamber 220. In some examples, the separation portion 234 can allow the process fluid to decompress in the separation chamber 220 and separate the extracted material from the process fluid without the use of a valve or regulator for separation.

In some examples, the separation portion 234 can include an orifice. The orifice can be sized to match a flow rate of the process fluid. In some examples, the orifice can be about 0.010 inches in diameter. In some examples, the orifice can restrict the flow of process fluid, allowing a significant pressure drop in the mixture after passing through the orifice and allowing the process fluid to change from a subcritical or supercritical state to a gaseous state, thereby allowing the extracted material to fall out, or separate, from the process fluid.

In some examples, the separation portion 234 can be positioned near an inner wall of the separation chamber 220. In some examples, the separation portion 234 can be orientated to direct the process fluid along the inner wall of the separation chamber 220 in a generally rotational manner. In some examples, a portion of circulation conduit 230 leading to the separation portion 234 can be angled at an appropriate angle, which can be about 45°. In some examples, the inner wall of the separation chamber 220 can be relatively warmer than an interior portion of the separation chamber 220. In some examples, directing the process fluid along the inner wall of the separation chamber 220 in a generally rotational manner can help to keep the process fluid in a gaseous state after the process fluid is depressurized in the separation chamber 220. In such examples, the relatively warmer inner wall can help to counteract the Joule-Thompson cooling effect that can occur when the process fluid decompresses.

In some examples, the recirculating extraction apparatus 200 can be configured to receive the process fluid from a process fluid canister 205, which can be a cylinder or any other storage device capable of holding the process fluid.

In some examples, the extraction apparatus 210 can include a heating source 207 configured to heat the process fluid prior to ingress of the process fluid into the extraction vessel 210. In some examples, heating source 207 can heat the process fluid within a process fluid canister 205. The heating source can be a heating blanket, electric band heater, induction heater, coiled tubing with heating fluid in intimate contact, or an open flame.

In some examples, as the process fluid can be heated by the heating source 207, a temperature and the internal pressure of the process fluid rises. If necessary, the heating source 207 can deliver continuous or recurring heat to the process fluid so as to help maintain the pressure within the system.

Optionally, the temperature and internal pressure of the process fluid can be increased to the point of causing a phase transformation of the process fluid. Optionally, this phase transformation can occur within the process fluid canister 205. When the initial state of the process fluid is liquid or gas, increasing the temperature and pressure above the fluid's critical point will cause a phase change to a supercritical state. For example, heating carbon dioxide above about 87° F. at a pressure above about 1083 psi can result in a phase change to a supercritical state.

The initial state of the process fluid in the process fluid canister 205 can be solid, liquid, gaseous, or supercritical. Where the process fluid is in an initial liquid state, a siphon can be optionally used to remove the process fluid from a top opening of the process fluid canister while maintaining consistent pressure. Alternatively, the liquid process fluid can be removed by inverting the process fluid canister 205 such that the opening is on the bottom.

The recirculating extraction apparatus 200 can include a temperature regulator. The temperature regulator can include a temperature regulation fluid and a temperature regulation fluid circulation line 242. In the example shown in FIG. 3, the temperature regulator can include a chiller/heater 244 with temperature regulation fluid circulation line 242 running through the recirculating extraction apparatus 200 to regulate temperature of the process fluid in various locations of the recirculating extraction apparatus 200.

The temperature regulator can be configured to permit recirculation of the temperature regulation fluid. In some examples, the temperature regulation fluid can be liquid water, steam or another other heating/cooling fluids. The temperature regulation fluid circulation line 242 can run in close proximity to the circulation conduit 242. In some examples, the circulation line can form a coil around the temperature regulation fluid circulation line 242.

The temperature regulator can be configured to raise, lower, or maintain the temperature of the process fluid prior to introduction into the extraction vessel 210 to achieve a desired temperature. In some examples, the temperature regulator can be configured to optionally cause a phase change in the process fluid prior to entering the extraction vessel 210.

As shown in the example of FIG. 3, the temperature regulator can include a heat exchanger 246 configured to regulate temperature of the process fluid prior to ingress of the process fluid into the extraction vessel 210. In some examples, the heat exchanger 246 can be a tube-in-tube configuration, allowing the process fluid to be in close physical proximity to the temperature regulation fluid, thereby allowing for the exchange of heat between the two fluids while maintaining their separation from one another. Alternative configurations of the heat exchanger 246 could include a shell & tube design, a coil design, or any other method of heat exchange.

In some examples, a regenerative heat exchanger can be configured to help regulate the temperature of process fluid at the beginning and the end of the closed-loop recirculating system. In some examples, the regenerative heat exchanger can use heat generated from the compression of process fluid by the pump at the beginning of the cycle to offset Joule-Thompson cooling that can occur when the process fluid decompresses in the separation chamber.

In the example shown in FIG. 3, a regenerative heat exchanger 248 comprises two portions of the circulation conduit 230 running in close proximity to one another to transfer heat from a relatively warm portion of the circulation conduit 230 to a relatively cool portion of the circulation conduit 230. In some examples, the regenerative heat exchanger 248 can be a tube-in-tube configuration, allowing a relatively warm portion of the process fluid to be in close physical proximity to a relatively cool portion of the process fluid, thereby allowing for the exchange of heat between the two portions while maintaining their separation from one another. Alternative configurations of the heat exchanger 248 could include a shell & tube design, a coil design, or any other method of heat exchange.

In some examples, the temperature regulator can be configured to regulate the temperature of the process fluid within the extraction vessel 210. In some examples, temperature regulator can be configured to regulate the temperature of the process fluid within the separation chamber 220. As shown in the example of FIG. 3, the recirculating extraction apparatus 200 can include an extraction vessel temperature regulator 216, a separation chamber temperature regulator 226, and an overflow chamber temperature regulator 256. As shown in this example, the temperature regulation fluid circulation line 242 can extend to the extraction vessel temperature regulator 216, the separation chamber temperature regulator 226, and the overflow chamber temperature regulator 256 and allow the temperature regulation fluid to flow through each of these components. In some examples, the temperature regulators 216, 226, and 256 can be a heating/cooling jacket. Alternative configurations could include a shell & tube design, a coil design, or any other method of heat exchange.

In some examples, the temperature regulator can regulate the temperature of the process fluid in other portions of the circulation conduit 230. In one example, a portion of the circulation conduit 230 connecting the extraction vessel 210 with the separation chamber 220 could run in close proximity to the temperature regulation fluid circulation line 242. Alternative configurations could include a shell & tube design, a coil design, or any other method of heat exchange. Any other portion of the circulation conduit 230 could be regulated in the same ways.

In some examples, a collection cup 222 can be used to capture the extracted material after separation from the process fluid in the separation chamber 220.

In other examples, a valve, such valve 232.9 shown in FIG. 3, can be used to direct the extracted material out of the separation chamber 220 after separation from the process fluid while the separation chamber 220 remains under pressure.

As shown in FIG. 3, the recirculating extraction apparatus 200 can include one or more pressure gauges 271 to indicate a pressure of fluid at one or more locations within the recirculating extraction apparatus 200. As shown in FIG. 3, the recirculating extraction apparatus 200 can include one or pressure transducers 272 to sense a pressure of fluid at one or more locations within the recirculating extraction apparatus 200. As shown in FIG. 3, the recirculating extraction apparatus 200 can include one or more thermocouples 273 to sense a temperature of fluid at one or more locations within the recirculating extraction apparatus 200.

Figure 8:
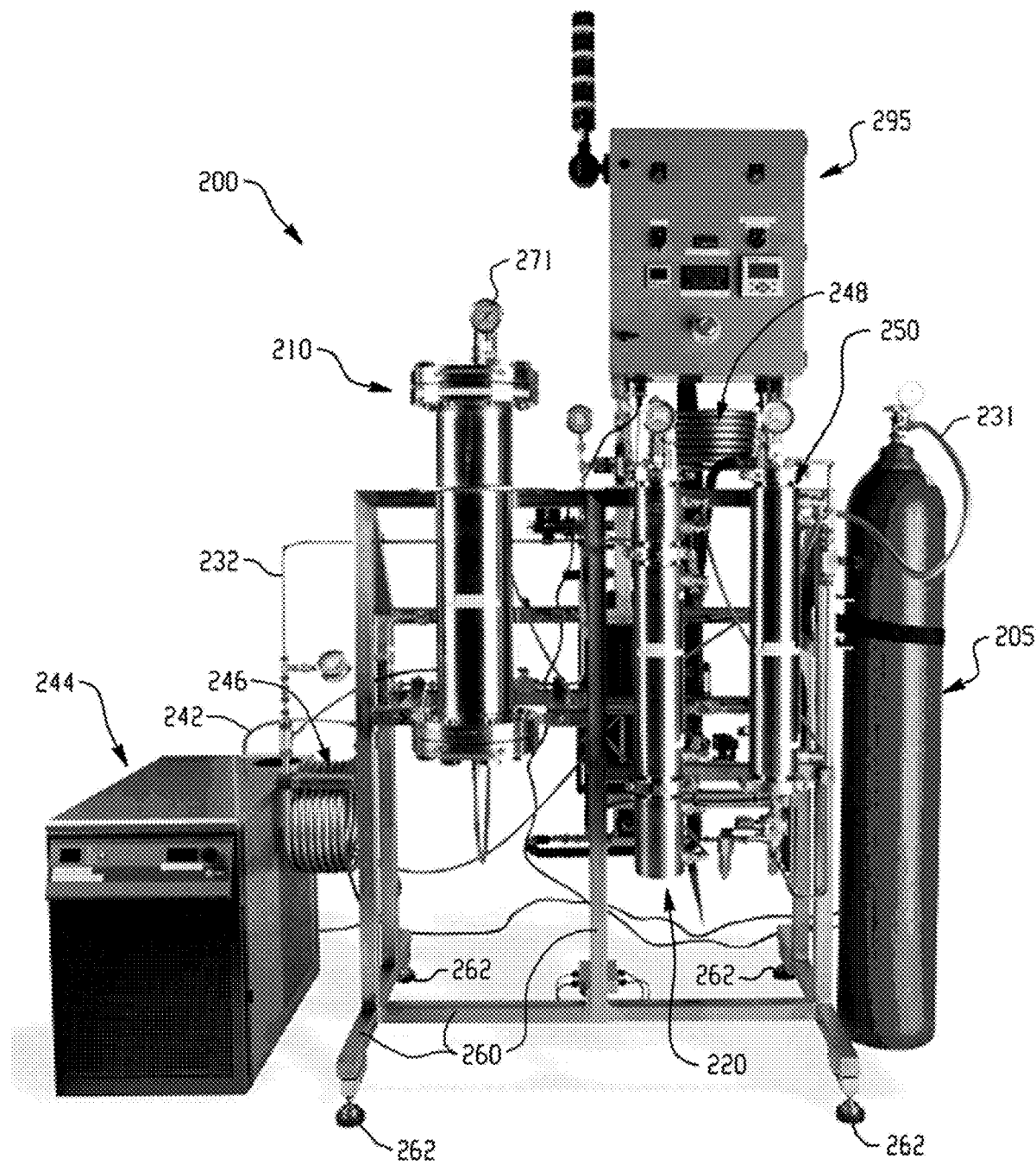
FIG. 8 is a perspective view of an extraction system.

In the example shown in FIG. 8, some of the described aspects of the recirculating extraction apparatus 200 are shown mounted on a frame 260 in an exemplary arrangement. In some examples, a system scale 262 can be incorporated into the apparatus 200 below the frame 260.

In some examples, the extraction apparatus 100 and recirculating extraction apparatus 200 can display system parameters such as temperature, pressure, and time. In some examples, the extraction apparatus 100 and recirculating extraction apparatus 200 can receive data on system parameters from one more sensors. For example, in the apparatus shown in FIG. 1, pressure can be displayed on pressure gauges 171. Optionally, pressure and other system parameters can be displayed on an electronic control panel or other suitable display mechanism. In the example shown in FIG. 3, a control panel could display pressure data received from sensor such as pressure gauges 271 and pressure transducers 272. The control panel could also display temperature data received from sensor such as thermocouples 173.

In some examples, various aspects of the operation of the extraction apparatus 100 and recirculating extraction apparatus 200 can be automated with a control system. The control system can include electronic components and mechanical components. In some examples, the control system can be configured to automate the operation of the system based upon data supplied by sensors or based upon the lapse of time. For example, in the device shown in FIG. 3, the control system could be configured to turn on or off the chiller/heater 244 or the pump 290, in response to data supplied by the sensors or the lapse of time. The system could also be configured to implement certain other logical operations helpful in system operation. For example, the control system can be configured to run certain operations for a certain elapsed period of time or based upon certain data received from sensors and thereafter perform a desired function or set of functions, such as open or close certain valves. In the example of FIG. 3, the control system could be configured to open or close any of valves 232.1 through 232.13, any of the relief valves 233, any of the solenoid valves 135, any of the regulating valves 136, and any of the safety valves 138.

In the example shown in FIG. 8, the apparatus 200 can have a control box 295 that can include either or both of the control panel and control system. The control box could be electrically connected to the various sensors and system components of the apparatus 200.

Examples, of methods of operating the system disclosed in FIG. 3 will now be disclosed. As an initial state, the system can be confirmed to be clean.

The extraction vessel 210 can be opened with the following steps. Close valves 232.1 and 232.2. Open valves 232.3 and 232.4. Remove bolts on the top of the extraction vessel 210, for example using a 1.5" impact socket and impact wrench. Lift the flange and allow it to rest in the open position on the stops.

The extraction vessel 210 can be loaded with source material, optionally with a funnel to avoid spillage. The source material can be prepared in a desired fashion. For example, the source material could be ground, gently compressed, or otherwise prepared. The system scale 262 can be used to weigh the amount of source material loaded.

Once the desired amount of source material is loaded, the extraction vessel can be closed and sealed. In some examples, the sealing surfaces can be checked to be clean and generally free of debris. In some examples, O-rings can be inspected for any visible damage or defects and replaced as necessary. In some examples, the O-rings do not require lubrication. In some examples, an extraction vessel flanges 213 and 214 can be closed and closure bolts 217 installed.

The recirculating extraction apparatus 200 can be evacuated of moisture or other fluids. The following valves can be opened: 232.1, 232.2, 232.3, 232.5, 232.10, 232.11, 232.12, and 232.13. A pump can be connected to valve 232.10 and the system pumped down to a desired pressure, for example 20-25 in. Hg. This pressure can be held for several minutes to ensure no gross leaks and to remove moisture. All valves can be closed and the pump disconnected from valve 232.10.

Process fluid can be filled according to the following steps. Tare the scale by pushing a "tare/reset" key. Open a valve on the process fluid canister 205. Open valves 232.1, 232.3, 232.5, and 232.7. Pressurize and fill extraction vessel 210 by slowly opening valve 232.13. Extraction vessel 210 can be pressurized from both top and bottom. Allow extraction vessel 210 pressure to equalize with the pressure in the process fluid canister 205. Shut valves 232.5 and 232.13. Pressurize the separation chamber 220 and overflow chamber 250 to 300 psi by opening valve 232.12 and throttling valve 232.11. Close valve 232.11 when pressure in the separation chamber 220 and overflow chamber 250 is approximately 300 psi. Increase extraction vessel 210 pressure by turning the switch to "START" on control panel. Once extraction vessel 210 pressure has reached desired pressure, open valve 232.6. Shut valve 232.12. Open valve 232.11. Allow system to stabilize for approximately 5 minutes.

At this stage in the example method, the system can be now circulating process fluid 210 and begin extracting. It may be necessary to adjust the amount of process fluid 210 in the system to maintain a desired extraction pressure. To increase pressure in the extraction vessel 201, the following steps can be performed. Shut valve 232.11. Open valve 232.12 until extraction vessel 210 reaches the desired pressure or the separation chamber 220 or overflow chamber 250 reach 450 psi. Shut valve 232.12. Open valve 232.11. Allow the system to stabilize, and repeat as necessary. To decrease pressure in the extraction vessel 210, the following steps can be performed. Shut one of valves 232.1 and 232.5 (only one of them will be open). Throttle valve 232.13 and allow the extraction vessel pressure to decrease to a desired level. Shut valve 232.13. Open one of valves 232.1 or 232.5 (whichever was previously opened).

In the example shown in FIG. 3, the process fluid 210 can flow through the circulation conduit 230 according to the following path: (1) out of the left side of the pump 290, (2) down to the regenerative heat exchanger 248, (3) up and over to the heat exchanger 246, (4) through the extraction chamber 210, (5) through the safety valve 238, (6) through the separation portion 234 within in the separator chamber 220, (7) to the regenerative heat exchanger 248, (8) through the overflow chamber 250, (9) through filters 284 and 285, and (10) back up to the pump 290.

In the example shown in FIG. 3, the temperature regulation fluid can flow through the temperature regulation fluid circulation line according to the following path: (1) out of the chiller/heater 244, (2) through the temperature heat exchanger 246, (3) through the extraction vessel temperature regulator 216, (4) through the separation chamber temperature regulator 226, (5) through the overflow chamber temperature regulator 226, and (6) back up to the chiller/heater 244.

In some examples, a control system can be equipped with a timer that will automatically shut down the system after a set amount of time has elapsed. The timer can be adjusted at any time during the extraction. Actual time elapsed can be displayed.

In some examples, a flow of the process fluid within in the extraction vessel 210 can be reversed during operation. For example, to back flush a clogged filter, to prevent channeling through the source material, or both. In some examples, one or more of the extraction vessel filters 281 or 282 can be back-flushed when a differential pressure greater than 300 psi exists between the extraction vessel 210 pressure and either the pressure at either of the extraction vessel openings 211 or 212.

According to some examples, a first direction of flow through the extraction vessel 210 can be reversed according to the following steps. Open valve 232.5. Open valve 232.2. Shut valve 232.1. Shut valve 232.6.

According to some examples, following a first reversal of direction of the process fluid, a second direction of flow through the extraction vessel 210 can be reversed according to the following steps. Open valve 232.1. Open valve 232.6. Shut valve 232.5. Shut valve 232.2.

According to some examples, the separation portion 234 may include an orifice and an orifice filter. The orifice and orifice filter can be unclogged according to the following steps. Shut valve 232.2 and valve 232.6 (only one of them will be open). Allow the pump 290 to draw the process fluid out of the separation chamber 220 and overflow chamber 250 and transfer the process fluid to the extraction vessel 210. Optionally, a portion of the process fluid can be transferred back to the process fluid canister 205 by shutting valves 232.1 and 232.5, throttling valve 232.14 to direct pump output to the process fluid canister, then shutting valve 232.13 and re-opening valve 1 or 5.

Continuing with the example method for unclogging an orifice and orifice filter, when the separation chamber 220 and overflow chamber 250 reach approximately 70 psi, the pump can be configured to automatically turn off. Shut valve 232.11. Open valve 232.10 to relieve any residual pressure in the separation chamber 220 and overflow chamber 250. Remove the separation chamber top flange 213. Remove the orifice and orifice filter. Clean the orifice and the orifice filter by soaking them in acetone or methanol and blowing them out with compressed air. Verify the orifice is clear by looking through it.

Continuing with the example method for unclogging the orifice and orifice filter, after cleaning the orifice and orifice filter, reassemble the orifice and filter using tape, for example tape having a polytetrafluoroethylene coating such as Teflon® supplied by DuPont. Use caution to prevent excess Teflon tape from getting into the orifice. Tighten the orifice assembly such that the orifice points toward the separation chamber inner wall. Replace the separation chamber top flange 213 and tighten the clamp bolts 217 to about 20 ft-lbs. Close valve 232.10. Open valve 232.12. Pressurize separation chamber 220 and overflow chamber 250 to about 300 psi by opening valve 12 and throttling valve 232.11. Close valve 232.11 when separator pressure is approximately 300 psi. In some examples, the pump can be configured to automatically re-start when separator vessel pressure is above about 70 psi. Open valve 232.2 or valve 232.6 (whichever valve was previously opened) to restart the extraction. Shut valve 12. Open valve 232.11. Increase or decrease extractor vessel pressure as described above.

Once the extraction is complete to a desired extent, the process fluid can be recovered according to the following method. Increase the temperature of the chiller/heater 244 to at least about 110° F. Open valve 232.6 and shut valve 232.2 (they may already be in this position). Shut valve 1 and valve 5 (only one of them will be open). Open valve 232.13 slowly to allow flow into the process fluid canister 205. When separation chamber 220 pressure is less than about 200 psi, shut valve 232.6 and open valves 232.2 and 232.8. In some examples, the pump 290 can be configured to shut down automatically when separation chamber pressure reaches about 70 psi. Close process fluid canister valve. Vent remaining process fluid out of the system by opening valves 232.10, 232.1 and 232.4 and allow residual pressure in the system to vent. The system can now be powered down, or new source material can be loaded and the extraction process started again.

In some examples, the orifice can be sized such that a flow rate of the process fluid into the separation chamber 220 matches a flow rate of the process fluid from the pump 290.

In examples, in which the process fluid is supercritical carbon dioxide, the following system parameters and orifice sizes can be used. Chiller/heater temperature: about 110° F. to about 120° F. Extraction vessel pressure: about 1200 psi to about 1400 psi. Orifice size: Size #15 orifice for about 30 cubic feet per minute (CFM) air flow (about 7.5 horse power (HP) air compressor); Size #15 orifice for about 60 CFM air flow (about 15 HP air compressor); Size #25 orifice for about 100 CFM air flow (about 25 HP air compressor). Weight of CO2 in system: approximately 12 pounds for about 5 L extraction vessel systems and about 30 pounds for about 20 L extraction vessel systems. Separation chamber and overflow chamber pressure: about 350 psi to about 400 psi. Separation chamber and overflow chamber temperature: about 70° F. to about 80° F.

In examples, in which the process fluid is subcritical carbon dioxide, the following system parameters and orifice sizes can be used. Chiller/heater temperature: about 60° F. to about 70° F. Extraction pressure: about 1100 psi to about 1400 psi. Orifice size: size #10 orifice for about 30 CFM air flow (about 7.5 HP air compressor); size #15 orifice for about 60 CFM air flow (about 15 HP air compressor); size #20 orifice for about 100 CFM air flow (about 25 HP air compressor). Weight of CO2 in system: approximately 17 pounds for the about 5 L extraction vessel systems and about 45 pounds for the about 20 L extraction vessel systems. Separation chamber and overflow chamber pressure: about 250 psi to about 300 psi. Separation chamber and overflow chamber temperature: about 20° F. to about 30° F.

In Subcritical CO2 operation, the extraction vessel 210 can be full of liquid CO2. In such examples, CO2 can be added to the system after extraction has begun in order to maintain a desired extraction pressure.

An example of a fractional extraction apparatus that includes dual phase recirculation of the process fluid will now be discussed in connection FIGS. 9(A), 9(B), and 9(C), which depict portions 0.1, 0.2, and 0.3, respectively, of the exemplary fractional extraction apparatus.

As shown in these figures, a circulation conduit 930, which may include flexible portions 931, connects various components of the fractional extraction apparatus, including process fluid canisters 905, first and second extraction vessels 910.1 and 910.2, first, second, and third separation chambers 920.1-920.3, an overflow chamber 950, a gas pump 990, and a liquid pump 995.

The extraction vessels can each have two extraction vessel openings, each with extraction vessel filters. The filters can be 20 micron standard or any other suitable size.

The first extraction vessel 910.1 is shown with first extraction vessel filter opening 911.1 and second extraction vessel opening 912.1. The second extraction vessel 910.2 is shown with first extraction vessel filter opening 911.2 and second extraction vessel opening 912.2.

Multiple extraction vessel configurations may be used. For example, 5 liter, 20 liter, two 5 liter, or two 20 liter extraction vessels. In some examples, the 5 liter extraction vessel holds up to 3 pounds of dry, grounded source material. In some examples, the 20 liter extraction vessel holds up to 12 pounds of dry, ground material. In some examples, the extraction vessel does not need to be full in order to perform an extraction. In some examples, the extraction vessel is rated for a maximum pressure of 5000 psi (344 bar). In some examples, the extraction vessel is rated for a maximum temperature of 160 degrees Fahrenheit (71 degrees Celsius). In some examples the extraction vessel is made of 304 stainless steel (A2 stainless steel). In some examples the extraction vessel interior is polished to food grade level. In some examples, the extraction vessel openings have threaded closures. In some examples the extraction vessel openings have a sealing mechanism, which can be a self-energized o-ring seal, Buna-90. In some examples, the extraction vessel can include a non-isolable spring loaded safety relief valve to prevent accidental over-pressurization.

The gas pump 990 can be configured to receive the process fluid in a gaseous state and compress the process fluid. In some examples, gas pump 990 can be configured to receive the process fluid at a pressure of about 400 psi and compress the process fluid to a pressure in the range of 1,000 psi. to 2,000 psi. In one embodiment, gas pump 990 can be configured to compress the process fluid to a pressure of 1,200 psi. In another exemplary configuration, gas pump 990 can be configured to compress the process fluid to about 1,500 psi.

In some examples, an air driven gas booster with a flow rate of 15 CFM can be used to help recirculate the process fluid in connection with the apparatuses disclosed herein. In some examples, the air driven gas booster can have all wetted parts made of 316 stainless steel. In some examples, the air driven gas booster can include a coalescing filter on its inlet to prevent oil introduction. In some examples, a non-isolable spring loaded safety relief valve can be used to prevent accidental over-pressurization.

The liquid pump 995 can be configured to receive the process fluid in a liquid state and compress the process fluid. In some examples, liquid pump 995 can be configured to receive the process fluid at a pressure of about 400 psi and compresses it to about 5,000 psi. In other examples, liquid pump 995 can be configured to compress the process fluid to about 1,500 psi. The liquid pump 995 could be configured to compress the process fluid to any other predetermined pressure for which the liquid pump 995 is capable in order to extract a predetermined extracted material from a particular source material.

Multiple separation chamber configurations may be used. For example, the separation chambers may be 5 liter or 2.5 liter separation chambers. In some examples, the separation chambers 920.1-920.3 may be rated for a maximum pressure of 600 psi (41 bar) and a maximum temperature of 160 degrees Fahrenheit (71 degrees Celsius). In some examples, the separation chambers 920.1-920.3 may be made of 304 stainless steel. In some examples, the separation chambers 920.1-920.3 may have closures that are of FDA sanitary style bolted. In some examples, the separation chambers 920.1-920.3 may have a sealing mechanism that is a sanitary gasket of cured silicone. In some examples, the separation chambers 920.1-920.3 may have non-isolable spring loaded safety relief valves to prevents accidental over-pressurization. In some examples, the separation chambers 920.1-920.3 may have features for facilitating the collection and/or removal of the separated extracted material as shown in previous examples. For example, a cup or a vent may be used to remove the extracted material from the separation chamber.

Figure 9A:
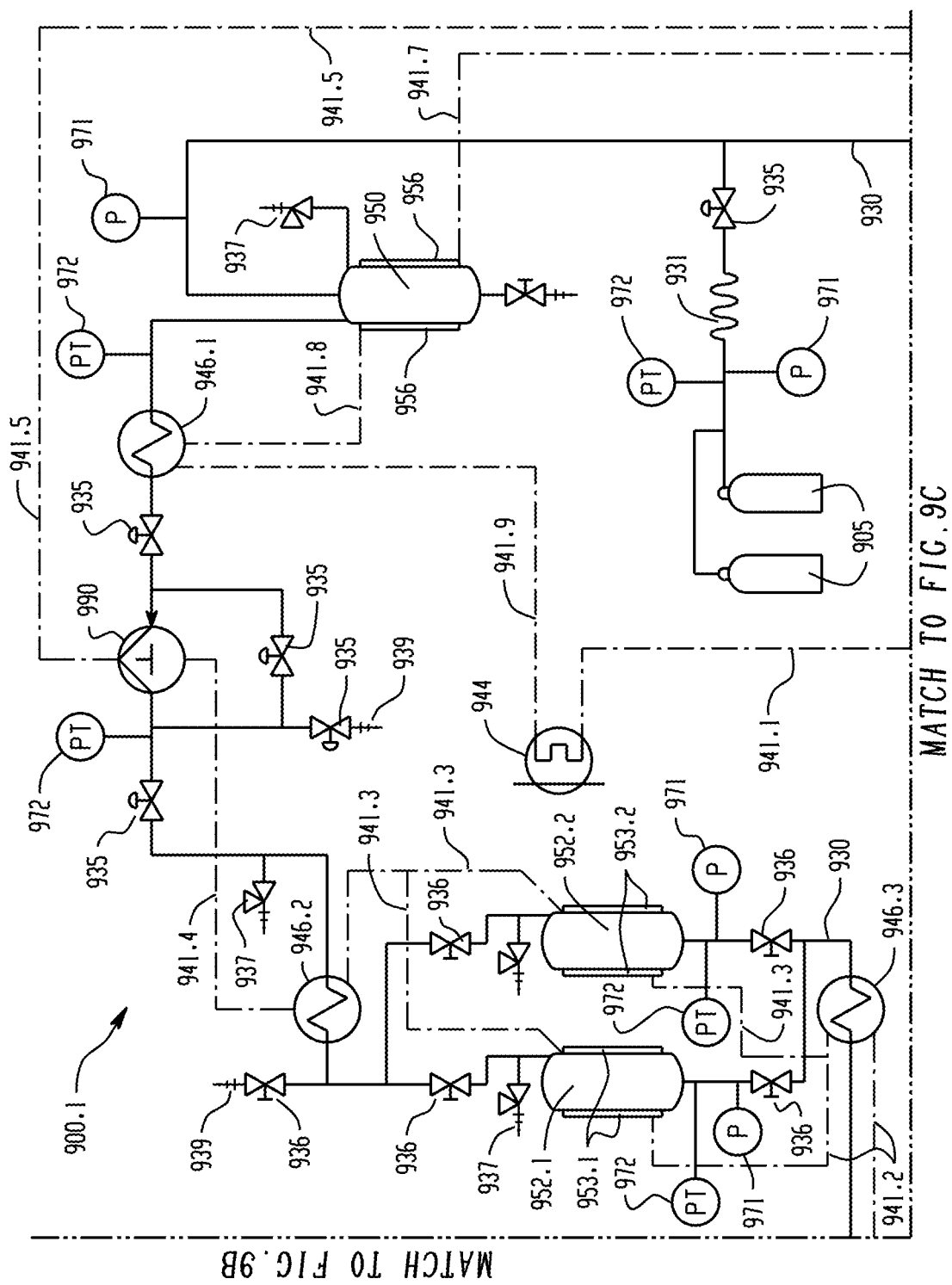
FIG. 9(A) is a schematic diagram of first portion of a fractional extraction apparatus.
Figure 9B:
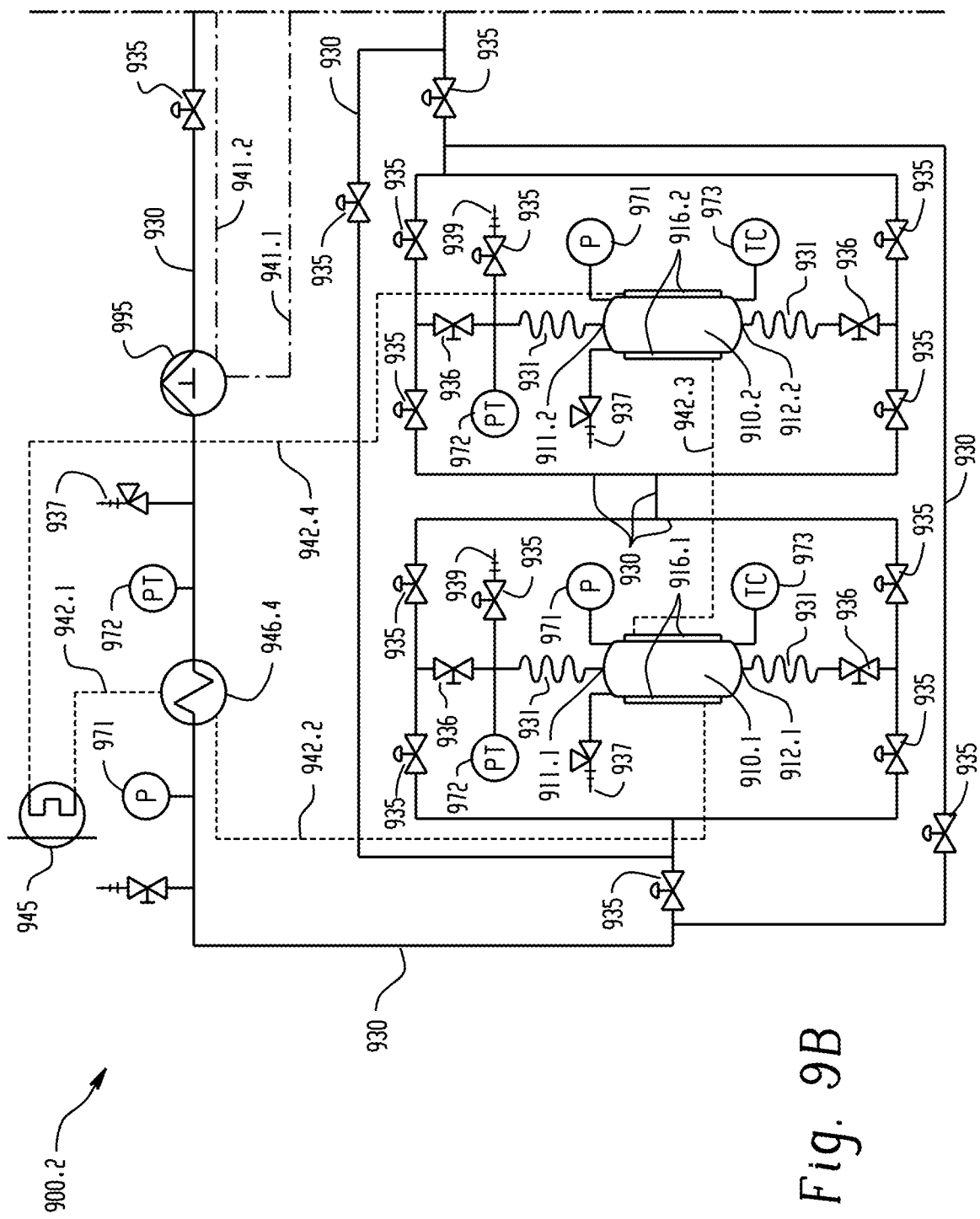
FIG. 9(B) is a schematic diagram of second portion of a fractional extraction apparatus.
Figure 9C:
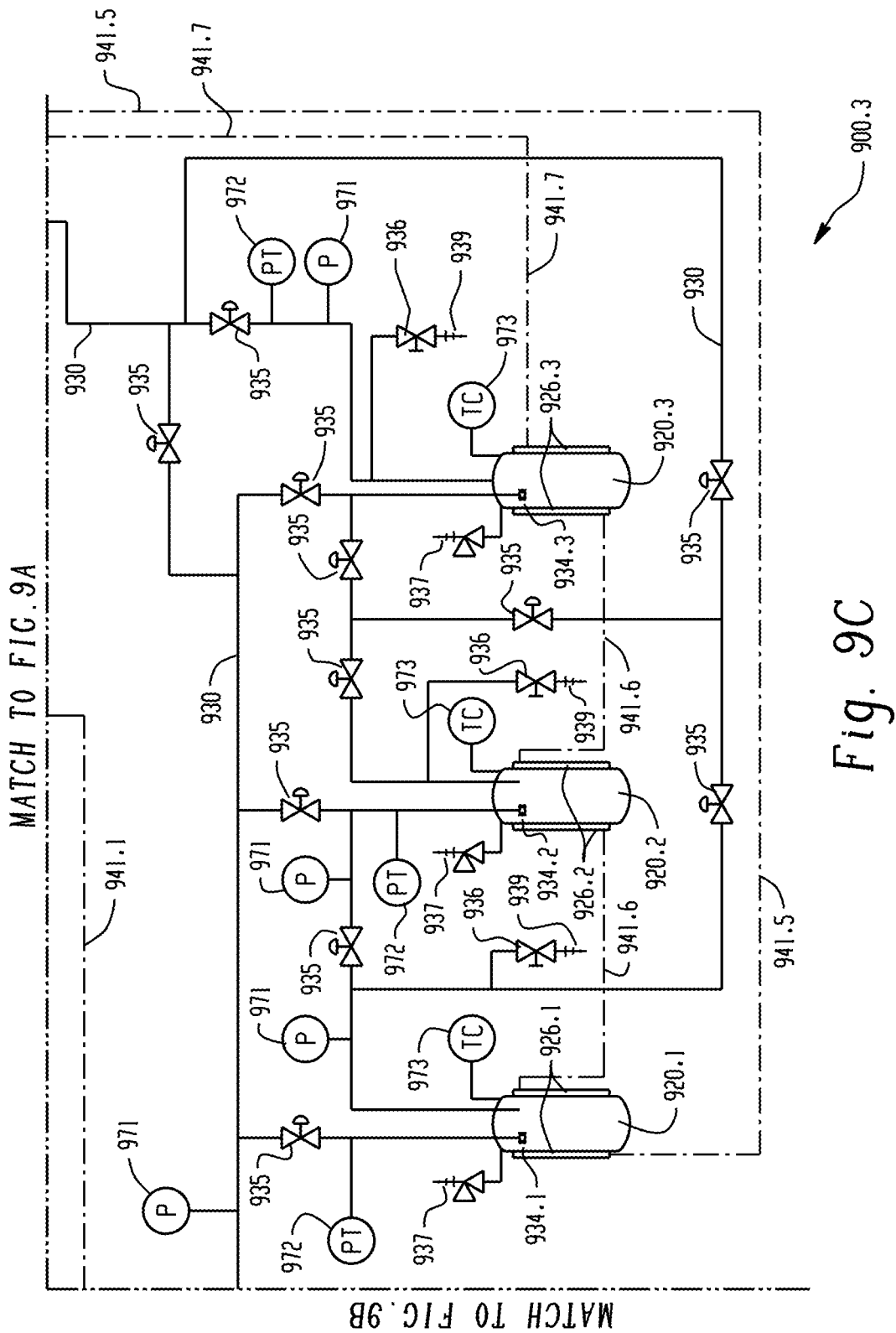
FIG. 9(C) is a schematic diagram of third portion of a fractional extraction apparatus.

As shown in the figures with consistent symbols throughout FIGS. 9(A), 9(B), and 9(C), various air operated valves 935, manual valves 936, relief valves 937, vents 939, may be connected to the circulation conduit 930. As also shown in the figures with consistent symbols throughout FIGS. 9(A), 9(B), and 9(C), various pressure gauges 971 (marked with a "P" in the figures), pressure transducers 972 (marked with a "PT" in the figures), thermocouples 973 (marked with a "TC" in the figures), are shown connected to the circulation conduit 930 and other components of the fractional extraction apparatus.

As discussed in previous examples, the circulation conduit can be configured by manipulating the various valves to selectively direct a process fluid into or out of either of the first or second openings of an extraction vessel, passing through an extraction vessel filter at each opening, and may be reversibly directed. As discussed in previous examples, the process fluid can come into contact with a source material within the extraction vessel to form a mixture. As discussed in previous examples, the circulation conduit can be configured by manipulating the various valves to selectively allow and reversibly direct flow of the mixture into or out of the first or second extraction vessel openings while allowing continuous flow of the mixture to the separation chamber.

In the example configuration shown in FIG. 9B the circulation conduit 930, air operated valves 935, and manual valves 936, may be configured to selectively allow or reversibly directed flow of the process fluid or a mixture into or out of any of the extraction vessel openings shown in FIB 9B or to any of the separation chambers shown in FIG. 9C.

In this example, the process fluid can be directed into a predetermined extraction vessel, i.e. either first extraction vessel 910.1 or second extraction vessel 910.2, through a predetermined opening of the predetermined extraction vessel, i.e. openings 911.1, 912.1 and their associated filters, in the case of first extraction vessel 910.1 or, in the case of second extraction vessel 910.2, openings 911.2 or 912.2 and their associated filters. The mixture formed by the process fluid and source material within the predetermined extraction vessel can then be directed out of either of the two openings of the predetermined extraction vessel and can either be selectively directed to any of the openings of the two extraction vessels, including back into the opening it just exited, or to any of the three separation chambers 920.1, 920.2, and 920.3 shown in FIG. 9C.

As also discussed in connection with previous examples, the circulation conduit 930 can include a separation portion. In the example shown in FIG. 9C, first, second, and third separation portions, 934.1, 934.2, and 934.3, are respectively located within first, second, and third separation chambers 920.1, 920.2, and 920.3. As discussed in connection with previous examples, each separation portion 934.1, 934.2, or 934.3 can be configured to receive the mixture and permit a portion of the extracted material to separate from the mixture within the separation chamber 920.1, 920.2, and 920.3. In some examples, the separation portion can allow the process fluid to decompress in the separation chamber and separate the extracted material from the process fluid without the use of a valve or regulator for separation.

As discussed in previous examples, the separation portion 934.1, 934.2, or 934.3 can include an orifice. The orifice can be sized to match a flow rate of the process fluid. In some examples, the orifice can restrict the flow of process fluid, allowing a significant pressure drop in the mixture after passing through the orifice and allowing the process fluid to change from a subcritical or supercritical state to a gaseous state, thereby allowing the extracted material to fall out, or separate, from the process fluid.

In some examples, the separation portion 934.1, 934.2, or 934.3 can be positioned near an inner wall of the separation chamber 920.1, 920.2, or 920.3. In some examples, the separation portion 934 can be orientated to direct the process fluid along the inner wall of the separation chamber 920 in a generally rotational manner. In some examples, a portion of circulation conduit 930 leading to the separation portion 934.1, 934.2, or 934.3 can be angled at an appropriate angle, which can be about 45°. In some examples, the inner wall of the separation chamber 920.1, 920.2, or 920.3 can be relatively warmer than an interior portion of the separation chamber 920.1, 920.2, or 920.3. In some examples, directing the process fluid along the inner wall of the separation chamber 920.1, 920.2, or 920.3 in a generally rotational manner can help to keep the process fluid in a gaseous state after the process fluid is depressurized in the separation chamber 920.1, 920.2, or 920.3. In such examples, the relatively warmer inner wall can help to counteract the Joule-Thompson cooling effect that can occur when the process fluid decompresses.

As discussed in previous examples, the fractional extraction apparatus can include a temperature regulator for regulating the temperature of the process fluid. In the example shown in FIG. 9B, the temperature regulator includes a chiller/heater 945 connected to a temperature regulation line with portions 0.1-0.4 configured to recirculate a temperature regulation fluid, for example water or another fluid. In some examples, the chiller/heater can have a temperature range of −10 degrees Celsius to 70 degrees Celsius (14 degrees Fahrenheit to 158 degrees Fahrenheit).

A fourth conduit heat exchanger 946.4 is connected to the temperature regulation line. Extraction vessel heat exchangers 916.1 and 916.2, for example heating/cooling jackets, are also connected to portions of the temperature regulation line, and are configured to assist in the regulation of the process fluid within the extraction vessels 910.1 and 910.2 respectively.

The temperature regulator can also be configured to selectively cause the process fluid to change state. For example, by heating high pressure liquid process fluid at fourth conduit heat exchanger 946.4, the temperature regulator can cause the process fluid to change from a liquid state to a supercritical state.

The temperature regulator shown in FIG. 9B can facilitate the regulation of the process fluid during extraction to a predetermined temperature. In concert with the configuration of other system components, including the compression of the process fluid to a predetermined pressure by gas pump 995, and the size opening of the separation portion 934.1, 934.2, or 934.3, the fractional extraction apparatus can be configured to create a predetermined temperature and pressure of the process fluid within one or both extraction vessels 910.1 and 910.2 to remove a predetermined extracted material from the source material. Alternatively, the disclosed fractional extraction apparatus can be configured to create a different predetermined temperature and a different predetermined pressure of the process fluid to remove a different predetermined extracted material from the source material.

In some examples, a first predetermined extracted material may have a relatively light molecular weight, such as a volatile oil. The pressure and temperature necessary to remove such a first predetermined extracted material may be relatively lower than other extractable materials of the source material. In some examples of some source materials and some predetermined extracted materials, it may be desirable to perform extraction using a minimum pressure or temperature in order to best preserve or avoid undue degradation of the source material or predetermined extracted material.

In some examples, the fractional extraction apparatus may be operated by extracting a first predetermined extracted material at a first predetermined temperature and pressure. Following this processing, the fractional extraction apparatus may be operated by extracting a second predetermined extracted material at a second predetermined temperature and pressure.

The example fractional apparatus of FIGS. 9(A), (B), and (C) also includes features for recirculating the process fluid through the various system components, as in previous examples.

The example fractional apparatus also includes a recirculation thermal manager. As shown, the recirculation thermal manager may include a cooling source, such as the chiller 944 shown in FIG. 9A, a thermal management line, such as the thermal management line portions 941.1-941.9 shown in shown in FIGS. 9(A), 9(B), and 9(C), a thermal management fluid, which could be water or another fluid, and at least one heat exchanger. In the example of FIGS. 9(A), 9(B), and 9(C), first, second, and third conduit heat exchangers 946.1, 946.2, and 946.3, first, second, and third separation chamber heat exchangers 926.1, 926.2, and 926.3, an overflow chamber heat exchanger 956, and first and second storage tank heat exchangers 953.1 and 953.2 are shown.

An example of the operation of the thermal manager could include the chiller 944 cooling the thermal management fluid, which is then directed through the first thermal management line portion 941.1 to a liquid pump heat exchanger of the liquid pump 995, through the second thermal management line portion line 941.2, to the third conduit heat exchanger 946.3, through portions of the third thermal management line portion 941.3 and one or more of the first and second storage tank heat exchangers 953.1 or 953.2 to the second conduit heat exchanger 946.2, through the forth thermal management line portion 941.4 to a gas pump heat exchanger of the gas pump 990, through the fifth thermal management line portion 941.5 to the first separation chamber heat exchangers 926.1, through the sixth thermal management line portion 941.6 to the second and third separation chamber heat exchangers 926.2 and 926.3, through the seventh thermal management line portion 941.7, to the overflow heat exchanger 956, through the eighth thermal management line portion 941.8 to the first conduit heat exchanger, through the ninth thermal management line portion 941.9 to the chiller 944.

In this way, the recirculation thermal manager can be configured to allow recirculation of the thermal management fluid and to manage the temperature of the process fluid. In some examples, the thermal manager can manage the temperature of the process fluid within various system components in a regenerative fashion by having a cooling effect on some components and a heating effect on other components. For example, the operation of the fractional extraction apparatus, including the thermal manager, can have a cooling effect upon the liquid pump 995, first and second storage tanks 952.1 and 952.2, and gas pump 990 as the thermal management fluid is circulated through the respective heat exchangers of each component. The operation of the gas pump 990 can cause the thermal management fluid in the gas pump heat exchanger to heat such that thermal management fluid circulated from the gas pump 990 through the fifth thermal management line portion 941.5 is relatively warmer than the thermal management fluid flowing to gas pump 990 through the fourth thermal management line portion 941.4. The circulation of the relatively warmer thermal management fluid to the separation chambers 920.1, 920.2, and 920.3 and the overflow chamber 950 can have a warming effect on these components as the thermal management fluid is circulated through the respective heat exchangers of each component.

Likewise, operation of the separation chambers 920.1, 920.2, and 920.3 can cause the thermal management fluid in the separation chamber heat exchangers 926.1, 926.2, and 926.3 to cool such that thermal management fluid circulated from the separation chambers 920.1, 920.2, and 920.3 through the seventh thermal management line portion 941.7 is relatively cooler than the thermal management fluid flowing to the separation chamber heat exchangers 926.1, 926.2, and 926.3 through the fifth thermal management line portion 941.5.

The recirculation thermal manager can also be configured to selectively cause the process fluid to change state. For example, by cooling gaseous process fluid at second conduit heat exchanger 946.2, the thermal manager can cause the process fluid to change from a gaseous state to a liquid state.

Extraction vessel openings can include filter plug assemblies for retaining the extraction vessel filters. Aspects of an example filter plug assembly is shown in FIGS. 10-15.

Figure 10A:
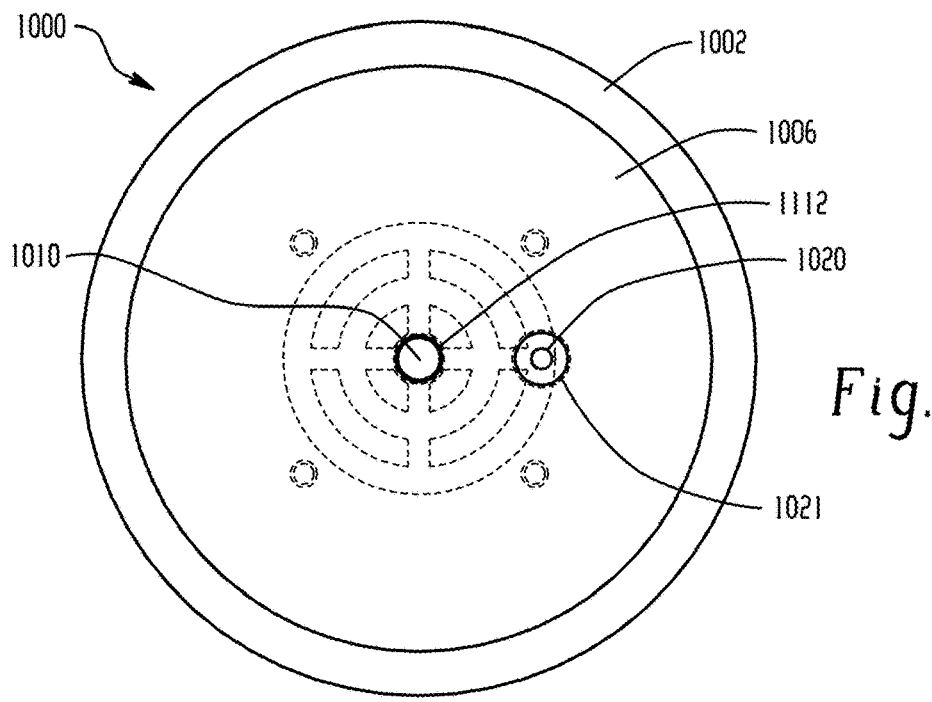
FIG. 10(A) is a top view of a filter plug base.

FIG. 10(A) shows a top view of a filter plug base 1000. A second base surface 1006 and an outer flange surface 1002 are shown. A second base surface flow channel opening 1112 of a flow channel 1010 is shown near the center of the second base surface 1006. The flow channel 1010 extends through the base to a first base surface. An instrument cavity 1020 with a second base surface instrument cavity opening 1021 are also shown. The instrument cavity 1020 extends through the base to a first base surface.

Figure 10B:
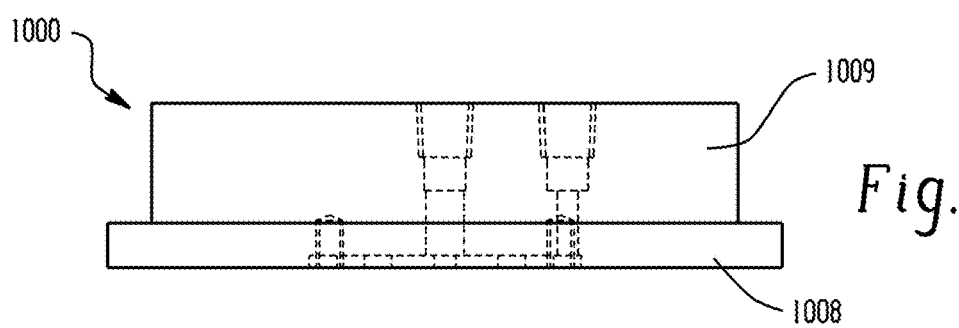
FIG. 10(B) is a side view of a filter plug base.

FIG. 10(B) is a side view of a filter plug base, including a base side 1009 and an outer flange side 1008.

Figure 10C:
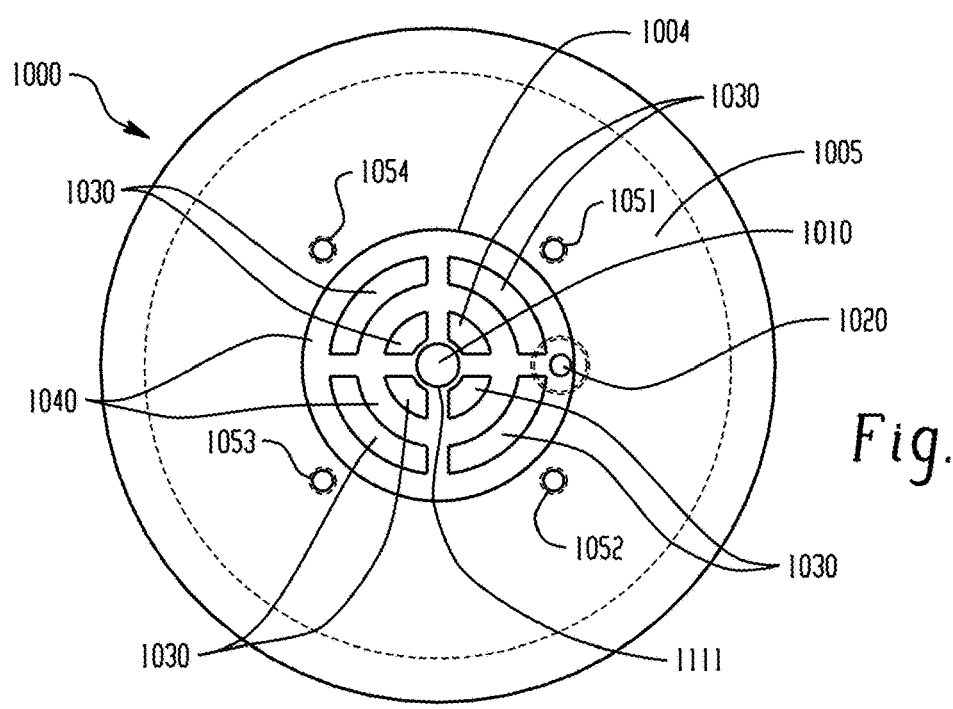
FIG. 10(C) is a bottom view of a filter plug base.

FIG. 10(C) is a bottom view of a filter plug base with a first base surface 1005 and an inset area 1004. In the example shown, several raised portions 1030 form base surface flow channels 1040 within the inset area 1004. Other configurations of raised portions 1030 and/or base surface flow channels 1040 may alternatively be used.

The flow cavity 1010 with first base surface flow cavity opening 1111 is shown within the base surface flow channels 1040 near the center of the inset area 1004. The instrument cavity 1020 is also shown within the base surface flow channels 1040 near the perimeter of the inset area 1004. First, second, third, and fourth base fastener holes, 1051, 1052, 1053, and 1054 are shown on the first base surface 1005. For example base fastener holes 1051, 1052, 1053, and 1054 could be threaded screw holes in some embodiments.

Figure 10D:
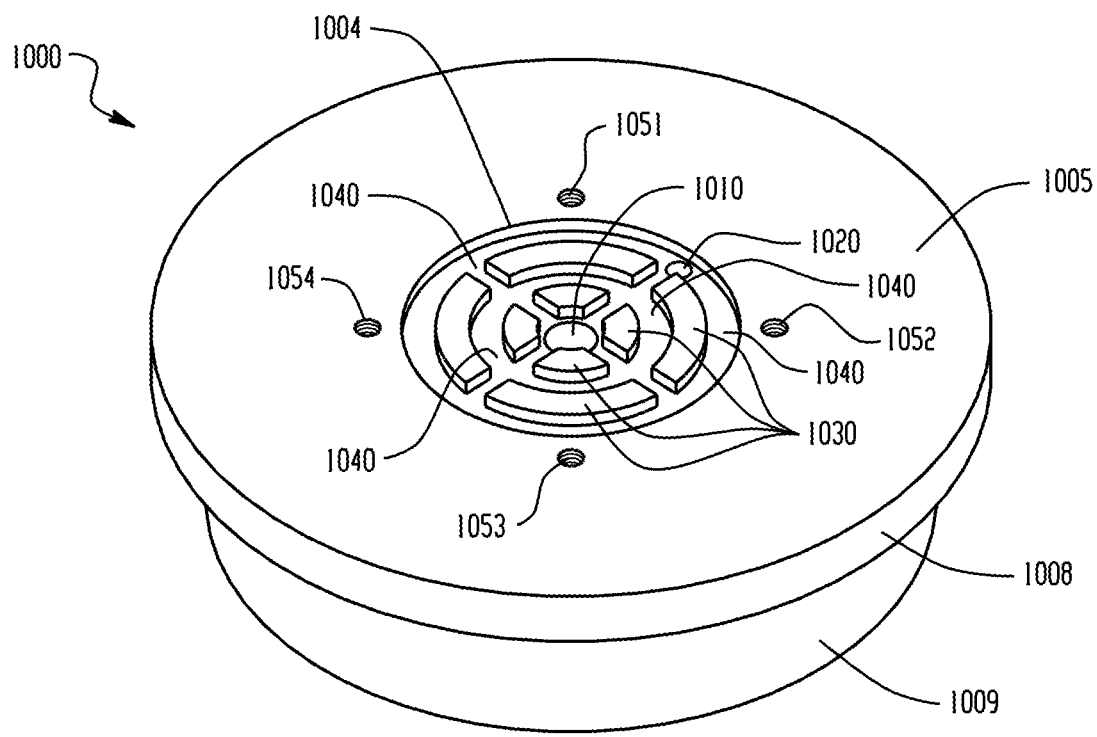
FIG. 10(D) is a perspective view of a filter plug base.

A perspective view of a bottom orientation of the base 1000 is shown in FIG. 10D.

Figure 11:
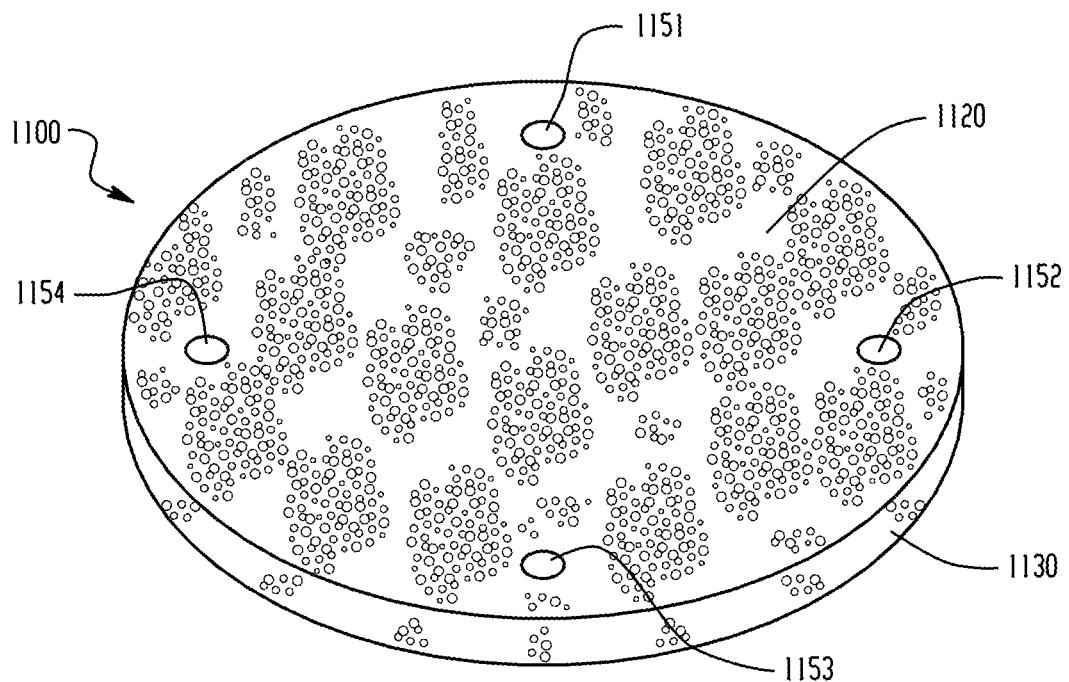
FIG. 11 is a perspective view of a filter.

FIG. 11 is a perspective view of a filter 1100 with a filter surface 1120, a filter side 1130, and first, second, third, and fourth filter fastener holes 1151, 1152, 1153, and 1154. In some examples, the filter may be made of a metal mesh. In some examples, the filter may be a 20 micron standard filter.

Figure 12:
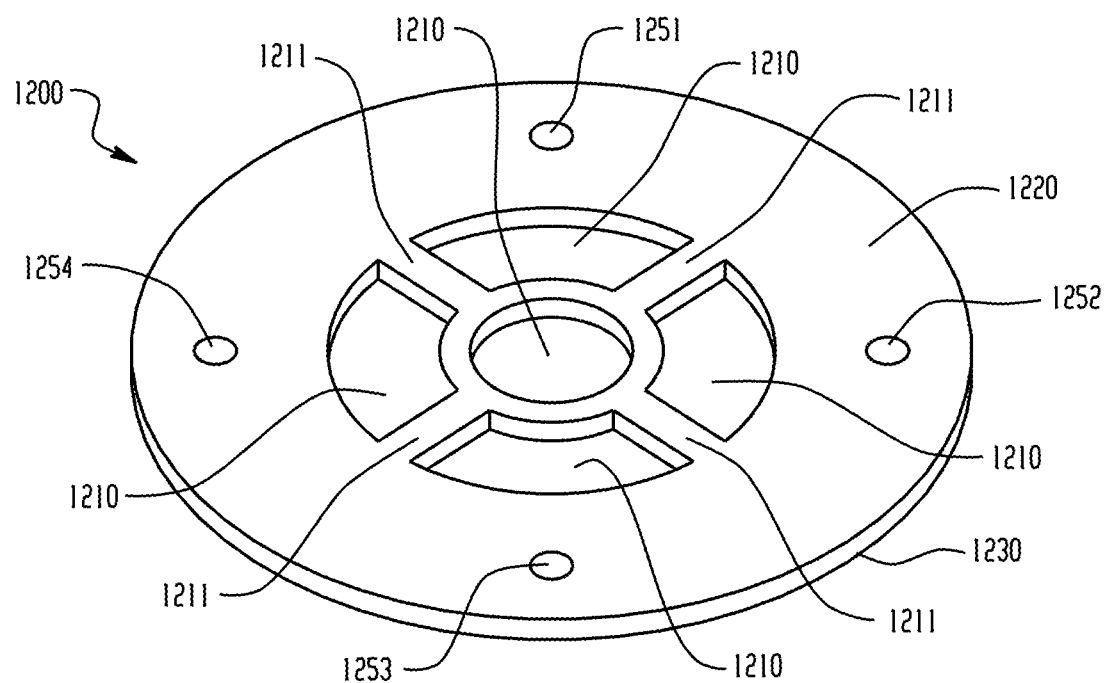
FIG. 12 is a perspective view of a filter retaining piece.

FIG. 12 is a perspective view of a filter retaining piece 1200. As shown, the filter retaining piece 1200 includes a filter retaining piece surface 1220 with filter retaining piece surface interior portions 1211 forming filter retaining piece flow holes 1210. Other configurations of filter retaining piece surface interior portions 1211 and/or filter retaining piece flow holes 1210 may alternatively be used. First, second, third, and fourth filter retaining piece fastener holes are shown at 1251, 1252, 1253, and 1254. The filter retaining piece side is labeled 1230.

Figure 13:
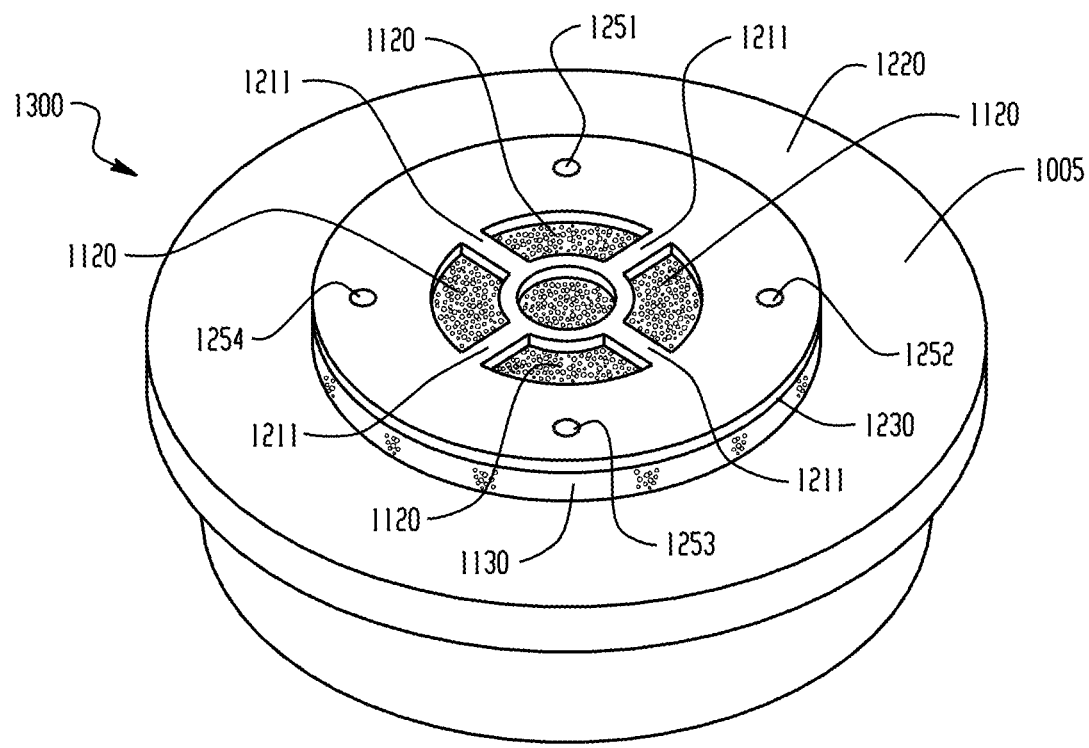
FIG. 13 is a perspective view of a filter plug sub-assembly.

FIG. 13 is a perspective view of a filter plug sub-assembly 1300 wherein the filter 1100 and filter retaining piece 1200 are attached to the base 1000 with the fastener holes of each aligned so that a fastener, for example, screws, could be inserted through the holes to releasably secure the filter plug sub-assembly 1300. In the example shown, the filter may be held firmly in place between the base and filter retaining piece regardless of which direction fluid is passed through it.

Figure 14A:
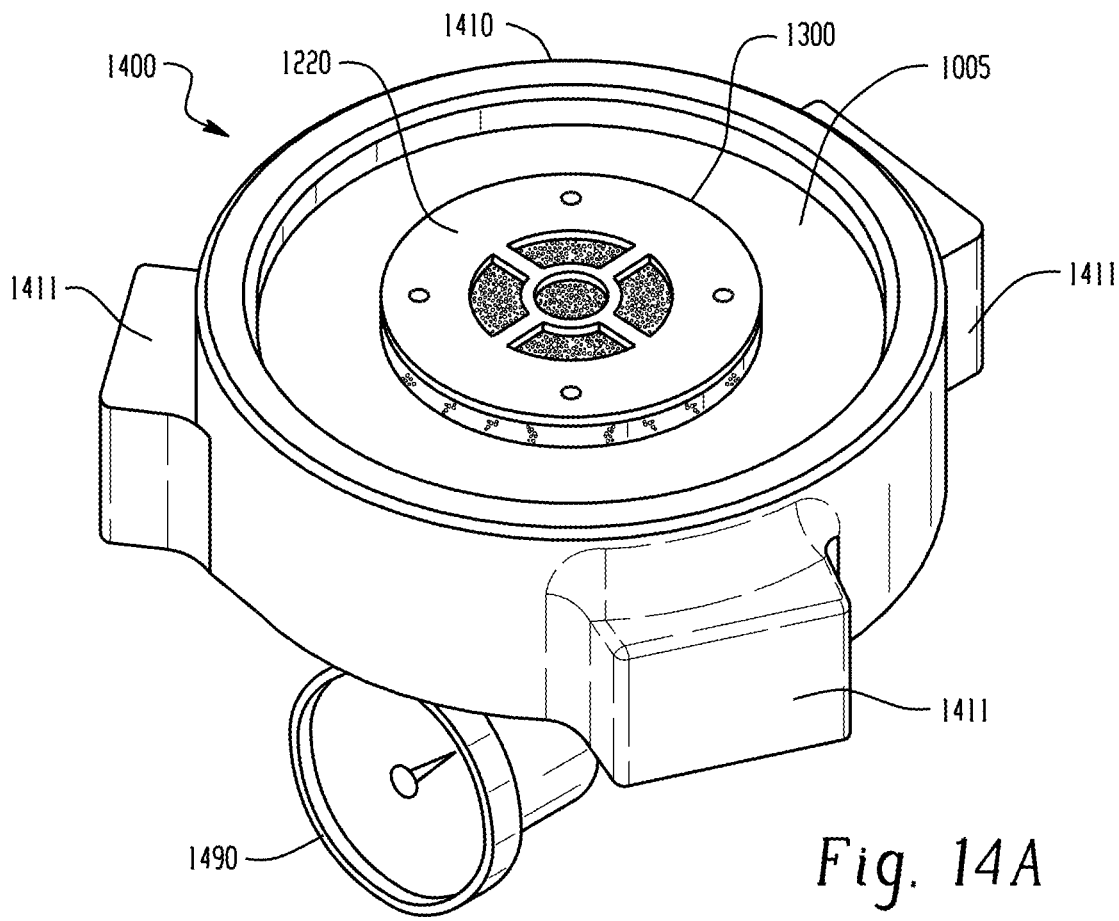
FIG. 14(A) is a perspective of a filter plug assembly and instrument.
Figure 14B:
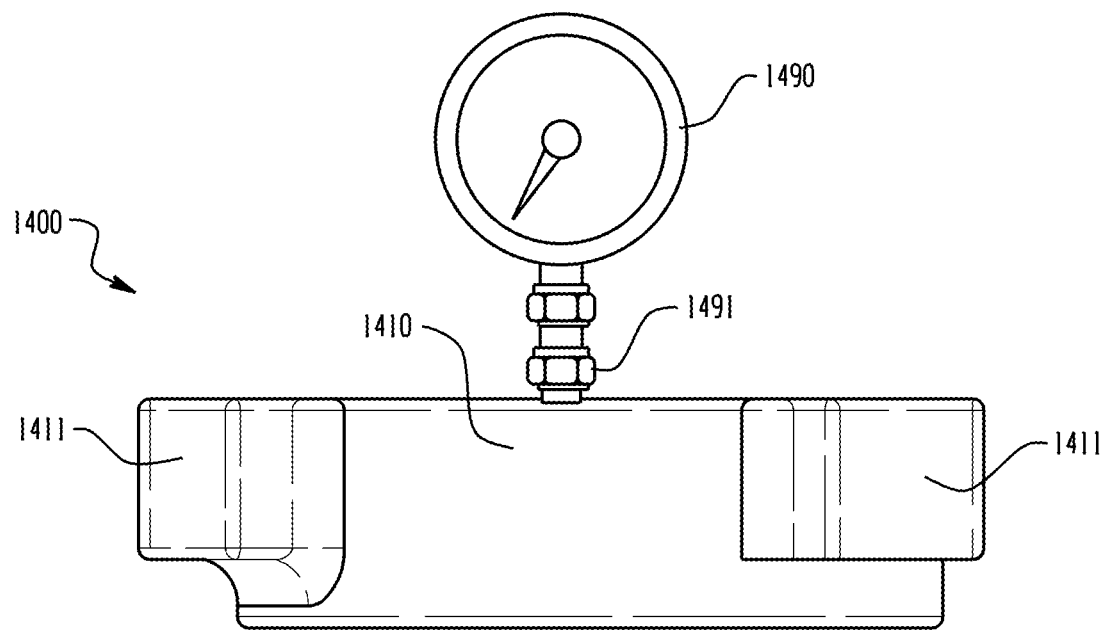
FIG. 14(B) is a side view of a filter plug assembly and instrument.

FIGS. 14(A) and 14(B) show perspective and side views of a filter plug assembly 1400 and instrument 1490 in an exemplary configuration. In the example shown, the filter plug sub-assembly is enclosed by an extraction vessel fastener 1410. For example, extraction vessel fastener 1410 can be a commercially available threaded hammer union nut, shown in the figures with prongs 1411. One of ordinary skill in the art could use any other available means for mechanically attaching the filter plug sub-assembly 1300 to the extraction vessel opening 1511.

Figure 15:
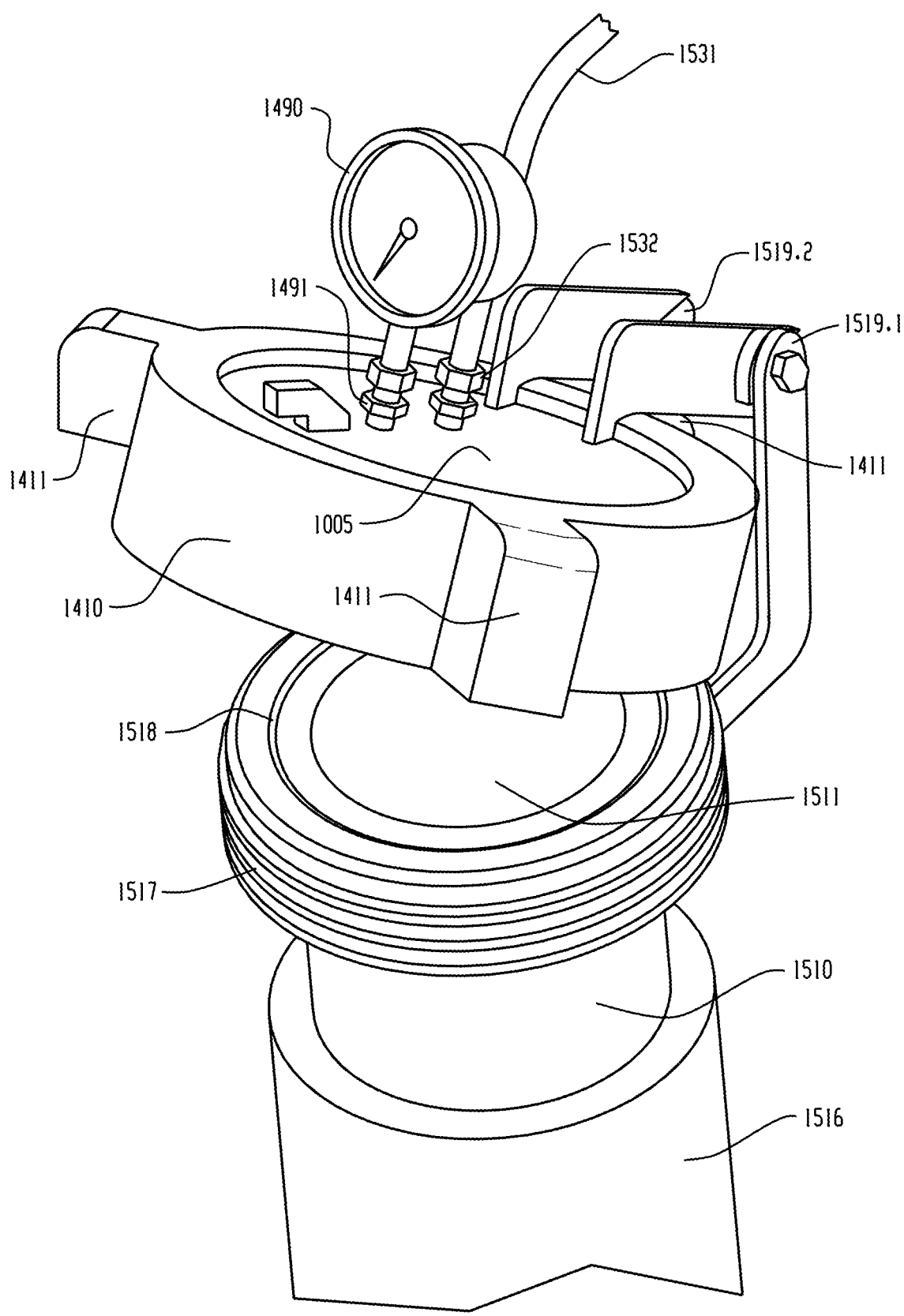
FIG. 15 is a perspective of a of a filter plug assembly and instrument, process fluid conduit, and extraction vessel.

FIG. 15 is a perspective of a of a filter plug assembly 1400, instrument 1490, flexible portion 1531 of the circulation conduit, and extraction vessel 1510 with extraction vessel heat exchanger 1516. The flexible portion 1531 of the circulation conduit can be attached to the second base surface 1006 at conduit connection 1532. The instrument can be attach to the second base surface 1006 at instrument connection 1491. In some examples, the instrument 1490 can be a pressure gauge configured to sense the pressure of a fluid within the base surface channel 1040 by communicating with the instrument cavity 1020. In some examples, the instrument 1490 can be a thermocouple configured to sense the temperature of a fluid within the base surface channel 1040 by having a thermocouple stem that extends through the instrument cavity 1020 to the base surface channel 1040.

In the combination shown in FIG. 15, the extraction vessel 1510 has an opening 1511 with a sealing area 1518, which may be a lip or groove or other suitable location for a Buna-90 O-Ring or other suitable sealing device. The extraction vessel 1510 can have a threaded end portion 1517 suitable for fastening with the extraction vessel fastener 1410.

In the example shown, hinges 1519.1 and 1519.2 can facilitate the opening and closing of the extraction vessel. In some examples, an upper prong portion of each of the hinges 1519.1 and 1519.2 is securely fastened to the second base surface 1006 while a bottom portion of each of the hinges 1519.1 and 1519.2 is securely fastened to the outside of the extraction vessel 1510. For example, the hinges 1519.1 and 1519.2 could be welded to the second base surface 1006 and the extraction vessel 1510. In some examples, the extraction vessel fastener 1410 is free to rotate, for example to screw onto or off of the threaded end portion, while the hinges 1519.1 and 1519.2 remain attached to the second base surface 1006 and extraction vessel 1510.

Figure 16A:
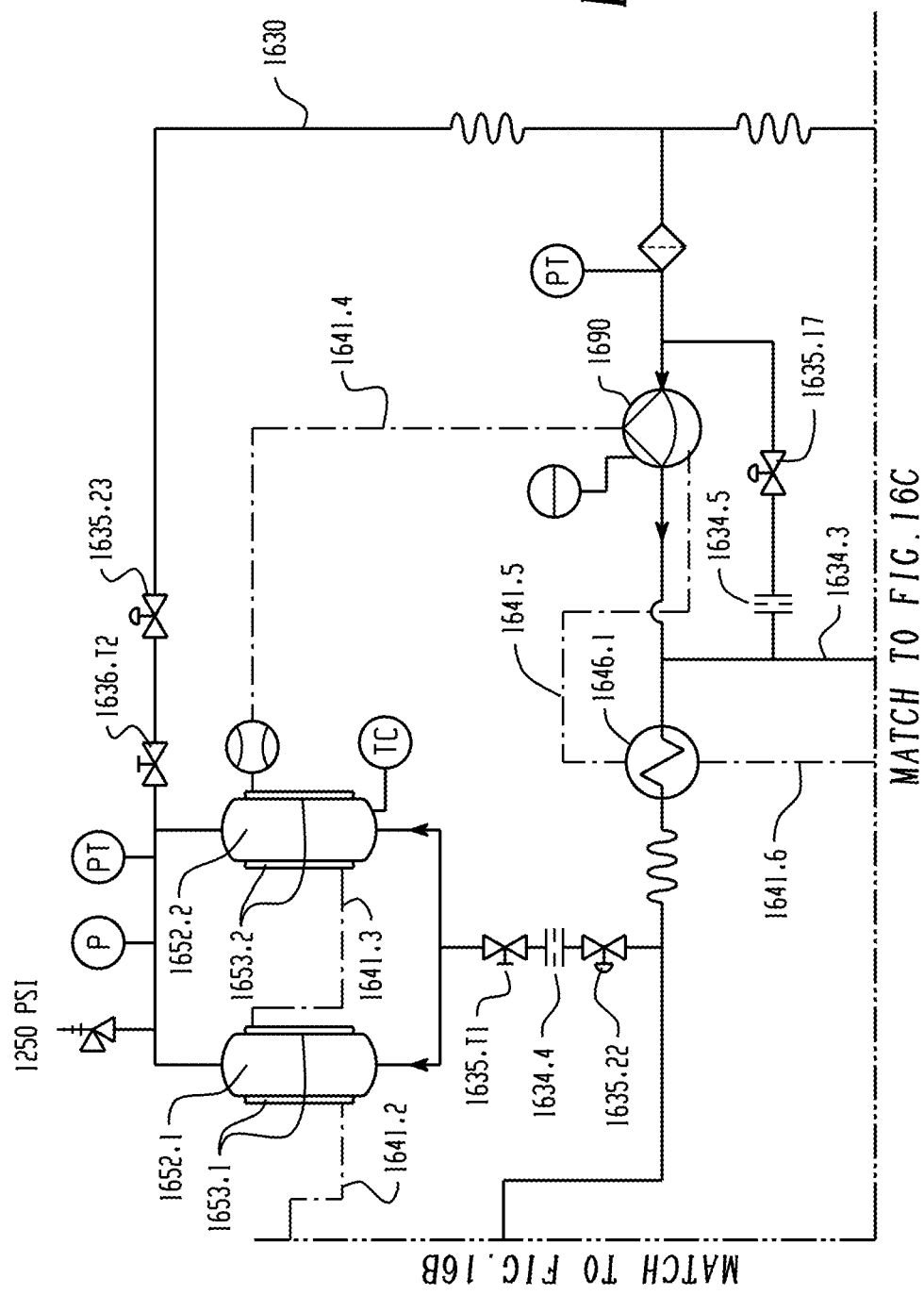
FIG. 16(A) is a schematic diagram of first portion of a dual phase extraction apparatus.

An example of a dual phase recirculating extraction apparatus that includes dual phase recirculation of the process fluid will now be discussed in connection FIGS. 16A, 16B, and 16C, which depict portions of the exemplary dual phase recirculating extraction apparatus, and FIG. 16(D), which depicts a table of symbols used in FIGS. 16A, 16B, and 16C.

As shown in these figures, a circulation conduit 1630, which may include flexible portions 1631, connects various components of the dual phase recirculating extraction apparatus, including process fluid canisters 1605, first and second extraction vessels 1610.1 and 1610.2, first and second separation chambers 1620.1 and 1620.2, an overflow chamber 1650, a gas pump 1690, and a liquid pump 1695.

The extraction vessels can hold a source material, which may be a botanical substance. In some examples, the source material is dried and ground to a particle consistency of about 50 microns, or about the size of coffee grounds.

The extraction vessels can each have multiple extraction vessel openings, each with extraction vessel filters. The filters can be 20 micron standard or any other suitable size.

The extraction vessel filters can be configured to retain the source material while allowing the process fluid or mixture to pass the respective extraction vessel opening.

Figure 16B:
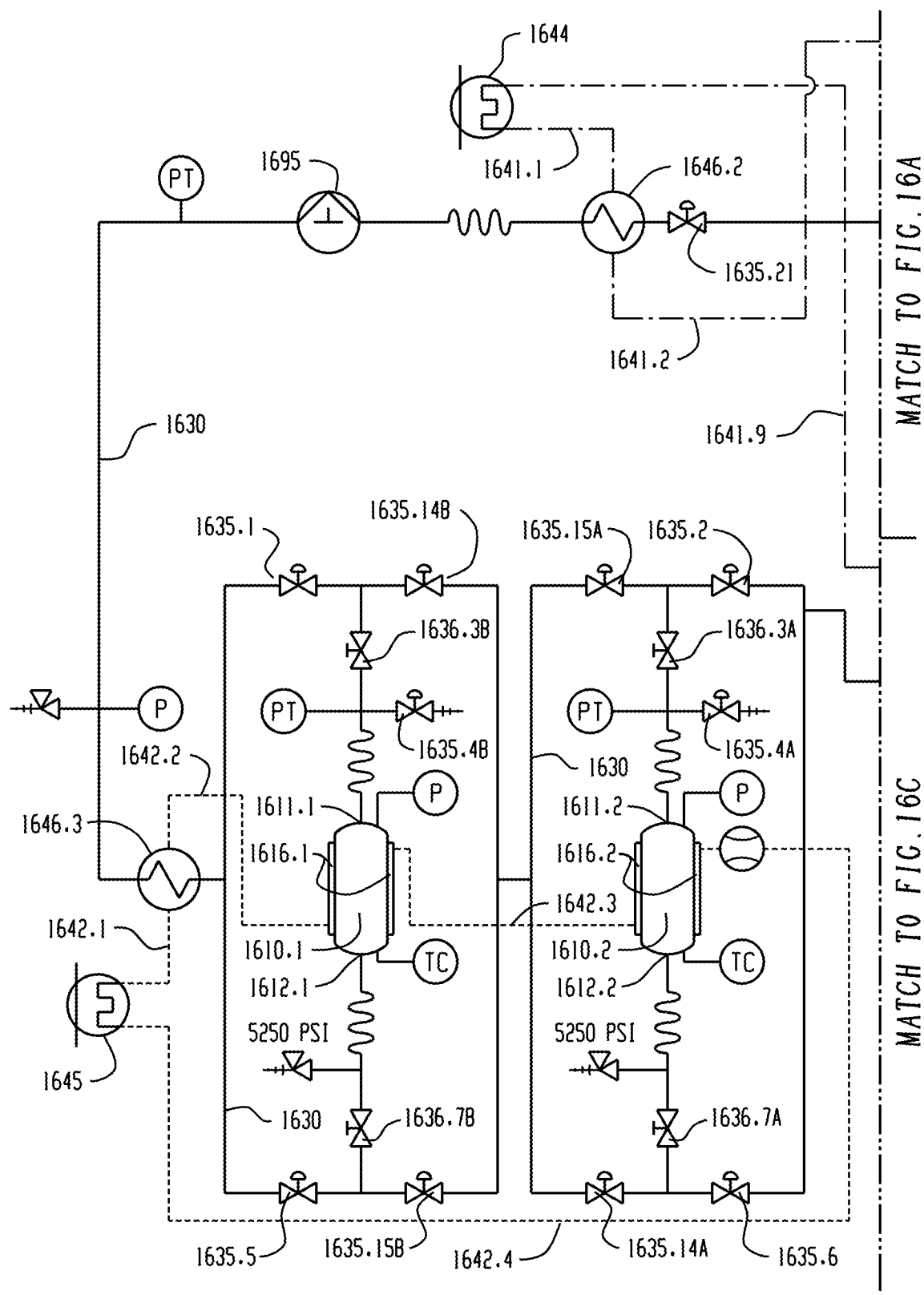
FIG. 16(B) is a schematic diagram of second portion of a dual phase extraction apparatus.

In the example shown in FIG. 16B, a first extraction vessel 1610.1 has a first extraction vessel opening 1611.1 and second extraction vessel opening 1612.1. As disclosed in prior examples, each of the extraction vessel openings can function either as ingress or egress, depending on the flow of the process fluid as dictated by the configuration of the valves of the circulation conduit 1630. For example, the process fluid can be directed to flow through the first extraction vessel 1610.1 by entering first extraction vessel opening 1611.1, forming a mixture with a source material within the first extraction vessel 1610.1, and the mixture allowed to exit the second extraction vessel opening 1612.1.

Likewise, in an alternate configuration, the process fluid could be directed into the second extraction vessel opening 1612.1 and the mixture allowed to exit out of the first extraction vessel opening 1611.1. As disclosed in the examples described above, reversing the flow of the process fluid or mixture can have the advantage of cleaning the associated filters of the extraction vessel openings by back flushing them, while permitting continuous flow the process fluid and operation of the apparatus. In this way, the circulation conduit 1630 is configured to selectively direct the process fluid into or out of either of the first or second extraction vessel openings 1611.1 or 1612.1, selectively allow and reversibly direct flow of the mixture into or out of the first or second extraction vessel openings 1611.1 or 1612.1 while allowing continuous flow of the mixture from the extraction vessel 1610.1 to one of the separation chambers.

Likewise, if process fluid will be directed through a second extraction vessel 1610.2, either the first extraction vessel opening 1611.2 or the second extraction vessel opening 1612.2 can function as the ingress with the other opening functioning as the egress, as dictated by the configuration of the valves of the circulation conduit 1630.

The circulation conduit 1630 can be configured to direct the process fluid into either one extraction vessel and can bypass the other extraction vessel on the way to the separation chamber. The circulation conduit 1630 can be alternatively configured to direct the process fluid through the first extraction vessel 1610.1, then to the second extraction vessel 1610.2, and then to the separation chamber.

As discussed in the examples described above, multiple extraction vessel configurations may be used. For example, 5 liter, 20 liter, or 40 liter extraction vessels could be used. Where multiple extraction vessels are used, they could be matched, i.e. two 5 liter, two 20 liter, or two 40 liter. In other examples, the multiple extraction vessels could be of differing sizes. In some examples, the 5 liter extraction vessel holds up to 3 pounds of dry, grounded source material. In some examples, the 20 liter extraction vessel holds up to 12 pounds of dry, ground material. In some examples of 40 liter extraction vessel holds up to 24 pounds of dry, ground material. In some examples, the extraction vessel does not need to be full in order to perform an extraction. For example, a user may choose to operate with about half a pound of source material per liter of extraction vessel to achieve certain desired operating parameters based upon the particular source material utilized. In some examples of the dual 40 liter extraction vessels, the dual phase recirculating extraction system can process up to 100 pounds of source material in one day. In some examples, the extraction vessel is rated for a maximum pressure of 5000 PSI (344 bar). In some examples, the extraction vessel is rated for a maximum temperature of 160 degrees Fahrenheit (71 degrees Celsius). In some examples the extraction vessel is made of 304 stainless steel (A2 stainless steel). In some examples the extraction vessel interior is polished to food grade level. In some examples, the extraction vessel openings have threaded closures. In some examples the extraction vessel openings have a sealing mechanism, which can be a self-energized o-ring seal, Buna-160. In some examples, the extraction vessel can include a non-isolable spring loaded safety relief valve to prevent accidental over-pressurization.

As disclosed in the above examples, following extraction, the mixture may be directed through circulation conduit 1630 from an extraction vessel to a separation chamber wherein the pressure of the process fluid is reduced to a point at which the process fluid within the mixture changes phase to gaseous state, thereby losing its solvency power, and allowing a portion of the extracted material to separate from the mixture within the separation chamber.

As also discussed in connection with the examples described above, the circulation conduit 1630 can include a separation portion. In the example shown in FIG. 16C, first and second separation portions, 1634.1 and 1634.2, are respectively located within first and second separation chambers 1620.1 and 1620.2. As discussed in connection with the examples described above, each separation portion 1634.1 and 1634.2 can be configured to receive the mixture and permit a portion of the extracted material to separate from the mixture within the separation chambers 1620.1 or 1620.2. In some examples, the separation portion can allow the process fluid to decompress in the separation chamber and separate the extracted material from the process fluid without the use of a valve or regulator for separation.

As discussed in the examples described above, each of the separation portions 1634.1 and 1634.2 can include an orifice. The orifice can be sized to match a flow rate of the process fluid. In some examples, the orifice can restrict the flow of process fluid, allowing a significant pressure drop in the mixture after passing through the orifice and allowing the process fluid to change from a subcritical or supercritical state to a gaseous state, thereby allowing the extracted material to fall out, or separate, from the process fluid.

In some examples, the separation portion 1634.1 or 1634.2 can be positioned near an inner wall of the separation chamber 1620.1 or 1620.2. In some examples, the separation portion 1634.1 or 1634.2 can be orientated to direct the process fluid along the inner wall of the 1620.1 or 1620.2 in a generally rotational manner. In some examples, a portion of circulation conduit 1630 leading to the separation portion 1634.1 or 1634.2 can be angled at an appropriate angle, which can be about 45°. In some examples, the inner wall of the separation chambers 1620.1 or 1620.2 can be relatively warmer than an interior portion of the separation chambers 1620.1 or 1620.2. In some examples, directing the process fluid along the inner wall of the separation chambers 1620.1 or 1620.2 in a generally rotational manner can help to keep the process fluid in a gaseous state after the process fluid is depressurized in the separation chambers 1620.1 or 1620.2. In such examples, the relatively warmer inner wall can help to counteract the Joule-Thompson cooling effect that can occur when the process fluid decompresses.

Multiple separation chambers and configurations may be used. For example, the separation chambers may be 5 liter or 2.5 liter separation chambers. In some examples, the separation chambers shown in FIG. 16C, the separation chambers 1620.1 and 1620.2 may be rated for a maximum pressure of 600 PSI (41 bar) and a maximum temperature of 160 degrees Fahrenheit (71 degrees Celsius). In some examples, the separation chambers 1620.1 and 1620.2 may be made of 304 stainless steel. In some examples, the separation chambers 1620.1 and 1620.2 may have closures that are of FDA sanitary style bolted. In some examples, the separation chambers 1620.1 and 1620.2 may have a sealing mechanism that is a sanitary gasket of cured silicone. In some examples, the separation chambers 1620.1 and 1620.2 may have non-isolable spring loaded safety relief valves to prevents accidental over-pressurization. In some examples, the separation chambers 1620.1 and 1620.2 may have features for facilitating the collection and/or removal of the separated extracted material as shown in the examples described above. For example, a cup or a vent may be used to remove the extracted material from the separation chamber.

Figure 16C:
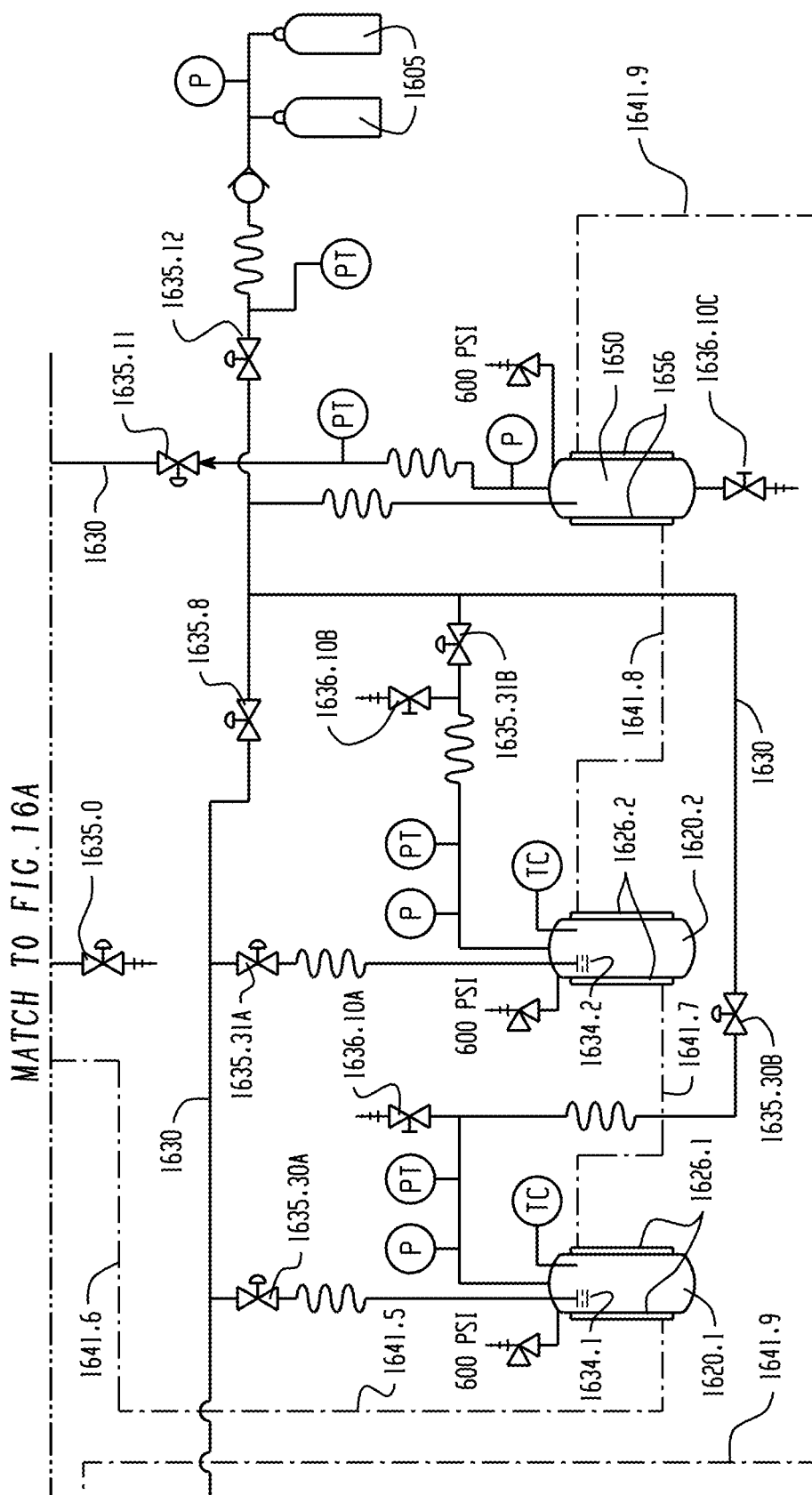
FIG. 16(C) is a schematic diagram of third portion of a dual phase extraction apparatus.
Figure 16D:
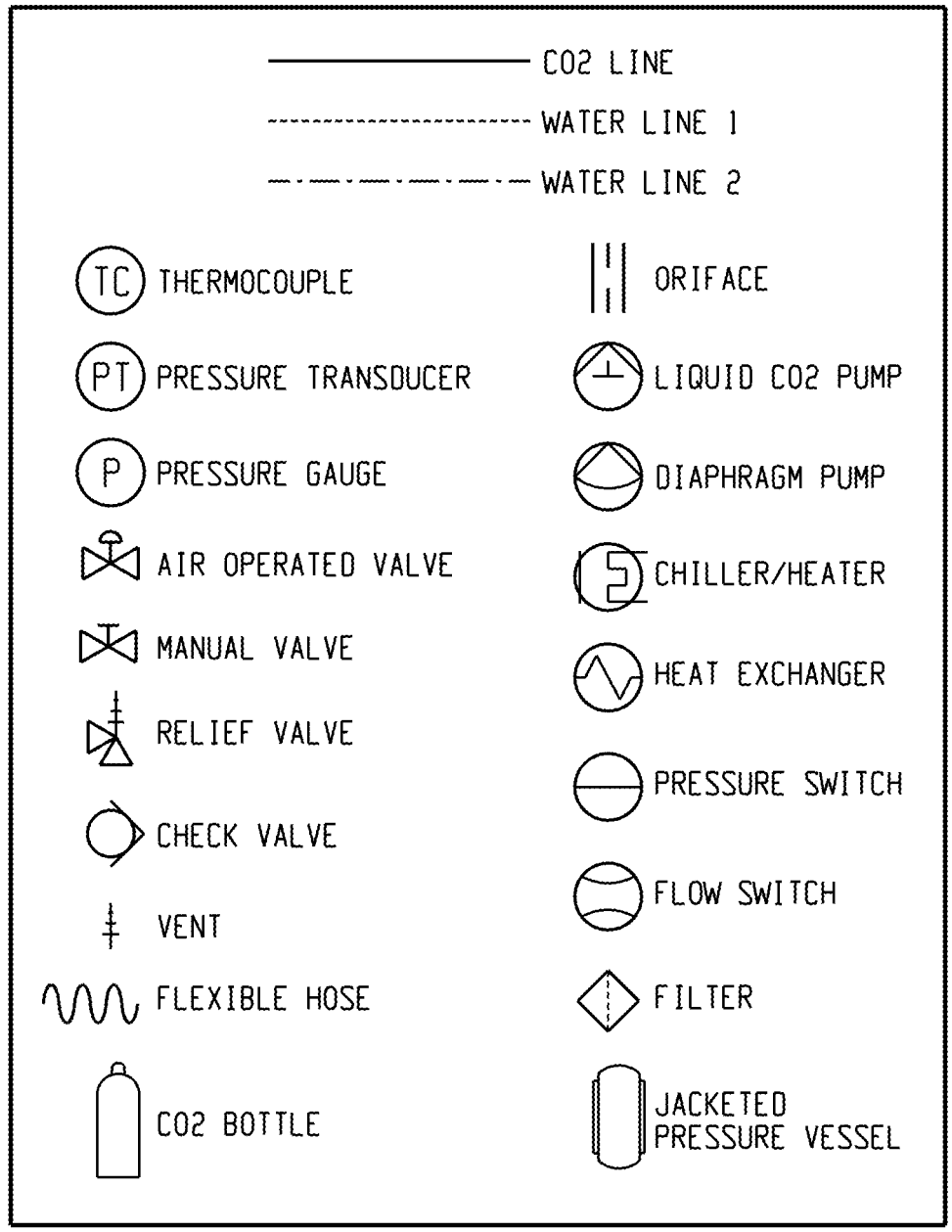
FIG. 16(D) is a table of symbols identifying elements of a dual phase extraction apparatus.

In some examples, an overflow chamber, such as overflow chamber 1650 shown in FIG. 16C, may be configured to receive the process fluid from a separation chamber and allow the process fluid to be recirculated through the circulation conduit.

In some examples, one or more storage tanks, such as first storage tank 1652.1 and second storage tank 1652.2 shown in FIG. 16A can be used to store excess process fluid and return process fluid to the system as needed.

A gas pump 1690 can be configured to receive the process fluid in a gaseous state and compress the process fluid. In some examples, the gas pump 1690 can include a diaphragm comprising a stainless steel disc. In some examples, the diaphragm gas pump avoids the need for conventional seals. This can avoid the consequent friction and wearing down of pistons as can occur in conventional systems when the seals slide. In some examples, the diaphragm gas pump is quieter than conventional compressed air system. In some examples, the diaphragm gas pump is wastes less heat than conventional compressed air systems.

In some alternative examples, the gas pump can include an air driven gas booster with a flow rate of 15 CFM can be used to help recirculate the process fluid in connection with the apparatuses disclosed herein. In some examples, the air driven gas booster can have wetted parts made of 316 stainless steel. In some examples, the air driven gas booster can include a coalescing filter on its inlet to prevent oil introduction. In some examples, a non-isolable spring loaded safety relief valve can be used to prevent accidental over-pressurization.

In some examples, gas pump 1690 can be configured to receive the process fluid at a pressure in the range of about 300 to 400 PSI and compress the process fluid to a pressure in the range of 1,000 PSI. to 1,500 PSI. In one embodiment, gas pump 1690 can be configured to compress the process fluid to a pressure of about 1,200 PSI. In another exemplary configuration, gas pump 1690 can be configured to compress the process fluid to about 1,200 PSI.

The liquid pump 1695 can be configured to receive the process fluid in a liquid state and compress the process fluid. The liquid pump 1695 may be a piston type pump with a cylinder or another diaphragm style compressor. In some examples, liquid pump 1695 can be configured to receive the process fluid at a pressure in the range of 1,000 to 1,500 PSI and compresses the process fluid up to a pressure as high as 5,000 PSI. In other examples, liquid pump 1695 can be configured to compress the process fluid to about 4,000 PSI. The liquid pump 1695 could be configured to compress the process fluid to any other predetermined pressure for which the liquid pump 1695 is capable in order to extract a predetermined extracted material from a particular source material. The operation of the pressurization of the process fluid will also increase its temperature. In one example, the process fluid leaves the liquid pump 1695, with a pressure of about 4,000 PSI and a temperature of about 95 degrees F.

As discussed in the examples described above, the circulation conduit 1630, together with its system of valves, which may include the depicted air operated valves and manual valves, may be configured to selectively allow or reversibly directed flow of the process fluid through one or more of the predetermined extraction vessels shown in FIG. 16B, where a mixture is formed through the extraction process described in the examples above, and thereafter direct the mixture to a predetermined separation chamber among those depicted in FIG. 16C.

As discussed in the examples described above, the dual phase recirculating extraction apparatus can include a temperature regulator for regulating the temperature of the process fluid. In the example shown in FIG. 16B, the temperature regulator includes a chiller/heater 1645 connected to a temperature regulation line 1642 with portions 1642.1, 1642.2, 1642.3, and 1642.4, configured to heat, cool, or maintain the temperature of a temperature regulation fluid, for example water or another fluid such as a water/glycol mixture, and recirculate the temperature regulation fluid. In some examples, the chiller/heater 1645 can have a temperature range of about −10 degrees Celsius to about 70 degrees Celsius (14 degrees Fahrenheit to 158 degrees Fahrenheit).

A third conduit heat exchanger, for example, temperature set heat exchanger 1646.3 shown in FIG. 16B, is connected to the temperature regulation line 1642 and can serve to set the temperature of the process fluid for extraction. Each of the extraction vessels can have heat exchange portions connected to the temperature regulation line 1642, for example, extraction vessel heat exchangers 1616.1 and 1616.2 shown in FIG. 16B, which may be heating/cooling jackets configured to assist in the regulation of the process fluid within the extraction vessels 1610.1 and 1610.2 respectively.

The temperature regulator can also be configured to selectively cause the process fluid to change state. For example, by heating high pressure liquid process fluid at the temperature set heat exchanger 1646.3, the temperature regulator can cause the process fluid to change from a liquid state to a supercritical state.

The temperature regulator shown in FIG. 16B can facilitate the regulation of the process fluid during extraction to a predetermined temperature. In concert with the configuration of other system components, including the compression of the process fluid to a predetermined pressure by gas pump 1695, and the size opening of the separation portion 1634.1 or 1634.2, the dual phase recirculating extraction apparatus can be configured to create a predetermined temperature and pressure of the process fluid within one or both extraction vessels 1610.1 and 1610.2 to remove a predetermined extracted material from the source material. Alternatively, the disclosed dual phase recirculating extraction apparatus can be configured to create a different predetermined temperature and a different predetermined pressure of the process fluid to remove a different predetermined extracted material from the source material.

In some examples, a first predetermined extracted material may have a relatively light molecular weight, such as a volatile oil. The pressure and temperature necessary to remove such a first predetermined extracted material may be relatively lower than other extractable materials of the source material. In some examples of some source materials and some predetermined extracted materials, it may be desirable to perform extraction using a minimum pressure or temperature in order to best preserve or avoid undue degradation of the source material or predetermined extracted material.

In some examples, the dual phase recirculating extraction apparatus may be operated by extracting a first predetermined extracted material at a first predetermined temperature and pressure. Following this processing, the dual phase recirculating extraction apparatus may be operated by extracting a second predetermined extracted material at a second predetermined temperature and pressure.

The example dual phase recirculating extraction apparatus of FIGS. 16A, 16B, and 16C also includes features for recirculating the process fluid through the various system components, as in the examples described above.

The example dual phase recirculating extraction apparatus also includes a recirculation thermal manager. As shown, the recirculation thermal manager may include a cooling source, such as the chiller 1644 shown in FIG. 16A, a thermal management line 1641, with portions 1641.1-1641.9 shown in shown in FIGS. 16A, 16B, and 16C, a thermal management fluid, which could be water or another fluid, and at least one heat exchanger. In the example of FIGS. 16A and 16B, first and second conduit heat exchangers 1646.1 and 1646.2 are shown. Also, each of the vessels and pumps can have a heat exchange portion connected to the thermal management line 1641. For example, first and second separation chamber heat exchangers 1626.1 and 1626.2, overflow chamber heat exchanger 1656, and first and second storage tank heat exchangers 1653.1 and 1653.2 are shown in FIGS. 16A and 16C.

An example of the operation of the thermal manager could include the chiller 1644 cooling the thermal management fluid. In some examples, the chiller 1644 cools the thermal management fluid to about 75 degrees Fahrenheit. The thermal management fluid can be directed in the following order: through the first thermal management line portion 1641.1 to the second conduit heat exchanger 1646.2, through the second thermal management line portion 1641.2 to the first storage tank heat exchanger 1653.1, through the third thermal management line portion 1641.3 to the second storage tank heat exchanger 1653.2, through the fourth thermal management line portion 1641.4 to the gas pump heat exchanger of the gas pump 1690, through the fifth thermal management line portion 1641.5 to the first conduit heat exchanger 1646.1, through the sixth thermal management line portion 1641.6 to the first separation chamber heat exchanger 1626.1, through the seventh thermal management line portion 1641.7 to the second separation chamber heat exchanger 1626.2, through the eighth thermal management line portion 1641.8 to the overflow heat exchanger 1656, through the ninth thermal management line portion 1641.9 to the chiller 1644.

In this way, the recirculation thermal manager can be configured to allow recirculation of the thermal management fluid and to manage the temperature of the process fluid. In some examples, the thermal manager can manage the temperature of the process fluid within various system components in a regenerative fashion by having a cooling effect on some components and a heating effect on other components. The operation of the dual phase recirculating extraction apparatus, including the thermal manager, can have a cooling effect upon the process fluid in the liquid pump 1695, first and second storage tanks 1652.1 and 1652.2, and gas pump 1690 as the thermal management fluid is circulated through the respective heat exchangers of each component. The operation of the gas pump 1690 can cause the thermal management fluid in the gas pump heat exchanger to heat such that thermal management fluid circulated from the gas pump 1690 through the fifth thermal management line portion 1641.5 is relatively warmer than the thermal management fluid flowing to gas pump 1690 through the fourth thermal management line portion 1641.4.

The first conduit heat exchanger 1646.1 can serve the dual purpose of cooling the process fluid in the circulation line and capturing the heat imparted to the thermal management fluid in the thermal management line. For example, the process fluid may have a temperature in the range of 200-250 degrees Fahrenheit after exiting the gas pump 1690 and be cooled to a temperature of 80-90 degrees Fahrenheit after passing through the first conduit heat exchanger 1646.1. The heat imparted from the process fluid to the thermal management fluid can then be directed to a useful purpose elsewhere in the system.

More specifically, the circulation of the relatively warmer thermal management fluid coming from the first conduit heat exchanger 1646.1 in thermal management line portion 1646.6 to the separation chambers 1620.1 and 1620.2 can have a warming effect on these components.

Likewise, operation of the separation chambers 1620.1 and 1620.2 can cause the thermal management fluid in the separation chamber heat exchangers 1626.1 and 1626.2 to cool such that thermal management fluid circulated from the separation chambers 1620.1 and 1620.2 through the eighth thermal management line portion 1641.8 is relatively cooler than the thermal management fluid flowing to the separation chamber heat exchangers 1626.1 and 1626.2 through the fifth thermal management line portion 1641.5.

The recirculation thermal manager can also be configured to selectively cause the process fluid to change state. For example, by cooling gaseous process fluid at second conduit heat exchanger 1646.2, the thermal manager can cause the process fluid to change from a gaseous state to a liquid state.

Particular system parameters can be set to achieve particular objectives in connection with an extraction process. For example, where the user desires an extracted material from a botanical substance that has a lighter color and less wax content, the user may select the following exemplary parameters: separation orifice 1634.1 or 1634.2 size #37, separation chamber 1620.1 or 1620.2 pressure in the range of 350-380 PSI, thermal management chiller 1644 temperature setting of 64 degrees Fahrenheit, extraction vessel 1610.1 or 1610.2 target pressure in the range of 1100-1300 PSI, temperature regulation chiller/heater setting of 70 degrees Fahrenheit, and extraction time in the range of 1-2 hours per pound of source material. Alternatively, for a faster extraction time and a darker extracted material with more wax content, the following exemplary parameters may be selected: separation orifice 1634.1 or 1634.2 size #18, separation chamber 1620.1 or 1620.2 pressure in the range of 300-320 PSI, thermal management chiller 1644 temperature setting of 74 degrees Fahrenheit, extraction vessel 1610.1 or 1610.2 target pressure in the range of 4000-4,200 PSI, temperature regulation chiller/heater setting of 110 degrees Fahrenheit, and extraction time in the range of 15-20 minutes per pound of source material.

An exemplary operation of the dual phase extraction apparatus will now be described. As shown in the figures with consistent symbols throughout FIGS. 16A, 16B, 16C, and 16D, various air operated valves 1635 (including individually numbered air operated valves, e.g. 1635.1), various manual valves 1636 (including individually numbered manual valves, e.g. 1635.7B), relief valves, vents, and orifices may be connected to the circulation conduit 1630.

As one of ordinary skill in the art will readily appreciate, alternative embodiments of the invention could substitute alternative known types of valves for the indicated valves shown in the drawings, including substituting a manual valve for an air operated valve and visa versa. When referring to specific valves depicted in FIGS. 16A, 16B, 16C, this written specification will refer to them by identifying their specific Valve number and will refer to them without the preface of identification as being a manual or air operated valve. For example, air operated valve 1635.1 may be referred to in this written specification as simply "Valve 1." Likewise, manual valve 1635.7B may be referred to in this written specification simply as "Valve 7B." As also shown in the figures with consistent symbols throughout FIGS. 16A, 16B, 16C, and 16(D), various pressure gauges, pressure transducers, and thermocouples, are shown connected to the circulation conduit 1630 and other components of the dual phase recirculating extraction apparatus.

Referring to FIG. 16B, Valves 1, 5, 14A, 14B, 15A, 15B, 3B and 7B may be configured to direct flow of the process fluid. In some examples, certain valves are operated in tandem. For example, 14A and 14B may be controlled together such that either both are open or both are closed. Likewise, 15A and 15B may be both opened or both closed.

Essentially, the flow of the process fluid may be propagated in the circulation conduit 1630 through a temperature set heat exchanger 1646.3 to the extraction vessels. As discussed above, the process fluid may be set at a pressure and a temperature for the desired extraction. In some examples the operating parameters for extraction and other system functions are controlled by an electronic control system and system of relays. In one preferred embodiment, a process fluid temperature of 110 degrees Fahrenheit and pressure of 4,000 PSI may be used for extraction.

If first extraction vessel 1610.1 is chosen, then the flow of the process fluid travels first through Valve 1 and 5 initially, and then through either 1 or 5. If Valve 1 remains open then Valve 14A and B will be closed. Valve 3B and 7B will be open, so flow via valve 1 through 3B down occurs. Alternatively the flow path could be directed through valve 5, 7B, 3B and then through 14B and 14A. As discussed, reversing the flow through an extraction vessel helps to clean the filters of each extraction vessel opening. Depending on the direction of flow, the process fluid will either travel through Valve 6 or Valve 2 to reach the separation chambers 1620.1 or 1620.2 in FIG. 16C.

In one example, a single extraction vessel may be employed, for instance, using first extraction vessel 1610.1 and bypassing second extraction vessel 1610.2 by opening Valves 1, 3B, 7B, 15B, 15A and 2 while closing Valves 5, 3A, 14B, and 14A, thereby allowing the process fluid to pass through to the separation chambers. Likewise, first extraction vessel 1610.1 can be bypassed and flow directed to second extraction vessel 1610.2 by closing valves 3B, 7B, 15B, 15A and opening valves 14B, 14A, 3A, 7A, and 6.

If it is desired to employ both vessels in the extraction process, then Valves 3B, 7B, 3A, 7A can be opened. In one direction of flow, Valves 15B, 15A and 6 can be opened and Valves 14B and 14A and 2 closed to allow pressurization and flow through both vessels. The mixture would then flow through Valve 6 to reach a predetermined separation chamber after passing through both extraction vessels. Following a reverse flow path Valves 15B, 15A and 6 can be closed and Valves 14B and 14A and 2 opened, thereby allowing the mixture to flow through Valve 2 to a separation chamber after passing through both extraction vessels.

Valves 3A, 3B, 7A, and 7B may be manually turned on/off. Optionally, these may be automated via pilot air actuated ball valves).

In some examples, another state of operation incorporates the use of a continuous batch mode extraction processing in which the extraction vessels are rotated on and offline to allow for service and reloading of source material of an offline extraction vessel during operation of the online extraction vessel. In some examples, this may be implemented with additional sections of the circulation conduit and extra valves near the extraction vessels (not depicted in FIG. 16B). The valves may be operated by electronic control or manual control, pursuant to a logic or sequence that allows flow of the process fluid to pass through first extraction vessel 1610.1 and bypass second extraction vessel 1610.2 for a period of time, allowing for the second extraction vessel 1610.2 to be serviced or reloaded with source material. Then, the valves may be configured to allow flow through both extraction vessels for a period of time, optionally flowing first through the first extraction vessel 1610.1 that has been online the longest and then to the second extraction vessel 1610.2 that was more recently activated. Then, the valves may be re-configured again to bypass the first extraction vessel 1610.1 and flow only through the second extraction vessel 1610.2. In examples utilizing additional valves and portions of the circulation conduit (not depicted in FIG. 16B), the valves may be configured such that the process fluid may be directed through the second extraction vessel 1610.2 first and then through first extraction vessel 1610.1. The sequence can then be restarted by reconfiguring the valves such that the process fluid is once again directed to pass through first extraction vessel 1610.1 and bypass second extraction vessel 1610.2.

Turning to FIG. 16C, the mixture is then directed to one of the separation chambers, 1620.1 or 1620.2. Valve 8 is normally closed so that the process fluid is forced into one of the separation chambers.

For separation within first separation chamber 1620.1, Valve 30A and 30B would be opened and 31A and 31B closed. Alternatively, for separation within second separation chamber 1620.2, then Valves 30A and 30B would be closed and 31A and 31B opened.

In an example of the predetermined separation chamber being 1620.1, the mixture would pass through the first separation portion 1634.1, which may be an orifice without valves (a process which is described in the reference mentioned above). The process fluid propagates through the separation portion 1634.1 and is decompressed.

In one example where the extraction vessels are maintained at 110 degrees F. and 4,000 PSI, the mixture is decompressed to a pressure in the range of 300-400 PSI when it exits the separation portion 1634.1 and enters separation chamber 1620.1. As discussed, when a liquid or supercritical fluid is converted into a gas, the effect of cooling becomes realized (known as the Joule-Thompson effect).

The separation chamber 1620.1 can be maintained at a cold temperature (for example, from 0 to 30 F). Once the gas is decompressed through the separation portion 1634.1, the extracted material collects inside the separation chamber 1620.1. The gaseous process fluid rises out of the top center connection of the separation chamber 1620.1 and is propagated to the overflow chamber 1650.

The overflow chamber 1650 provides an additional heat transfer surface area and provides additional volume to store the gaseous process fluid expelled from the separators.

Also shown in FIG. 16C, Valves 10A, 10B, 10C can be opened as necessary to vent excess process fluid from the system.

From the overflow chamber 1650, the process fluid is propagated to the center top connection through Valve 11. Valve 11 is opened while valve 12 is closed. To optionally add additional process fluid to the system, Valve 12 may be opened. Normally valve 12 is closed unless the system requires make up gas.

Turning to FIG. 16A, process fluid storage tanks, such as first and second storage tanks 1652.1 and 1652.2, may be used to store process fluid and receive or add process fluid from or to the system. Process fluid may be added to the system from the storage tanks by opening Valves T2 and 23 until a desired amount of process fluid has been added. Normally, Valve 23 is closed unless the system requires make up gas. The storage tanks 1652.1 and 1652.2 can also receive excess process fluid from the process fluid circulation conduit 1630 by opening Valves 22 and T1. Optionally, a conduit orifice, such as conduit orifice 1634.4 may be used to moderate the speed of the process fluid flowing between Valves 22 and T1.

The gaseous process fluid comes out of the overflow chamber 1650 in the process fluid circulation conduit 1630, passing through Valve 11, and is then propagated to the gas pump 1690, where the process fluid is compressed. This leads to the creation of heat as the process fluid is being compressed. Once the process fluid goes through the gas pump 1690, the pressure is elevated to approximately 1,000 to 1500 PSI. At the same time, it also imparts heat, so the temperature on the outlet side of the gas pump 1690 reaches about 200-250 degrees Fahrenheit. This heat is captured with the use of a regenerative heat exchanger, 1646.1, located between the gas pump 1690 and Valve 21. This heat is used to offset the Joule-Thompson effect in the separation chambers described above.

Valve 17 is closed during normal operation. It serves as a bypass valve that is used in the event that the gas pump 1690 needs to recirculate gas while the extractions are placed on hold.

The process fluid flows through the second heat exchanger 1646.2 after going through valve 21. The second heat exchanger helps to ensure that the process fluid is in liquid phase before entering the liquid pump.

The storage tanks 1652.1 and 1652.2 may be provided with a process fluid sensor for pressure and temperature, which aids in monitoring the process fluid stored. Storage tank pressure controls the operation of valve 12, 22, and 23, as does the relationship between the speed of the variable speed drive on the liquid pump and target pressure. If target pressure is higher than the extractor pressure and the liquid pump is running at or near full speed, the system will add the process fluid. It adds from the storage tank through valve 23 if there is enough the process fluid in the storage tank to overcome the separation chamber pressure. It adds the process fluid from the make-up cylinder(s) through valve 12 if the storage tank pressure isn't high enough to overcome the separation chamber pressure.

The above described operations can be optionally implemented with an electronic control system, sensors, and relays such that some or all operations of the apparatus can be controlled via a human/machine interface such buttons, knobs, touch screens, keyboards, or other input devices known in the art, including examples employing a microprocessor and running software or firmware.

An example of system operation employing such a human machine interface will now be described. The apparatus is placed in "auto mode." For example, an operator presses the "Go To Auto Mode" button.

Afterwards, the operator may press a start button to commence the transformation described herein.

The operator is then prompted to enter the target pressure for the extraction cycle and may be prompted to enter a target pressure between 900-4800 PSI.

Additionally, the operator is prompted to enter the total extraction time in hours. Further, the operator is prompted to enter the phase 1 time in hours and minutes.

After the relevant data has been entered, the operator is prompted to check separation chambers to make sure they are secure, chiller set points, and extractor vessels. Once the operator has acknowledged the above, the process may proceed.

Next, the operator is prompted to open the process fluid bottles, Valves T1 and T2. Once the operator finishes this, they may instruct that they are ready for the next step.

The operator is then prompted to enter the orifice size being used in this extraction. After which, the operator is prompted to select which separation chamber/extractor(s) will be used for phase 1.

Based on the extractor selection made, the operator is prompted to close 3B and 7B and open 3A and 7A if extraction vessel 1610.2 only is selected. If extraction vessel 1610.1 only is selected, the operator is prompted to open 3B and 7B and close 3A and 7A. If both extractors are selected, the operator is prompted to open 3A, 3B, 7A, and 7B.

Finally, the operator is prompted to close valves 10A, 10B, and 10C. After confirming this, the extraction may occur.

As explained above, the apparatus allows for the use of the process fluid with dual phases of pumping ensures an efficient use of the process fluid while maintaining a consistency of temperature and pressure throughout both phases of the extraction/pumping stages. Employing the aspects disclosed herein, the benefits of the process fluid extraction is realized, while abating the downsides of current the process fluid extraction techniques that can be time consuming due to the waits required to cool/heat the relevant gases required.

Figure 17:
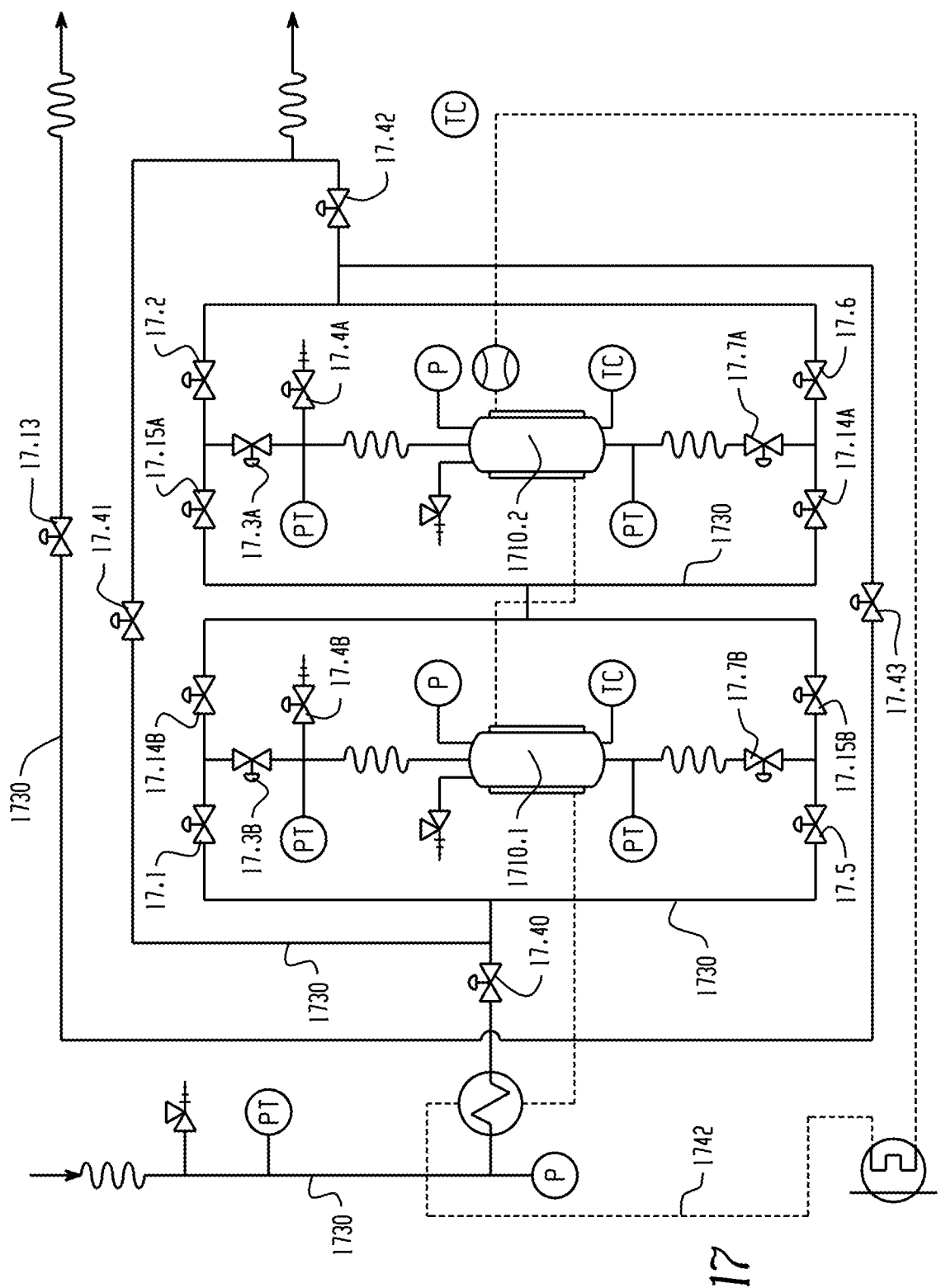
FIG. 17 is a portion of a of an extraction apparatus.

Turning now to the example shown in FIG. 17, depicted is a portion of an exemplary recirculating extraction apparatus wherein the circulation conduit near the extraction vessels is capable of being set in multiple configurations to operate in a batch mode extraction process, wherein the first and second extraction vessels 1710.1 and 1710.2 are intermittently operated alone or together in a sequence that permits servicing or reloading in an offline extraction vessel while permitting continuous flow of process fluid through an online extraction vessel.

In this example, as compared to the example depicted in FIGS. 16A,B, and C, additional sections of the circulation conduit 1730 near the extraction vessels 1710.1 and 1710.2 and extra valves 17.40, 17.41, 17.42, 17.43 and 17.13 are shown. The valves may be operated by electronic control or manual control. Like the exemplary apparatus depicted in FIGS. 16A,B, and C, the portion of the exemplary device depicted in FIG. 17 is part of a larger recirculating extraction apparatus that includes additional elements not disclosed in FIG. 17, such as separation chambers (for example, first and second separation chambers as disclosed in FIG. 16C) and other elements disclosed above but which are not depicted in FIG. 17. One of ordinary skill in the art would readily appreciated that FIG. 17 could be combined with the device disclosed in FIGS. 16A and 16C to provide a dual phase recirculating extraction apparatus capable of configurations providing for a sequence of batch mode processing.

In an exemplary sequence, an initial configuration of the valves allows flow of the process fluid to pass through first extraction vessel 1710.1 and bypass second extraction vessel 1710.2 for a period of time, allowing for the second extraction vessel 1710.2 to be serviced or reloaded with source material. Then, the valves may be configured to allow flow through both extraction vessels for a period of time, optionally flowing first through the first extraction vessel 1710.1 that has been online the longest and then to the second extraction vessel 1710.2 that was more recently activated. Then, the valves may be re-configured again to bypass the first extraction vessel 1710.1 and flow only through the second extraction vessel 1710.2. After an additional valve reconfiguration, the process fluid may be directed through the second extraction vessel 1710.2 first and then through first extraction vessel 1710.1. The sequence can then be restarted by reconfiguring the valves such that the process fluid is once again directed to pass through first extraction vessel 1710.1 and bypass second extraction vessel 1710.2.

In further reference to FIG. 17, the following exemplary valve configurations will now be disclosed to implement the above described sequence. For the sake this description, reference will be made to first and second separation chambers (not depicted in FIG. 17), which may be accessed from the portions of the circulation conduit 1730 pointing to the right-most side of FIG. 17. In this described sequence, the process fluid is directed through each selected extraction vessel in a top to bottom direction in reference to the orientation of the extraction vessels shown in FIG. 17 such that the topmost extraction vessel opening serves as the ingress and the bottom extraction vessel opening serves as the egress. Valve 17.13 is closed during normal operation in this example.

In a first configuration, the process fluid is directed to the first extraction vessel 1710.1 and the mixture is directed from the first extraction vessel 1710.1 to the first or second separation chamber (not depicted), bypassing the second extraction vessel 1710.2. The valves for this configuration are set as follows: 17.40(open), 17.41(closed), 17.42(open), 17.43(closed), 17.1(open), 17.3B(open), 17.7B(open), 17.7A(closed), 17.15B(open), 17.15A(open), 17.5 (closed), 17.3A(closed), 17.14B(closed), 17.14A(closed), 17.2(open), and 17.6(closed).

In a second configuration, the process fluid is directed to the first extraction vessel 1710.1 and the mixture is directed from the first extraction vessel 1710.1 through the second extraction vessel 1710.2 and then to the first or second separation chamber. The valves for this configuration are set as follows: 17.40(open), 17.41(closed), 17.42(open), 17.43 (closed), 17.1(open), 17.3B(open), 17.7B(open), 17.7A (open), 17.15B(open), 17.15A(open), 17.5(closed), 17.3A (open), 17.14B(closed), 17.14A(closed), 17.2(closed), and 17.6(open).

In a third configuration, the process fluid is directed to the second extraction vessel and the mixture is directed from the second extraction vessel to the first or second separation chamber, bypassing the first extraction vessel. The valves for this configuration are set as follows: 17.40(open), 17.41 (closed), 17.42(open), 17.43(closed), 17.1(closed), 17.3B (closed), 17.7B(closed), 17.7A(open), 17.15B(open), 17.15A(open), 17.5(open), 17.3A(open), 17.14B(closed), 1714.A(closed), 17.2(closed), and 17.6(open).

In a fourth configuration, the process fluid is directed to the second extraction vessel and the mixture is directed from the second extraction vessel through the first extraction vessel and then to the first or second separation chamber. The valves for this configuration are set as follows: 17.40 (closed), 17.41(open), 17.42(closed), 17.43(open), 17.1 (closed), 17.3B(open), 17.7B(open), 17.7A(open), 17.15B (closed), 17.15A(closed), 17.5(open), 17.3A(open), 17.14B (open), 1714.A(open), 17.2(open), and 17.6(closed).

In a fifth configuration, the process fluid is directed to the first extraction vessel and the mixture is directed from the first extraction vessel to the first or second separation chamber, bypassing the second extraction vessel. The valves for this configuration are set as follows: 17.40(open), 17.41 (closed), 17.42(open), 17.43(closed), 17.1(open), 17.3B (open), 17.7B(open), 17.7A(closed), 17.15B(open), 17.15A (open), 17.5(closed), 17.3A(closed), 17.14B(closed), 17.14A(closed), 17.2(open), and 17.6(closed).

As disclosed in previous examples, the circulation conduit can be configured to reverse the flow of process fluid through the extraction vessels such that an ingress extraction vessel opening becomes the egress and the egress becomes the ingress. In the next described sequence, the process fluid is directed through each selected extraction vessel in a bottom to top direction in reference to the orientation of the extraction vessels shown in FIG. 17 such that the topmost extraction vessel opening serves as the egress and the bottom extraction vessel opening serves as the ingress. Valve 17.13 is closed during normal operation in this example.

In a first configuration, the process fluid is directed to the first extraction vessel 1710.1 and the mixture is directed from the first extraction vessel 1710.1 to the first or second separation chamber (not depicted), bypassing the second extraction vessel 1710.2. The valves for this configuration are set as follows: 17.40(open), 17.41(closed), 17.42(open), 17.43(closed), 17.1(closed), 17.3B(open), 17.7B(open), 17.7A(closed), 17.15B(closed), 17.15A(closed), 17.5(open), 17.3A(closed), 17.14B(open), 1714.A(open), 17.2(closed), and 17.6(open).

In a second configuration, the process fluid is directed to the first extraction vessel 1710.1 and the mixture is directed from the first extraction vessel 1710.1 through the second extraction vessel 1710.2 and then to the first or second separation chamber. The valves for this configuration are set as follows: 17.40(open), 17.41(closed), 17.42(open), 17.43 (closed), 17.1(closed), 17.3B(open), 17.7B(open), 17.7A (open), 17.15B(closed), 17.15A(closed), 17.5(open), 17.3A (open), 17.14B(open), 1714.A(open), 17.2(open), and 17.6 (closed).

In a third configuration, the process fluid is directed to the second extraction vessel and the mixture is directed from the second extraction vessel to the first or second separation chamber, bypassing the first extraction vessel. The valves for this configuration are set as follows: 17.40(open), 17.41 (closed), 17.42(open), 17.43(closed), 17.1(open), 17.3B (closed), 17.7B(closed), 17.7A(open), 17.15B(closed), 17.15A(closed), 17.5(closed), 17.3A(open), 17.14B(open), 1714.A(open), 17.2(open), and 17.6(closed).

In a fourth configuration, the process fluid is directed to the second extraction vessel and the mixture is directed from the second extraction vessel through the first extraction vessel and then to the first or second separation chamber. The valves for this configuration are set as follows: 17.40 (closed), 17.41(open), 17.42(closed), 17.43(open), 17.1 (open), 17.3B(open), 17.7B(open), 17.7A(open), 17.15B (open), 17.15A(open), 17.5(closed), 17.3A(open), 17.14B (closed), 1714.A(closed), 17.2(closed), and 17.6(open).

In a fifth configuration, the process fluid is directed to the first extraction vessel and the mixture is directed from the first extraction vessel to the first or second separation chamber, bypassing the second extraction vessel. The valves for this configuration are set as follows: 17.40(open), 17.41 (closed), 17.42(open), 17.43(closed), 17.1(closed), 17.3B (open), 17.7B(open), 17.7A(closed), 17.15B(closed), 17.15A(closed), 17.5(open), 17.3A(closed), 17.14B(open), 1714.A(open), 17.2(closed), and 17.6(open).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

Numerical ranges and parameters set forth approximations of the broad scope of the disclosed systems and methods. The numerical values set forth in the specific examples, are reported as precisely as possible. Any numerical value, however, inherently contains certain errors necessarily resulting from the standard deviation found in their respective testing measurements.

Furthermore, while the devices, systems, methods, and so on have been illustrated by describing examples, and while the examples, have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples, shown and described. Accordingly, departures can be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Directional terms such as "up", "down", "left", "right", "over", "top, "bottom", "front", and "side", are meant to reference the representations shown in figures and are not meant to restrict the particular arrangement of the various elements in the claimed apparatus or method.

To the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicant intends to indicate "only A or B, but not both," then the term "only A or B but not both" will be employed. Similarly, when the applicant intends to indicate "one and only one" of A, B, or C, the applicant will employ the phrase "one and only one." Thus, use of the term "or" herein is the inclusive, and not the exclusive use.

It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X).

What is claimed is:

1. A dual phase recirculating extraction apparatus, comprising:
   an extraction vessel having first and second extraction vessel openings, wherein each extraction vessel opening can function either as an ingress or an egress, the extraction vessel configured to receive a process fluid through the ingress, allow the process fluid to come into contact with a source material within the extraction vessel to form a mixture, and permit the mixture to exit the extraction vessel through the egress;
   a first filter adapted to retain the source material while also allowing the process fluid or the mixture to pass through the first extraction vessel opening;
   a second filter adapted to retain the source material while also allowing the process fluid or the mixture to pass through the second extraction vessel opening;
   a separation chamber;
   a circulation conduit configured to direct the process fluid into the extraction vessel through a predetermined ingress selected from the first and second extraction vessel openings, direct flow of the mixture from the extraction vessel to the separation chamber, allow a portion of the extracted material to separate from the mixture within the separation chamber, and allow recirculation of the process fluid to the extraction vessel through a next predetermined ingress selected from the first and second extraction vessel openings;
   a gas pump connected to the circulation conduit and configured to receive the process fluid in a gaseous state and compress the process fluid; and
   a liquid pump connected to the circulation conduit and configured to receive the process fluid in a liquid state and compress the process fluid.

2. The dual phase recirculating extraction apparatus of claim 1 further comprising an extraction temperature regulator, including an extraction heating/cooling source, an extraction temperature regulation fluid, an extraction temperature regulation line, and at least one heat exchanger, the temperature regulator configured to allow recirculation of the temperature regulation fluid and to regulate the temperature of the process fluid.

3. The dual phase recirculating extraction apparatus of claim 2 further comprising a recirculation thermal manager including a recirculation cooling source, a recirculation thermal management fluid, a recirculation thermal management line, and at least one heat exchanger, the recirculation thermal manager configured to allow recirculation of the recirculation thermal management fluid, manage the temperature of the process fluid, and selectively cause the process fluid to change from a gaseous state to a liquid state.

4. The dual phase recirculating extraction apparatus of claim 3, further comprising at least one additional extraction vessel as recited in claim 1.

5. The dual phase recirculating extraction apparatus of claim 4, further comprising at least at least one additional separation chamber as recited in claim 1.

6. The dual phase recirculating extraction apparatus of claim 5, further comprising an overflow chamber connected to the circulation conduit and configured to receive the process fluid from the at least two separation chambers and allow recirculation of the process fluid.

7. The dual phase recirculating extraction apparatus of claim 6 wherein the circulation conduit is configured to selectively direct the process fluid through a predetermined ingress of a predetermined extraction vessel among the at least two extraction vessels, direct flow of the mixture from the predetermined extraction vessel to a predetermined separation chamber among the at least two separation chambers, allow a portion of the extracted material to separate from the mixture within the predetermined separation chamber, allow flow of the process fluid to the overflow chamber, and thereafter allow recirculation of the process fluid to a next predetermined extraction vessel among the at least two extraction vessels.

8. The dual phase recirculating extraction apparatus of claim 7 wherein the apparatus is configured to cause the process fluid to have a predetermined temperature and a predetermined pressure prior to flowing to the predetermined extraction vessel.

9. The dual phase recirculating extraction apparatus of claim 8 wherein the apparatus is configured to cause the process fluid to have a first predetermined temperature and a first predetermined pressure prior to flowing to the predetermined extraction vessel during a first circulation cycle to extract a first predetermined extracted material from the source material and cause the process fluid to have a next predetermined temperature and a next predetermined pressure prior to flowing to a next predetermined extraction vessel during a next circulation cycle to extract a next predetermined extracted material from the source material.

10. The dual phase recirculating extraction apparatus of claim 1 including a filter plug assembly, the filter plug assembly comprising:
a base having a first base surface with at least one base surface channel, the base surface channel including a flow cavity opening of a flow cavity extending through the base to a second base surface, the base surface channel further including an instrument cavity opening of an instrument cavity extending through the base to the second base surface;
a filter retaining piece;
a filter fastener for releasably securing the filter retaining piece to the base while holding the filter between the filter retaining piece and the base and forming a filter plug sub-assembly;
an extraction vessel fastener for releasably securing the filter plug sub-assembly to the first or second extraction vessel opening such that an instrument connected to the instrument cavity may sense a condition of the process fluid or mixture within the filter plug sub-assembly without contacting the source material within the extraction vessel.

11. A dual phase recirculating extraction apparatus, comprising:
an extraction vessel having first and second extraction vessel openings, wherein each extraction vessel opening can function either as an ingress or an egress, the extraction vessel configured to receive a process fluid through the ingress, allow the process fluid to come into contact with a source material within the extraction vessel to form a mixture, and permit the mixture to exit the extraction vessel through the egress;
a first filter adapted to retain the source material while also allowing the process fluid or the mixture to pass through the first extraction vessel opening;
a second filter adapted to retain the source material while also allowing the process fluid or the mixture to pass through the second extraction vessel opening;
a separation chamber;
a circulation conduit configured to direct the process fluid into the extraction vessel through a predetermined ingress selected from the first and second extraction vessel openings, direct flow of the mixture from the extraction vessel to the separation chamber, allow a portion of the extracted material to separate from the mixture within the separation chamber, and thereafter allow recirculation of the process fluid to the extraction vessel through a next predetermined ingress selected from the first and second extraction vessel openings;
a gas pump connected to the circulation conduit and configured to receive the process fluid in a gaseous state and compress the process fluid;
a liquid pump connected to the circulation conduit and configured to receive the process fluid in a liquid state and compress the process fluid;
an extraction temperature regulator including an extraction heating/cooling source, an extraction temperature regulation fluid, an extraction temperature regulation line, an extraction temperature set heat exchanger configured to selectively adjust the temperature of the process fluid prior to entering the extraction vessel, and wherein the extraction temperature regulator is configured to allow recirculation of the temperature regulation fluid; and
a recirculation thermal manager including a recirculation cooling source, a recirculation thermal management fluid, a recirculation thermal management line, and first and second recirculation heat exchangers, the recirculation thermal manager configured to allow recirculation of the recirculation thermal management fluid and to regulate the temperature of the process fluid.

12. The dual phase recirculating extraction apparatus of claim 11 wherein the circulation conduit is configured to direct the process fluid to the gas pump, thereafter to the first recirculation heat exchanger, thereafter to the second recirculation heat exchanger, thereafter to the liquid pump, thereafter to the extraction temperature set heat exchanger, thereafter to the extraction vessel, thereafter to the separation vessel, and thereafter back to the gas pump.

13. The dual phase recirculating extraction apparatus of claim 12 wherein the recirculation thermal manager is configured to circulate the recirculation thermal management fluid from the cooling source to the second recirculation heat exchanger, thereafter to the gas pump, thereafter to the first recirculation heat exchanger, thereafter to the separation chamber, and thereafter back to the cooling source.

14. The dual phase recirculating extraction apparatus of claim 13 wherein the circulation conduit is configured to direct the process fluid in a gaseous state to the gas pump, the gas pump is configured to compress the process fluid, the circulation conduit is configured to direct the process fluid to the first recirculation heat exchanger, the first recirculation heat exchanger is configured to cool the process fluid, the circulation conduit is configured to direct the process fluid to the second recirculation heat exchanger, the second recirculation heat exchanger is configured to further cool the process fluid, the circulation conduit is configured to direct the process fluid to the liquid pump, the liquid pump is configured to receive the process fluid in a liquid state and compress the process fluid, and the circulation conduit is configured to direct the process fluid to the extraction temperature set heat exchanger.

15. The dual phase recirculating extraction apparatus of claim 14, further comprising at least one additional extraction vessel as recited in claim 11.

16. The dual phase recirculating extraction apparatus of claim 15, further comprising at least one additional separation chamber as recited in claim 11.

17. The dual phase recirculating extraction apparatus of claim 16, further comprising at least one overflow chamber connected to the circulation conduit and configured to receive the process fluid from the at least two separation chambers and allow recirculation of the process fluid.

18. The dual phase recirculating extraction apparatus of claim 17 wherein the circulation conduit is configured to selectively direct the process fluid through the predetermined ingress of a predetermined extraction vessel among the at least two extraction vessels, direct flow of the mixture from the predetermined extraction vessel to a predetermined separation chamber among the at least two separation chambers, allow the process fluid to flow from the predetermined separation chamber to the overflow chamber, allow recirculation of the process fluid from the overflow chamber to the gas pump, allow flow of the process fluid from the gas pump, through the first and second recirculation heat exchangers, through the liquid pump, through the extraction temperature set heat exchanger, and thereafter to a next predetermined extraction vessel among the at least two extraction vessels.

19. The dual phase recirculating extraction apparatus of claim 18 further comprising at least one storage tank connected to the circulation conduit and configured to selectively release additional process fluid through the circulation conduit to the gas pump.

20. The dual phase recirculating extraction apparatus of claim 19, wherein
each of the extraction vessels includes a heat exchange portion connected to the extraction temperature regulation line and configured to allow flow of the extraction temperature regulation fluid from and to the extraction temperature regulation line; and
each of the separation chambers, overflow chamber, storage tank, and gas pump includes a heat exchange portion connected to the recirculation thermal management line and configured to allow flow of the recirculation thermal management fluid from and to the recirculation thermal management line.

21. The dual phase recirculating extraction apparatus of claim 18 wherein the circulation conduit is configured to selectively direct the process fluid into the first extraction vessel, allow flow of the mixture to the second extraction vessel, allow flow of the mixture to a predetermined separation chamber among the at least two separation chambers.

22. The dual phase recirculating extraction apparatus of claim 18 wherein the circulation conduit is configured to selectively reverse direction of the process fluid through the first or second extraction vessels such that the egress of a predetermined extraction vessel becomes the ingress and the ingress becomes the egress.

23. The dual phase recirculating extraction apparatus of claim 18 wherein the circulation conduit near the extraction vessels is capable of being set in multiple configurations to operate in a batch mode extraction process, wherein the first and second extraction vessels are intermittently operated alone or together in a sequence that permits servicing or reloading in an offline extraction vessel while permitting continuous flow of process fluid through an online extraction vessel.

24. The dual phase recirculating extraction apparatus of claim 23 wherein the circulation conduit near the extraction vessels is capable of being configured pursuant to the following sequence:
in a first configuration, the process fluid is directed to the first extraction vessel and the mixture is directed from the first extraction vessel to the first or second separation chamber, bypassing the second extraction vessel;
in a second configuration, the process fluid is directed to the first extraction vessel and the mixture is directed from the first extraction vessel through the second extraction vessel and then to the first or second separation chamber;
in a third configuration, the process fluid is directed to the second extraction vessel and the mixture is directed from the second extraction vessel to the first or second separation chamber, bypassing the first extraction vessel;
in a fourth configuration, the process fluid is directed to the second extraction vessel and the mixture is directed from the second extraction vessel through the first extraction vessel and then to the first or second separation chamber; and
in a fifth configuration, the process fluid is directed to the first extraction vessel and the mixture is directed from the first extraction vessel to the first or second separation chamber, bypassing the second extraction vessel.

25. The dual phase recirculating extraction apparatus of claim 14 wherein the apparatus is configured to cause the process fluid to exit the temperature set heat exchanger at a predetermined temperature and a predetermined pressure.

26. The dual phase recirculating extraction apparatus of claim 25 wherein the apparatus is configured to cause the process fluid to exit the temperature set heat exchanger during a first circulation cycle at a first predetermined temperature and a first predetermined pressure to extract a first predetermined extracted material from the source material and cause the process fluid to exit the temperature set heat exchanger during a next circulation cycle at a next predetermined temperature and a next predetermined pressure to extract a next predetermined extracted material from the source material.

27. The dual phase recirculating extraction apparatus of claim 26 wherein the process fluid enters the gas pump at a pressure in the range of 300 to 400 psi, the process fluid exits the gas pump at a pressure in the range of 1,000 to 1,500 psi and a temperature in the range of 200 to 250 degrees Fahrenheit, the process fluid is cooled to a temperature in the range of 70 to 85 degrees Fahrenheit by passing through the first and second recirculation heat exchangers in proximity to relatively cooler recirculation thermal management fluid, the process fluid exits the liquid pump at a pressure in the range of 4,000 to 5,000 psi, and the process fluid exits the extraction temperature set heat exchanger at a temperature of about 110 degrees Fahrenheit.

\* \* \* \* \*